(12) United States Patent
Junell et al.

(10) Patent No.: US 8,412,247 B2
(45) Date of Patent: Apr. 2, 2013

(54) METHOD FOR GENERATING A COEXISTENCE VALUE TO DEFINE FAIR RESOURCE SHARE BETWEEN SECONDARY NETWORKS

(75) Inventors: Jari Henrik Junell, Espoo (FI); Juha Salokannel, Tampere (FI)

(73) Assignee: Nokia Corporation, Espoo (FI)

( * ) Notice: Subject to any disclaimer, the term of this patent is extended or adjusted under 35 U.S.C. 154(b) by 378 days.

(21) Appl. No.: 12/875,187

(22) Filed: Sep. 3, 2010

(65) Prior Publication Data
US 2012/0058790 A1   Mar. 8, 2012

(51) Int. Cl.
*H04W 72/04* (2009.01)
*H04W 28/00* (2009.01)

(52) U.S. Cl. ........................ 455/509; 370/329

(58) Field of Classification Search ............. 370/252, 370/328, 329, 133, 338, 346, 350; 455/62, 455/509, 41.2, 434, 450, 556.1
See application file for complete search history.

(56) References Cited

U.S. PATENT DOCUMENTS

| | | | |
|---|---|---|---|
| 7,826,459 B2 | 11/2010 | Xhafa et al. | |
| 7,983,216 B2 | 7/2011 | Iyer et al. | |
| 8,165,106 B2 | 4/2012 | Yang et al. | |
| 2005/0027871 A1 | 2/2005 | Bradley et al. | |
| 2006/0002326 A1 | 1/2006 | Vesuna | |
| 2006/0034217 A1 | 2/2006 | Kwon et al. | |
| 2006/0286986 A1 | 12/2006 | Kim et al. | |
| 2007/0086426 A1 | 4/2007 | Bonta et al. | |
| 2007/0135162 A1* | 6/2007 | Banerjea et al. | 455/556.1 |
| 2007/0161364 A1 | 7/2007 | Surineni et al. | |
| 2007/0254596 A1 | 11/2007 | Corson et al. | |
| 2007/0274273 A1* | 11/2007 | Grushkevich et al. | 370/338 |
| 2008/0043705 A1* | 2/2008 | Desai et al. | 370/346 |
| 2008/0089279 A1 | 4/2008 | Hu et al. | |

(Continued)

FOREIGN PATENT DOCUMENTS

| | | |
|---|---|---|
| EP | 1863303 A1 | 12/2007 |
| EP | 1 883 258 | 1/2008 |

(Continued)

OTHER PUBLICATIONS

J. C. Zuniga, et al; IEEE 802-SG-WhiteSpace-09/0032r4; Media Independent Coexistence; Mar. 11, 2009, p. 1-10.

(Continued)

*Primary Examiner* — Wing F Chan
*Assistant Examiner* — Rajeshwari Krishnan
(74) *Attorney, Agent, or Firm* — Locke Lord LLP

(57) ABSTRACT

Method, apparatus, and computer program product embodiments are disclosed to provide coexistence values for wireless resource sharing on a fair basis between heterogeneous wireless networks to enable coexistence of secondary networks. An example embodiment of the invention includes a method, comprising the steps of: determining a coexistence value for a wireless network based on parameters associated with the wireless network, including at least one of a number of nodes in the wireless network, a current resource allocation utilization rate of the wireless network, coexistence assistance by the wireless network to assist in operation of other networks, and/or a priority of the wireless network, wherein the coexistence value characterizes eligibility of the wireless network to wireless spectrum resources available to secondary networks; and communicating the determined coexistence value of the wireless network to an associated network controller. The resulting embodiments provide for wireless resource sharing on a fair basis between heterogeneous wireless networks to enable coexistence of secondary networks.

17 Claims, 37 Drawing Sheets

U.S. PATENT DOCUMENTS

| | | | |
|---|---|---|---|
| 2008/0108365 | A1 | 5/2008 | Buddhikot et al. |
| 2008/0137627 | A1 | 6/2008 | Fischer et al. |
| 2008/0159258 | A1* | 7/2008 | Ji et al. ............................ 370/350 |
| 2008/0192806 | A1* | 8/2008 | Wyper et al. .................. 375/133 |
| 2008/0228878 | A1 | 9/2008 | Wu et al. |
| 2008/0233875 | A1 | 9/2008 | Desai et al. |
| 2008/0253341 | A1* | 10/2008 | Cordeiro et al. .............. 370/338 |
| 2008/0261639 | A1 | 10/2008 | Sun et al. |
| 2008/0268892 | A1 | 10/2008 | Hamdi et al. |
| 2008/0285525 | A1 | 11/2008 | Hu |
| 2008/0298310 | A1 | 12/2008 | Hu |
| 2009/0040937 | A1 | 2/2009 | Xhafa et al. |
| 2009/0059856 | A1 | 3/2009 | Kermoal et al. |
| 2009/0122755 | A1 | 5/2009 | Seok et al. |
| 2009/0149208 | A1 | 6/2009 | Huttunen et al. |
| 2009/0196180 | A1 | 8/2009 | Bahl et al. |
| 2009/0197627 | A1 | 8/2009 | Kuffner et al. |
| 2009/0225717 | A1 | 9/2009 | Banerjea |
| 2009/0247201 | A1 | 10/2009 | Zhuan et al. |
| 2009/0279449 | A1 | 11/2009 | Kneckt et al. |
| 2009/0279491 | A1 | 11/2009 | Kim et al. |
| 2009/0298522 | A1 | 12/2009 | Chaudhri et al. |
| 2010/0002608 | A1 | 1/2010 | Goldhamer |
| 2010/0009173 | A1 | 1/2010 | Lee et al. |
| 2010/0046440 | A1 | 2/2010 | Singh |
| 2010/0087216 | A1 | 4/2010 | Ko et al. |
| 2010/0097950 | A1 | 4/2010 | Jeon |
| 2010/0097952 | A1 | 4/2010 | McHenry et al. |
| 2010/0142463 | A1 | 6/2010 | Hu |
| 2010/0220687 | A1 | 9/2010 | Reznik et al. |
| 2010/0232380 | A1* | 9/2010 | Choi et al. ..................... 370/329 |
| 2010/0248631 | A1 | 9/2010 | Chaudhri et al. |
| 2010/0273426 | A1 | 10/2010 | Walley et al. |
| 2010/0304685 | A1 | 12/2010 | Wietfeldt et al. |
| 2010/0309806 | A1 | 12/2010 | Wu et al. |
| 2011/0039554 | A1* | 2/2011 | Bims .............................. 455/434 |
| 2011/0090887 | A1 | 4/2011 | Kim et al. |
| 2011/0090890 | A1 | 4/2011 | Seok et al. |
| 2011/0116488 | A1 | 5/2011 | Grandhi |
| 2011/0179174 | A1 | 7/2011 | Kasslin et al. |
| 2011/0199989 | A1 | 8/2011 | Wietfeldt et al. |
| 2011/0222493 | A1 | 9/2011 | Mangold et al. |
| 2011/0243094 | A1 | 10/2011 | Dayal et al. |
| 2011/0250857 | A1 | 10/2011 | Reial et al. |
| 2011/0250921 | A1 | 10/2011 | Reial |
| 2011/0287802 | A1 | 11/2011 | Ma et al. |
| 2011/0310767 | A1 | 12/2011 | Hu |
| 2012/0069746 | A1 | 3/2012 | Park |
| 2012/0077506 | A1 | 3/2012 | Wietfeldt et al. |
| 2012/0094681 | A1 | 4/2012 | Freda et al. |
| 2012/0106512 | A1 | 5/2012 | Banerjea et al. |
| 2012/0127011 | A1 | 5/2012 | Lee et al. |
| 2012/0134328 | A1 | 5/2012 | Gauvreau et al. |
| 2012/0182883 | A1 | 7/2012 | Junell et al. |
| 2012/0195269 | A1 | 8/2012 | Kang et al. |
| 2012/0225662 | A1 | 9/2012 | Jo et al. |

FOREIGN PATENT DOCUMENTS

| | | |
|---|---|---|
| EP | 2083591 A1 | 7/2009 |
| GB | 2461724 A | 1/2010 |
| WO | 03/001742 A1 | 1/2003 |
| WO | 2005/045689 A2 | 5/2005 |
| WO | 2006/132487 A1 | 12/2006 |
| WO | 2007/031958 A2 | 3/2007 |
| WO | 2010/027308 A1 | 3/2010 |
| WO | 2010/043270 A1 | 4/2010 |
| WO | WO2011022506 | 2/2011 |

OTHER PUBLICATIONS

H. Wang, et al; IEEE 802.19-09/0034r3; Media Independent Coexistence for Devices in White Space; Jul. 10, 2009, p. 1-12.

M. Kasslin; IEEE 802.19-10/0055r02; Wireless Coexistence; System Design Document; Mar. 18, 2010, p. 1-12.

International Search Report issued Oct. 11, 2011 in International Serial No. PCT/FI2011/050703, 13pp.

Cavalcanti et al, "IEEE 802.22/07/0121 r1 : Proposed text changes to Section 6.21.2 Self-coexistence in IEEE 802.22/D0.2 Draft Standard" published in Mar. 2007.

Cordeiro et al, "Cognitive PHY and MAC Layers for Dynamic Spectrum Access and Sharing of TV Bands", published by ACM on Aug 5, 2006.

T. Baykas, et al; IEEE P802.19-10/0055r3 Wireless Coexistence—System Design Document; Mar. 18, 2010, p. 1-15.

M. Rahman; IEEE 802.19/10/0010-00-tvws; Possible Coexistence Cases in TVWS and Topics to be Considered in P802.19.1; Jan. 1, 2009; pp. 1-10.

sg-whitespace-09-0055-00/0000 TV Whitespace Tutorial; Mar. 10, 2009.

European Search Report dated Jun. 27, 2012 for European Application No. 12155105.5-1525.

International Search Report for International Application No. PCT/FI2011/050591 dated Sep. 28, 2011.

Dong Heon Lee et al., "Self-coexistence techniques for cognitive radio LANs/PANs", 21st Annual IEEE International Symposium on Personal Indoor and Mobile Radio Communications (PIMRC), Sep. 26, 2010, IEEE, Piscataway, NJ, USA, pp. 1516-1520, Chapter III B.

Ashraf, I. et al., "Impact of Interfering Bluetooth Piconets on a Collocated p-Persistent CSMA-Based WLAN", IEEE Transactions on Vehicular Technology, vol. 58, No. 9, Jan. 11, 2009, pp. 4962-4975.

Asterjadhi, A. et al., "JENNA: A jamming Evasive Network-Coding Neighbor-Discovery Algorithm for Cognitive radio Networks", IEEE Wireless Communications, vol. 17, No. 4, Jan. 8, 2010, pp. 24-32.

Baykas, T., et al., "Overview of TV White Spaces: Current regulations, standards and coexistence between secondary users", 2010 IEEE 21st International Symposium on Personal, Indoor and Mobile Radio Communications Workshops (PIMRC Workshops), Sep. 26-30, 2010, Istanbul, Turkey, IEEE, Piscataway, NJ, USA, pp. 38-43.

Peha, J.M.: "Sharing Spectrum Through Spectrum Policy reform and Cognitive Radio", Proceedings of teh IEEE, vol. 97, No. 4, Jan. 4, 2009, pp. 708-719.

International Search Report mailed Nov. 29, 2011 in International Application Serial No. PCT/FI2011/050714, 13pp.

IEEE P802.15.2 Draft No. 09; Coexistence of Wireless Personal Area Networks with Other Wireless Devices Operating in Unlicensed Frequency Bands; Mar. 24, 2003, IEEE Inc. Standards.

J. Zhu, et al.,: Multi-Radio Coexistence: Challenges and Opportunities; Proceedings 16th International Conference on Computer Communications and Networks; Aug. 3, 2007, pp. 358-364.

International Search Report and Written Opinion mailed Mar. 14, 2012 in International Application Serial No. PCT/FI2011/051128, 15pp.

International Search Report and Written Opinion mailed Apr. 2, 2012 in International Application Serial No. PCT/FI2011/051127, 15pp.

P. Camarda et al., "An Exclusive Self-Coexistence (ESC) Resource Sharing Algorithm for Cognitive 802.22 Networks," 2010 5th International Symposium on Wireless Pervasive Computing (ISWPC), pp. 128-133.

International Search Report and Written Opinion mailed Dec. 12, 2011 for International Application Serial No. PCT/FI2011/050777, 12pp.

U.S. Appl. No. 13/311,779, filed Dec. 6, 2011, Mika Rinne et al.

International Search Report and Written Opinion mailed Jul. 29, 2011 in International Application Serial No. PCT/FI2011/050266, 13pp.

Karama Hamdi, et al., "Power Control in Cognitive Radio Systems Based on Spectrum Sensing Side Information", Proc. IEEE International Conference on Communications (ICC'07), pp. 5161-5165, Jun. 2007.

Ian F. Akyildiz, et al. "A Survey on Spectrum Management in Cognitive Radio Networks", IEEE Communications Magazine • Apr. 2008, pp. 40-48.

Dong In Kim, et al., "Joint Rate and Power Allocation for Cognitive Radios in Dynamic Spectrum Access Environment", IEEE Transactions on Wireless Communications, vol. 7, No. 12, Dec. 2008, pp. 5517-5527.

Fabrizio Granelli, et al., "Standardization and Research in Cognitive and Dynamic Spectrum Access Networks: IEEE SCC41 Efforts and Other Activities", IEEE Communications Magazine • Jan. 2010, pp. 71-79.

Zander, "Can We Find (and Use) "Spectrum Holes"? Spectrum Sensing and Spatial Reuse Opportunities in "Cognitive" Radio Systems", Vehicular Technology Conference, 2009. VTC Spring 2009. IEEE 69th, Date: Apr. 26-29, 2009, pp. 1-5.

H. Harada, "Research and development on cognitive and software radio technologies—Devices and hardware platform-" General assembly of URSI, Aug. 2008., 4pp.

A. Mody et al., "A Survey of IEEE Standards Supporting Cognitive Radio and Dynamic Spectrum Access" IEEE, 978-1-4244-2677-5/08, pp. 1-7.

R. Venkatesha Prasad et al., "Cognitive Functionality in Next Generation Wireless Networks: Standardization Efforts", IEEE Communications Magazine, Apr. 2008, pp. 72-78.

International Search Report for International Application No. PCT/FI2012/050522 mailed Sep. 25, 2012.

Mark Cummings, "Perspectives on Architecture for IEEE 802.191.1", Nov. 11, 2010, pp. 1-15.

S. Filin et al., "P802.19.1 General Architecture," IEEE 802.19-10-00007, Jan. 16, 2010, pp. 1-9.

Minnie Ingersoll, "White Spaces Database," IEEE 802.19-09-/0047r0, Jul. 16, 2009, pp. 1-23.

Paine et al., "WhiteSpace Coexistence Use Cases", IEEE P802.19 Wireless Coexistence, IEEE 802.19-09/26r4, Jul. 16, 2009, pp. 1-14.

Chen Sun et al., "TVWS Coexistence Use Cases", IEEE 802.19 DCN 19-10-0008-01-0000, pp. 1-14.

U.S. Appl. No. 12/815,620, filed Jun. 15, 2010, Junell et al.
U.S. Appl. No. 13/019,615, filed Feb. 2, 2011, Junell et al.
U.S. Appl. No. 13/006,857, filed Jan. 14, 2011, Junell et al.
U.S. Appl. No. 13/006,802, filed Jan. 14, 2011, Junell et al.
U.S. Appl. No. 12/875,183, filed Sep. 3, 2010, Junell et al.
U.S. Appl. No. 13/041,613, filed Mar. 7, 2011, Kasslin et al.
U.S. Appl. No. 12/915,141, filed Oct. 29, 2010, Kasslin et al.
U.S. Appl. No. 12/915,154, filed Oct. 29, 2010, Kasslin et al.
U.S. Appl. No. 13/100,734, filed May 5, 2011, Jari Junell.
U.S. Appl. No. 13/184,643, filed Jul. 18, 2011, Kasslin et al.

Ruuska P. et al. "P802.19 System Architecture", IEEE Mentor, IEEE Standards Association, doc.: IEEE 802.19-10/46r3, Mar. 17, 2010, [online], [retrieved on Dec. 1, 2011]. Retrieved from the Internet: <URL: https://mentor.ieee.org/802.19/documents>.

Harada et al., "Research, Development, and Standards Related Activities on Dynamic Spectrum Access and cognitive Radio", New Frontiers in Dynamic Spectrum, 2010 IEEE Symposium on 20100406, IEEE, Piscataway, NJ, USA.

Akyildiz I. et al., "Next Generation/Dynamic Spectrum Access/Cognitive Radio Wireless Networks: A survey", Sep. 15, 2006, Elsevier Science Publishers B.V., Amsterdam, NL, ISSN 1389-1286, pp. 2127-2159.

J. Junell, et al.; IEEE P802.19, Wireless Coexistence, Proposal on coexistence system services and protocols; Nov. 7, 2010, XP002681996; pp. 1-46.

J. Junell, et al.; Coexistence for unlicensed spectrum users in white spaces; Applied Sciences in Biomedical and Communication Technologies (ISABEL); 3rd International Symposium on, IEEE; Nov. 7, 2010, pp. 1-5.

Extended European Search Report dated Aug. 30, 2012 for EP Application No. 12162039.7-1525.

* cited by examiner

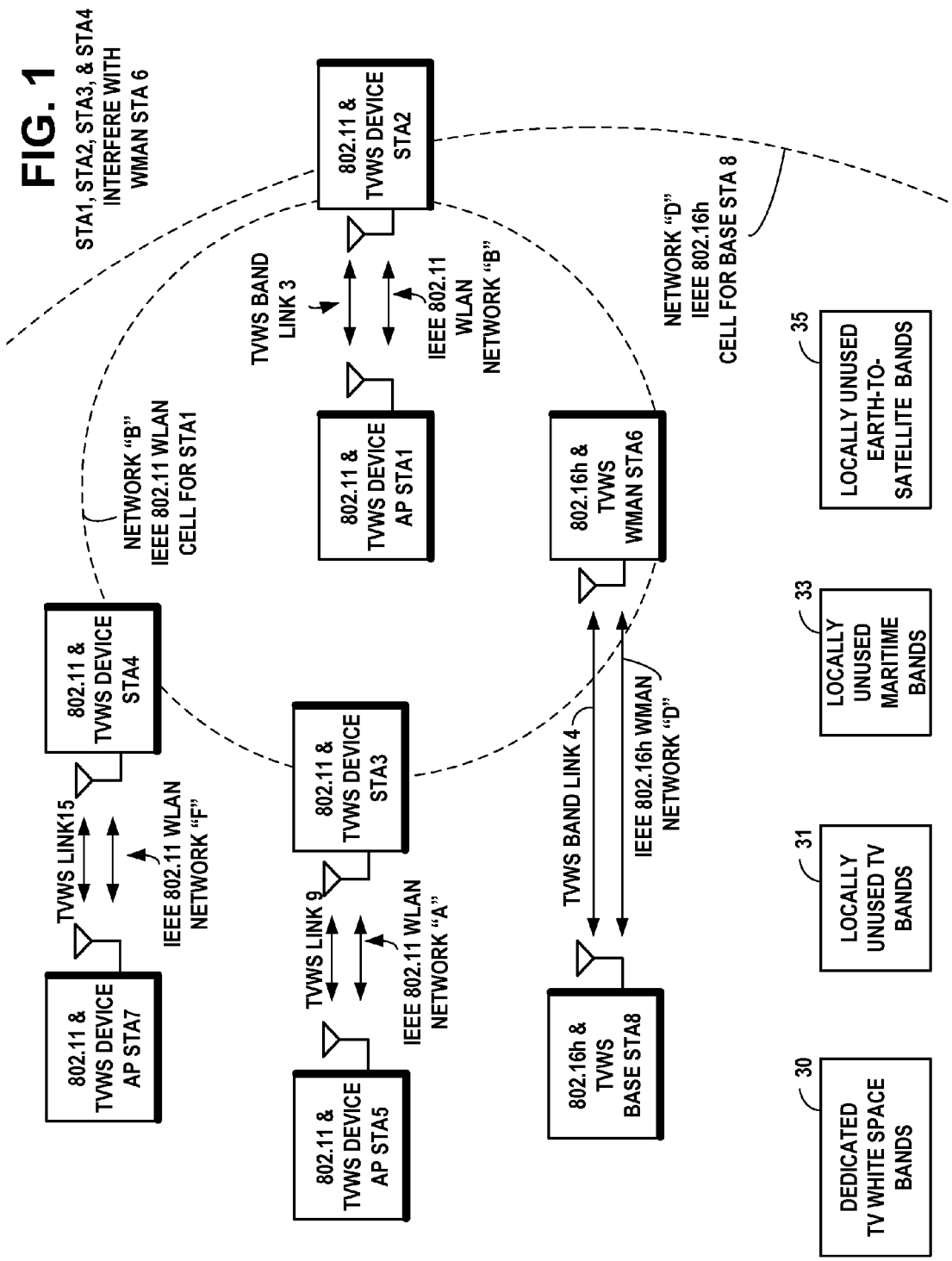

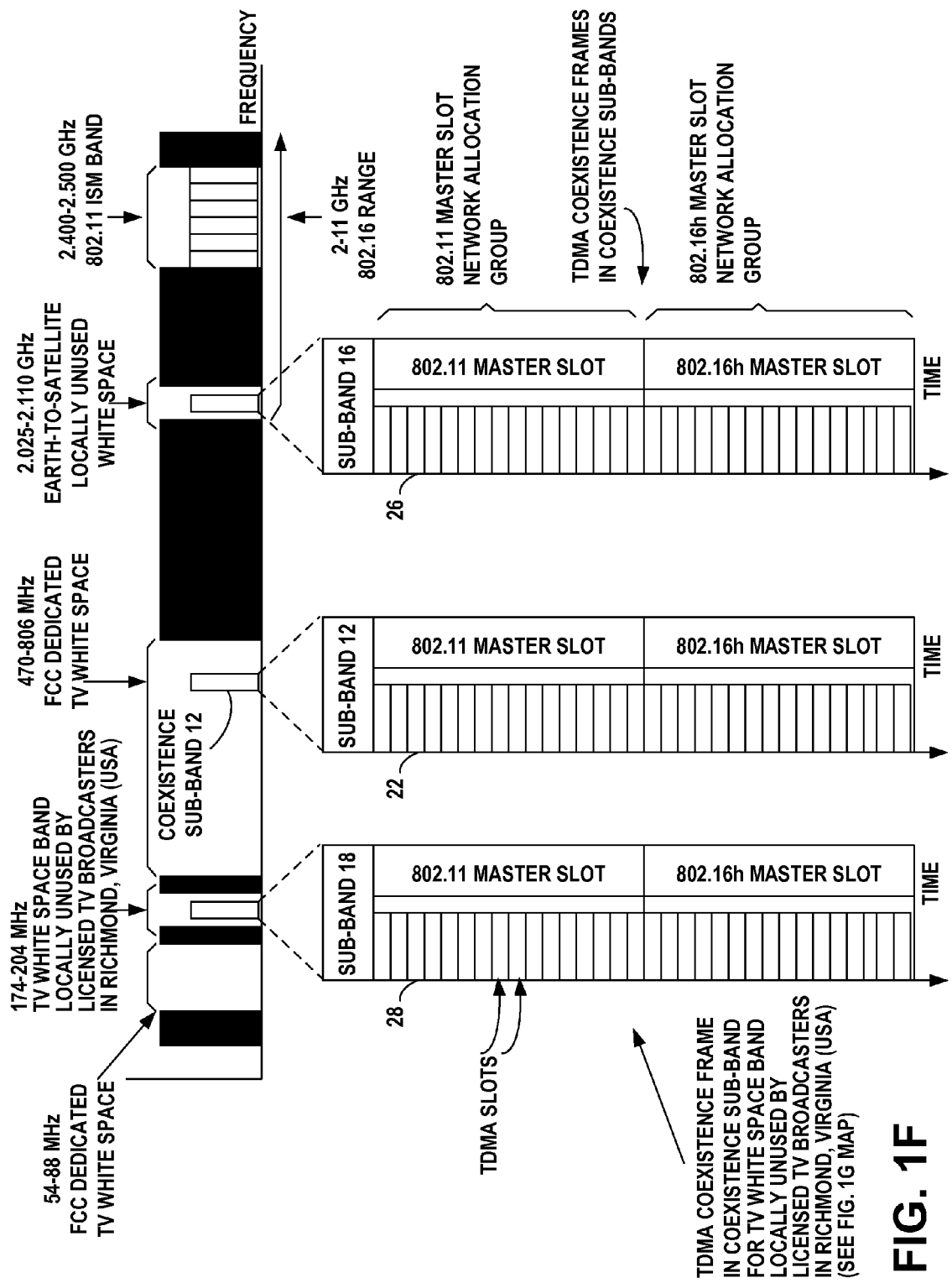

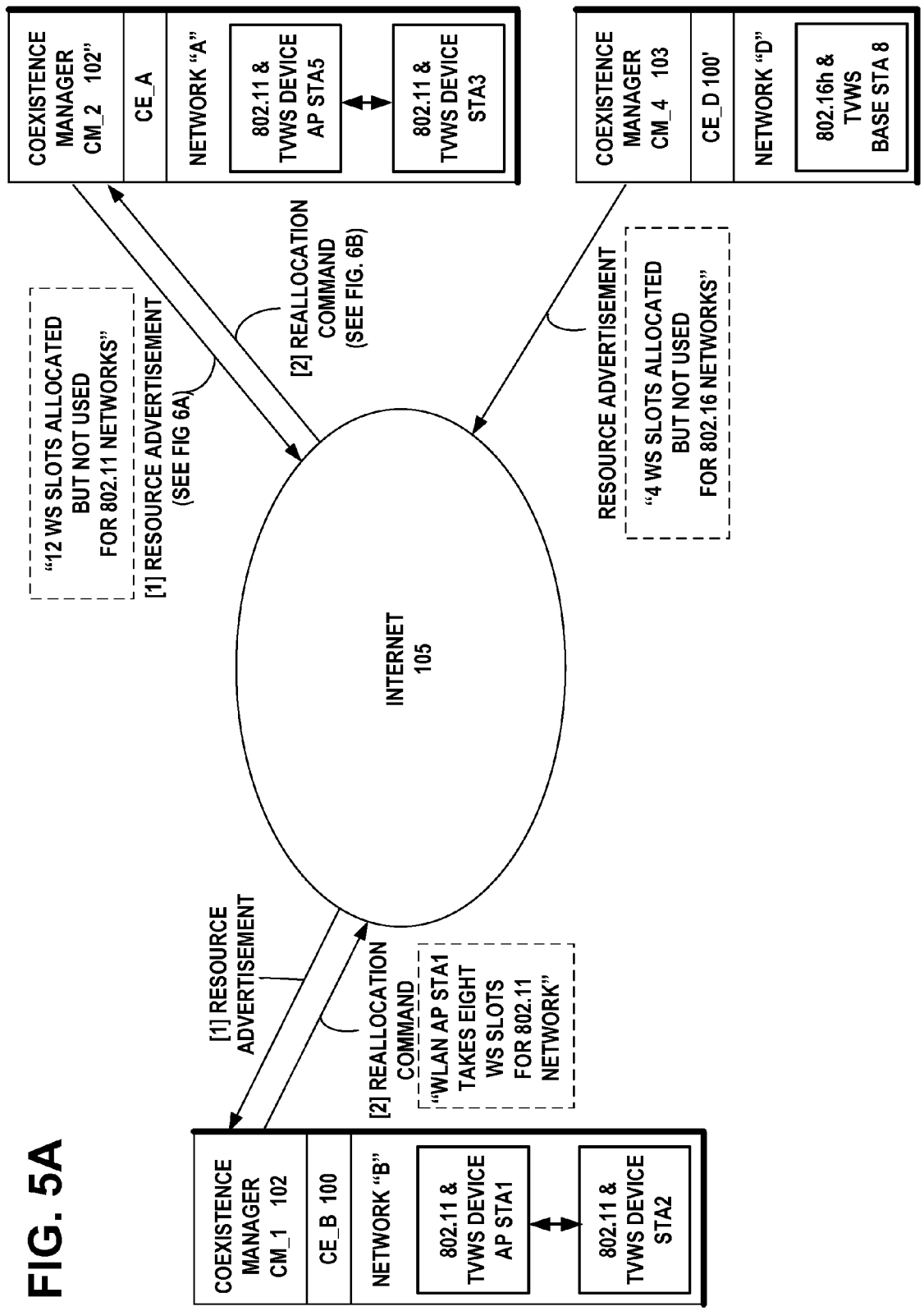

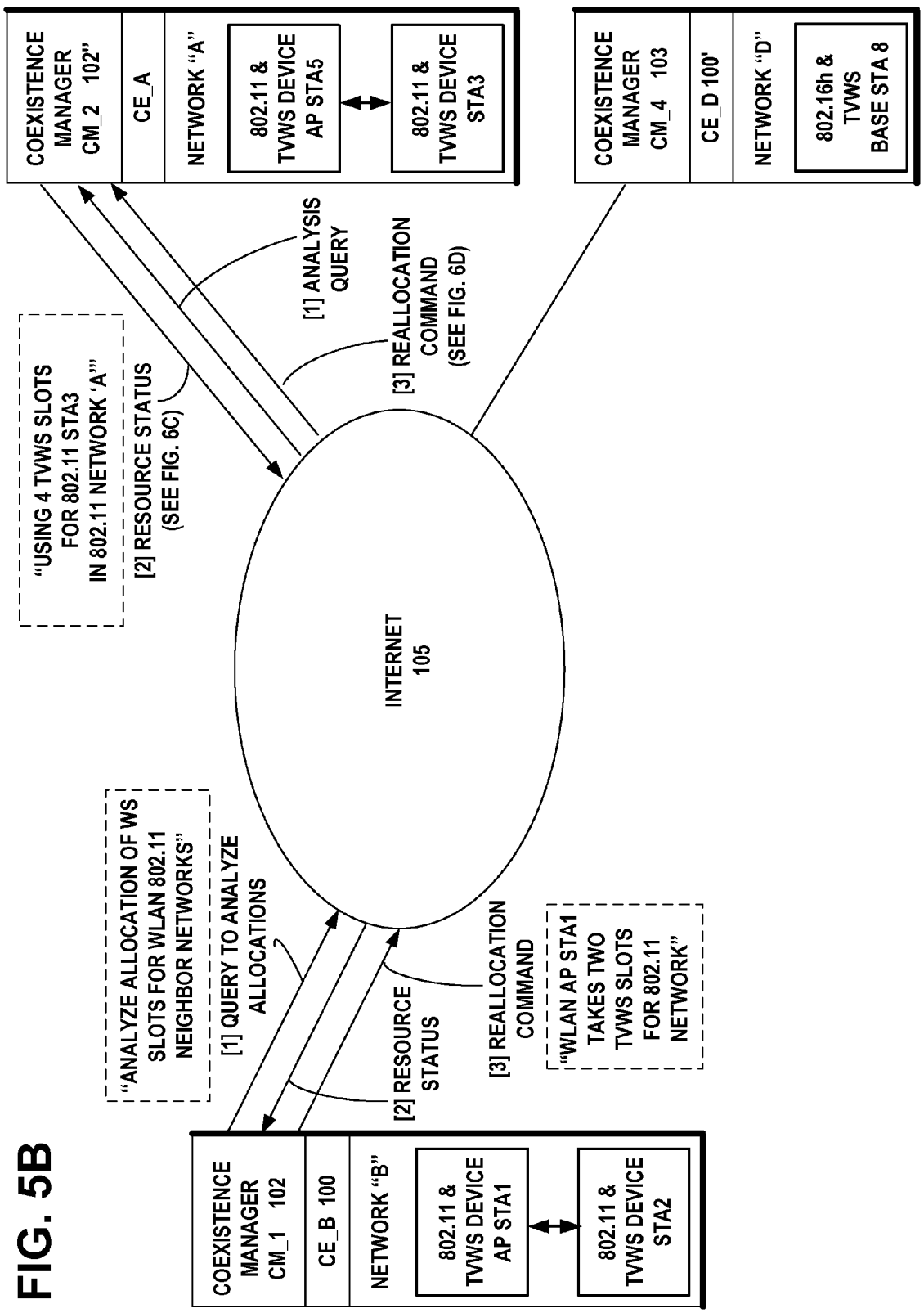

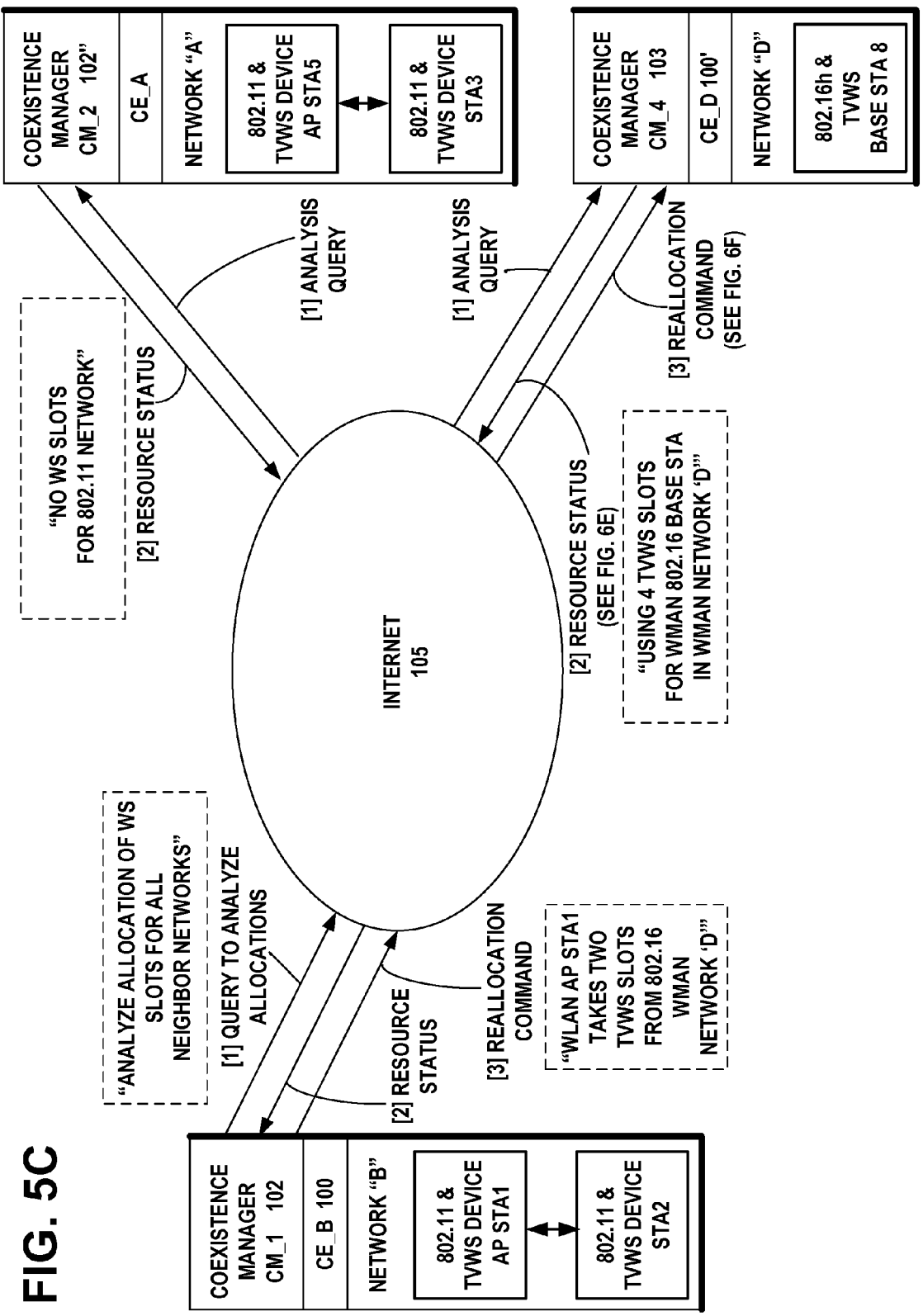

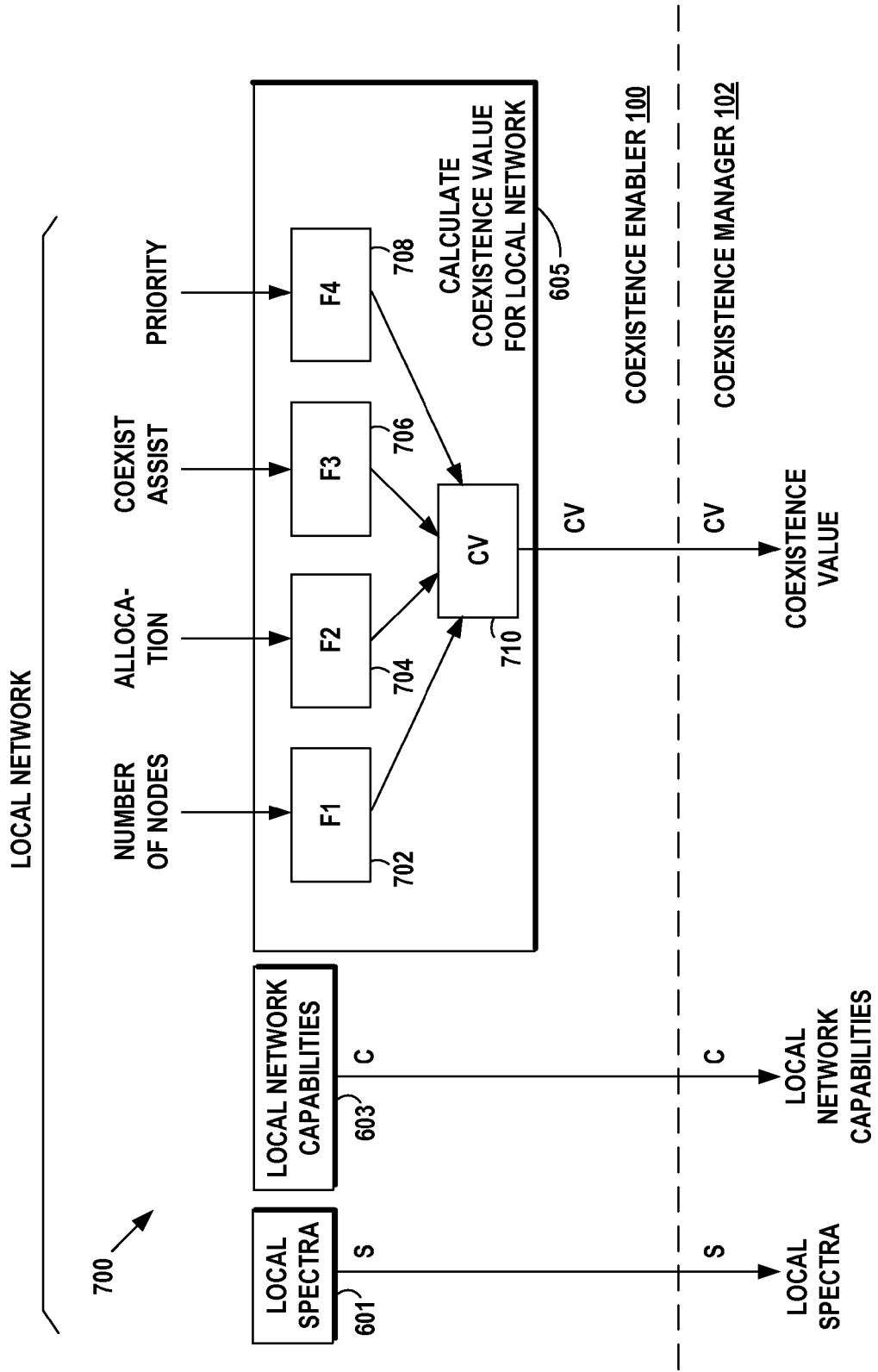

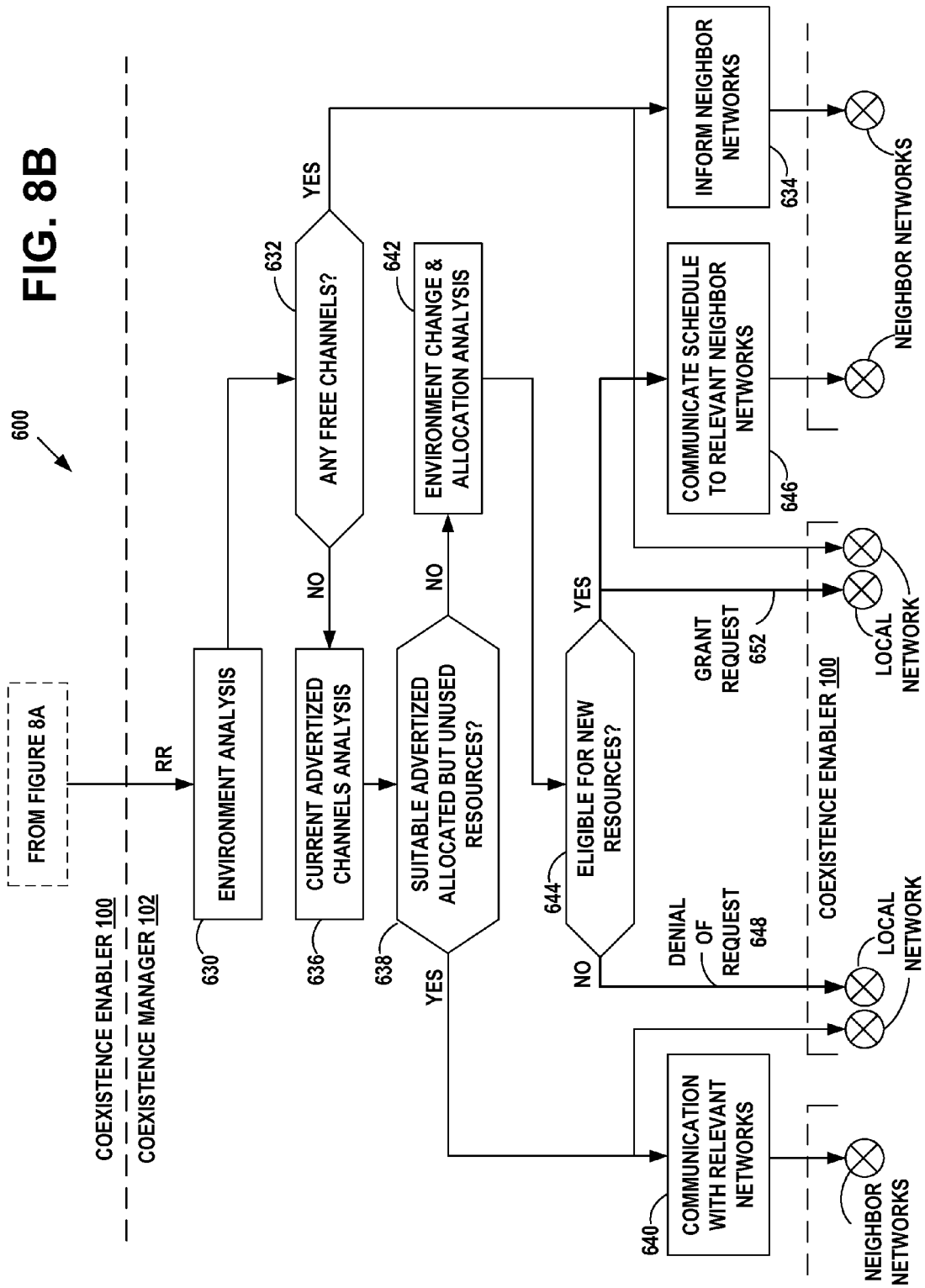

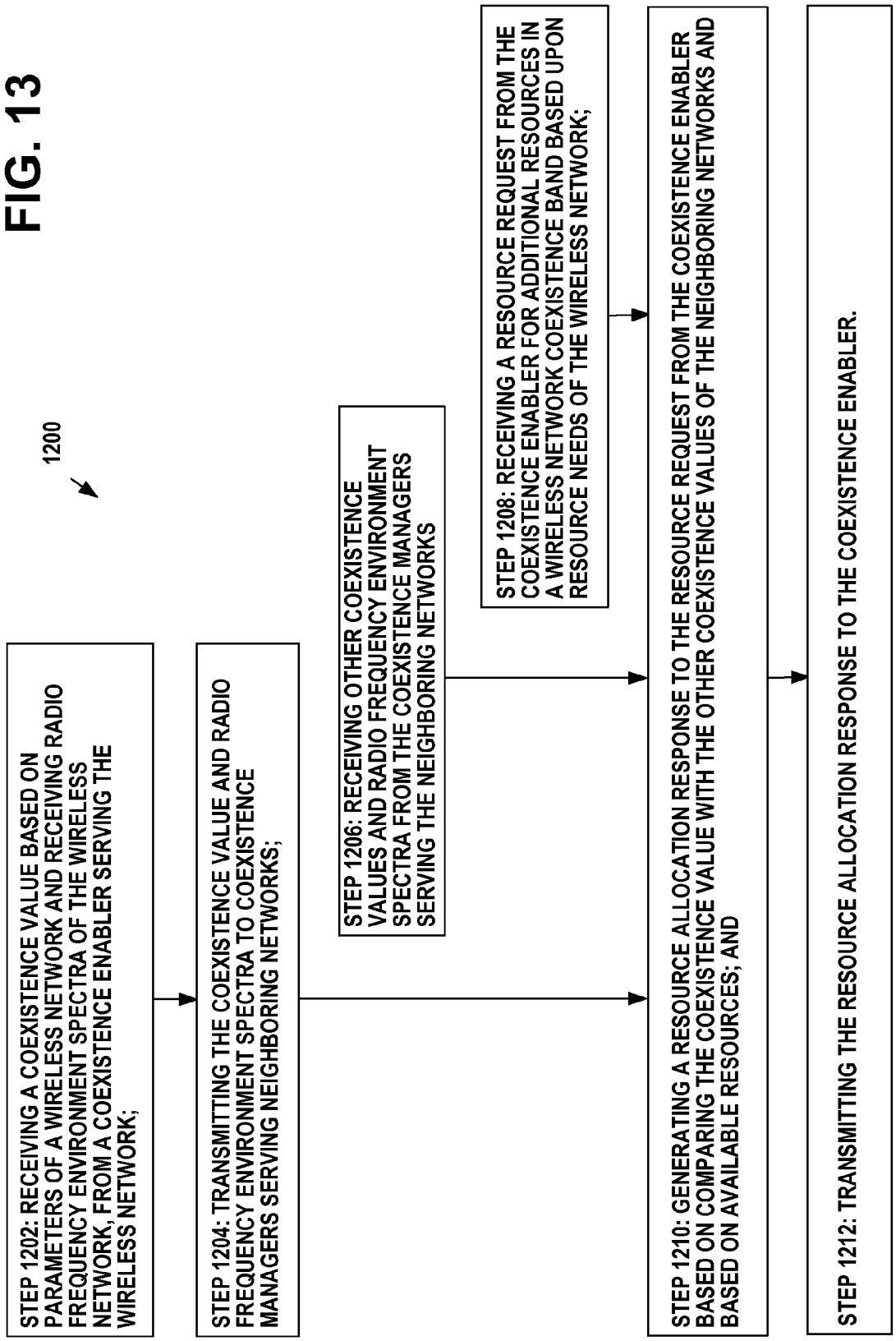

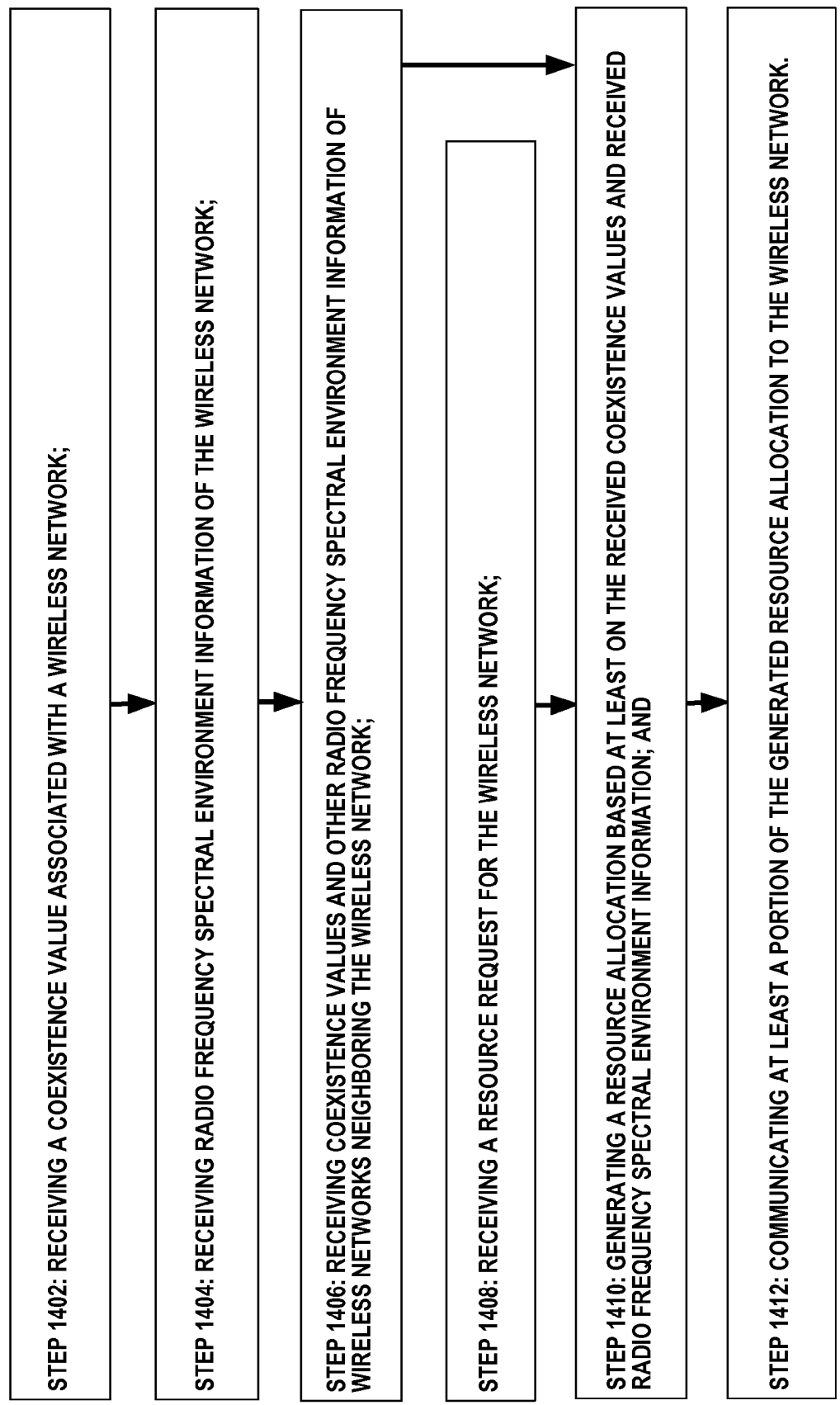

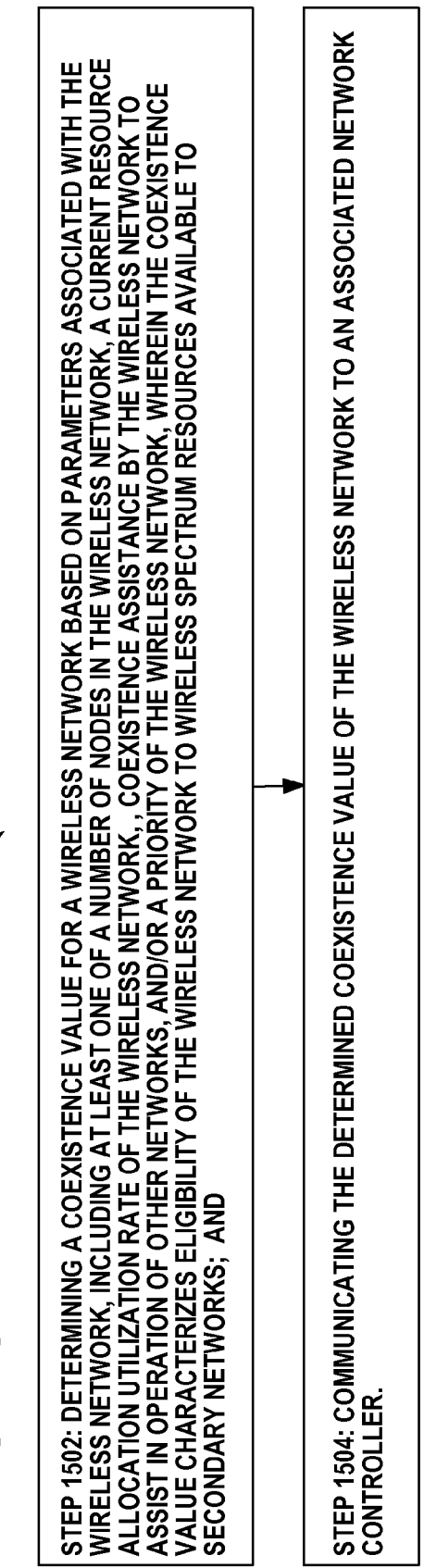

FIG. 15

STEP 1502: DETERMINING A COEXISTENCE VALUE FOR A WIRELESS NETWORK BASED ON PARAMETERS ASSOCIATED WITH THE WIRELESS NETWORK, INCLUDING AT LEAST ONE OF A NUMBER OF NODES IN THE WIRELESS NETWORK, A CURRENT RESOURCE ALLOCATION UTILIZATION RATE OF THE WIRELESS NETWORK, , COEXISTENCE ASSISTANCE BY THE WIRELESS NETWORK TO ASSIST IN OPERATION OF OTHER NETWORKS, AND/OR A PRIORITY OF THE WIRELESS NETWORK, WHEREIN THE COEXISTENCE VALUE CHARACTERIZES ELIGIBILITY OF THE WIRELESS NETWORK TO WIRELESS SPECTRUM RESOURCES AVAILABLE TO SECONDARY NETWORKS; AND

STEP 1504: COMMUNICATING THE DETERMINED COEXISTENCE VALUE OF THE WIRELESS NETWORK TO AN ASSOCIATED NETWORK CONTROLLER.

METHOD FOR GENERATING A COEXISTENCE VALUE TO DEFINE FAIR RESOURCE SHARE BETWEEN SECONDARY NETWORKS

FIELD

The field of the invention relates to radio coexistence concepts and the utilization RF spectrum to provide for wireless resource sharing between heterogeneous wireless networks to enable coexistence of secondary networks.

BACKGROUND

Use of radio frequency bands of the electromagnetic spectrum is regulated by governments in most countries, by allocating specific frequency bands to particular types of uses, such as licensed bands for commercial radio and television broadcasting, cellular telephony, maritime radio, police, fire, and public safety radio, GPS, radio astronomy, earth stations for satellite communications, and many other uses. Governments also allocate unlicensed bands, for example, for Wireless Regional Area Network (WRAN) broadband access for rural areas and wireless local area networks (WLAN) and wireless personal area networks (WPAN), such as the industrial, scientific, and medical (ISM) band.

In the United States, the Federal Communications Commission (FCC) regulates use of the radio spectrum, including radio and television broadcasting. Frequencies are allocated according to a bandplan in which guard bands are assigned between the allocated radio bands to avoid interference between adjacent signals. There are also unassigned frequency bands in the spectrum that either have never been used or have become free as a result of changes in technology. The unassigned frequency bands and guard bands are referred to as white spaces.

TV white space may be broadly defined as broadcast television spectrum that is unused by licensed services. There are at least two categories of TV white space: [1] Dedicated TV white space is a portion of the spectrum that the FCC has reallocated to unlicensed use from previously analog broadcast usage, and [2] Locally unused spectrum by licensed TV broadcasters in a geographic area.

[1] Dedicated TV white space: In the United States, the FCC has dedicated approximately 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

[2] Locally unused spectrum by licensed TV broadcasters: The FCC has adopted rules to allow unlicensed radio transmitters to operate in the broadcast television spectrum at locations where that spectrum is not being used by licensed broadcasters. The FCC required the use of geolocation to establish the location of the unlicensed transmitter and a database of TV bands use by licensed broadcasters organized by their geographic coverage areas, to enable the unlicensed transmitter to know where local TV band white spaces may be available. The FCC required the use of spectrum sensors in the unlicensed transmitter to detect the presence of the incumbent, primary TV broadcaster's signal in the local TV band white space to enable the unlicensed transmitter to immediately relinquish using the band. A primary user in such a local TV band white space would be an incumbent TV broadcaster licensed to operate in that band, but in those geographic areas where there are no licensed incumbent TV broadcasters in operation, other unlicensed secondary users may make use of that band.

Other RF spectrum white spaces may be locally unused in certain geographic areas, such as the frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused RF spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band.

SUMMARY

Method, apparatus, and computer program product embodiments are disclosed for generating a coexistence value for wireless resource sharing between heterogeneous wireless networks to enable coexistence of secondary networks.

An example embodiment of the invention includes a method, comprising the steps of:

determining a coexistence value for a wireless network based on parameters associated with the wireless network, including at least one of a number of nodes in the wireless network, a current resource allocation utilization rate of the wireless network, coexistence assistance by the wireless network to assist in operation of other networks, and/or a priority of the wireless network, wherein the coexistence value characterizes eligibility of the wireless network to wireless spectrum resources available to secondary networks; and communicating the determined coexistence value of the wireless network to an associated network controller.

An example embodiment of the invention includes an apparatus, comprising:

at least one processor;

at least one memory including computer program code;

the at least one memory and the computer program code configured to, with the at least one processor, cause the coexistence manager at least to:

at least one processor;

at least one memory including computer program code;

the at least one memory and the computer program code configured to, with the at least one processor, cause the coexistence manager at least to:

determine a coexistence value for a wireless network based on parameters associated with the wireless network, including at least one of a number of nodes in the wireless network, a current resource allocation utilization rate of the wireless network, coexistence assistance by the wireless network to assist in operation of other networks, and/or a priority of the wireless network, wherein the coexistence value characterizes eligibility of the wireless network to wireless spectrum resources available to secondary networks; and cause to communicate the determined coexistence value of the wireless network to an associated network controller.

An example embodiment of the invention includes a computer program product comprising computer executable program code recorded on a computer readable storage medium, the computer executable program code comprising:

code for determining a coexistence value for a wireless network based on parameters associated with the wireless network, including at least one of a number of nodes in the wireless network, a current resource allocation utilization rate of the wireless network, coexistence assistance by the wireless network to assist in operation of other networks, and/or a priority of the wireless network, wherein the coexistence value characterizes eligibility of the wireless network to wireless spectrum resources available to secondary networks; and code for communicating the determined coexistence value of the wireless network to an associated network controller.

The resulting embodiments provide for generating a coexistence value for wireless resource sharing on a fair basis between heterogeneous wireless networks to enable coexistence in a TV white space band.

DESCRIPTION OF THE FIGURES

FIG. 1 is an example system architecture diagram according to an embodiment of the present invention, illustrating a wireless metropolitan area network's coverage area overlapped by a wireless local area network and the reallocation of channels from the wireless local area network to the TV band white space.

FIG. 1F is an example frequency band diagram illustrating an example TDMA coexistence frame 28 in sub-band 18 in the TV band white space locally unused by licensed TV broadcasters in the 174-204 MHz band, representing broadcast TV channels 7, 8, 9, 10, and 11 in the Richmond, Va. (USA) area, an example TDMA coexistence frame 22 in sub-band 12 in the FCC dedicated TV band white space of 470-806 MHz, and an example TDMA coexistence frame 26 in sub-band 16 in the earth station-to-satellite locally unused white space band 2.025 GHz to 2.110 GHz, according to an embodiment of the present invention.

FIG. 5A is an example network diagram according to an embodiment of the present invention, illustrating an example of communicating by the network controller or coexistence manager 102, with one or more coexistence managers managing neighboring wireless networks, which advertise white space slots allocated but not used in a coexistence band.

FIG. 5B is an example network diagram according to an embodiment of the present invention, illustrating an example of communicating by the network controller or coexistence manager 102, with one or more coexistence managers managing neighboring wireless networks belonging to a same network allocation group as the coexistence manager, to analyze the allocation of white space slots for neighbor networks in the same network allocation group.

FIG. 5C is an example network diagram according to an embodiment of the present invention, illustrating an example of communicating by the network controller or coexistence manager 102, with all of its coexistence managers managing neighboring wireless networks, to analyze the allocation of white space slots for all neighbor networks.

FIG. 7B is an example functional block diagram of an example embodiment of the apparatus of FIG. 7A, illustrating more detail of apparatus for calculating the coexistence value of the wireless network, according to an embodiment of the present invention.

FIG. 13 is an example flow diagram of operational steps in the network controller or coexistence manager, for receiving a coexistence value, receiving coexistence values from other coexistence managers serving neighboring networks, independently receiving a resource request, and sending a response to the resource request, for wireless resource sharing on a fair basis between heterogeneous wireless networks to enable coexistence in a TV band white space, according to an embodiment of the present invention.

FIG. 14 is an example flow diagram of operational steps in the network controller or coexistence manager for providing for wireless resource sharing on a fair basis between heterogeneous wireless networks to enable coexistence in a TV band white space, according to an embodiment of the present invention.

FIG. 15 is an example flow diagram of operational steps in the control node or coexistence enabler for providing coexistence values for wireless resource sharing on a fair basis between heterogeneous wireless networks to enable coexistence in a TV band white space, according to an embodiment of the present invention.

DISCUSSION OF EXAMPLE EMBODIMENTS OF THE INVENTION

Figure 1A:
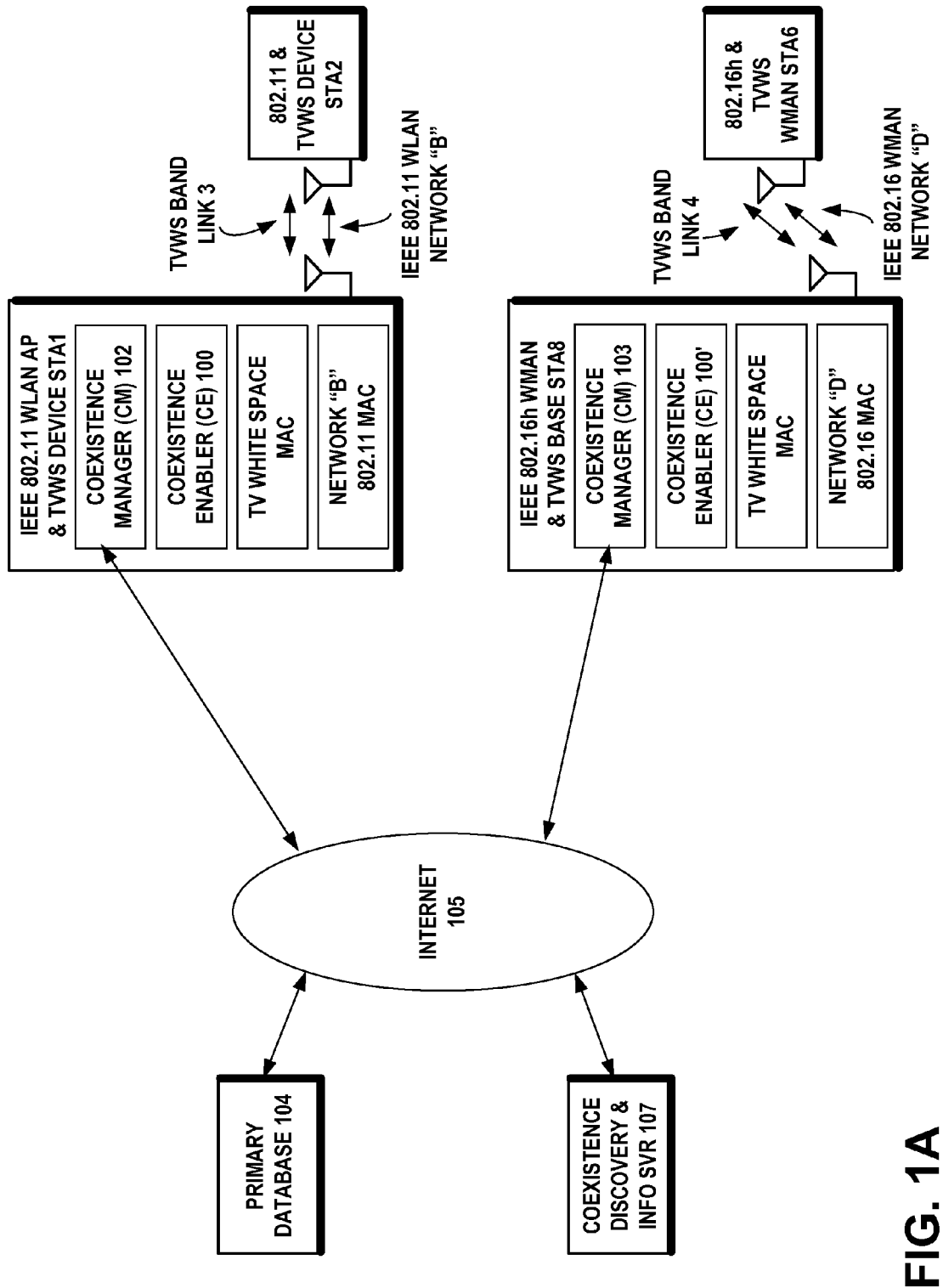
FIG. 1A is an example system architecture according to an embodiment of the present invention, illustrating an example relationship between the network controller or coexistence manager, the primary database, and the coexistence network element Coexistence Discovery & Info Server (CDIS). A network of distributed coexistence managers may communicate with one another over the Internet, in an example embodiment of the invention.

In the United States, the FCC has opened up 300 MHz to 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

Coexistence standards are currently being developed to enable two or more independently operated wireless networks or devices using any radio technologies adapted for TV white space frequency bands, to access the same TV white space frequency band in the same location without mutual interference.

The IEEE 802.19 Working Group is currently defining coexistence rules for heterogeneous secondary networks. An example embodiment of the invention enables coexistence between heterogeneous secondary networks and coexistence between secondary networks and primary networks that are required to be protected. Primary networks and users are incumbent users of the selected frequency band that have a form of priority access to the band. Primary networks include networks operating in FCC licensed bands, such as for commercial radio and television broadcasting. Secondary networks and users are allowed to use the selected band only if there are resources that are not used by the primary users. Secondary networks include any broadband networks operating unlicensed in the TV white spaces (TVWS) and using transmission devices that comply with the FCC requirements for TV Band Devices (TVBDs). Fixed TVBD devices must include geo-location and query a database to determine allowed channels. Portable TVBD devices must be able to access geo-location data and include a spectrum sensing capability to identify TV and wireless microphone signals.

The FCC has adopted rules to allow unlicensed radio transmitters to operate in the broadcast television spectrum at locations where that spectrum is not being used by licensed broadcasters. The FCC required the use of geolocation to establish the location of the unlicensed transmitter and a database of TV bands use by licensed broadcasters organized by their geographic coverage areas, to enable the unlicensed transmitter to know where local TV band white spaces may be available. The FCC required the use of spectrum sensors in the unlicensed transmitter to detect the presence of the incumbent, primary TV broadcaster's signal in the local TV band white space to enable the unlicensed transmitter to immediately relinquish using the band. A primary user in such a local TV band white space would be an incumbent TV broadcaster licensed to operate in that band, but in those geographic areas where there are no licensed incumbent TV broadcasters in operation, other unlicensed secondary users may make use of that band.

Other RF spectrum white spaces may be locally unused in certain geographic areas, such as the frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused RF spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band.

Active coexistence between secondary networks using the TV band white spaces may require new techniques for fairly sharing the available bandwidth among different heterogeneous secondary networks and accord the required preference for primary users of the band. Such new techniques may require some form of communication between the secondary networks to enable a fair usage of the local spectrum. An example embodiment of the invention provides a means for a secondary network that requires additional resources, to evaluate what may be a fair spectrum resource allocation between secondary networks in the same area. Based on the result of the evaluation, a requesting secondary network may either start communicating using the additional resources or terminate the resource request process without further communication to its neighbors if there is no fair way to get more resources. An example embodiment of the invention provides a starting point for secondary network internal evaluation process to define a fair share of resources to each secondary network, taking into account that on an average, each node pair in the secondary network should potentially get the same amount of resources.

An example embodiment of the invention applies coexistence rules to enable heterogeneous secondary networks to share available resources in a fair manner and not cause harmful interference to primary networks. An example embodiment of the invention enables the dynamic allocation in TV white spaces (TVWS), of different networks with different standards in different available channel situations. An example embodiment of the invention determines whether the allocation analysis needs to be applied to all real neighbors.

An example embodiment of the invention is disclosed for independent wireless resource sharing on a fair basis to enable selecting the most suitable coexistence between wireless networks.

An example embodiment of the invention includes a hierarchical resource request process that enables reallocation of radio resources in a coexistence band. When new resources are requested by a network, a search is made for free resources in the coexistence band. If this does not succeed, a check is made for any allocated but unused resources in the coexistence band that have been advertised by neighboring networks in the same network allocation group. If there are insufficient advertised resources, then the allocation of resources in neighboring networks is analyzed and compared with the requesting network's need for network resources. There are two graduated stages to the analysis. In an example light analysis stage, an analysis of the allocation of resources is limited to neighboring networks within the same network allocation group as the requesting networks. In a more extensive analysis stage, all of the neighboring networks are analyzed. In this manner, a more complete resource reallocation may be achieved.

An example embodiment of the invention includes the steps to check if there is a free channel or if there are enough advertised resources. The order of these two steps may be reversed and optionally, either one of these two steps may be skipped.

An example embodiment of the invention includes a resource reallocation that enables heterogeneous and unlicensed spectrum users to agree and negotiate on spectrum use to better coexist with each other.

Depending on the wireless environment state, including whether there have been any major changes in the local area of a wireless network after a previous resource allocation, the network needing more resources may initiate either a light resource request process directed only to the networks in the same network allocation group or a more extensive resource request process directed to all networks within interference range. This selective possibility brings more stability to environment when resource needs are varying.

According to at least one embodiment of the present invention, independent wireless resource sharing is achieved on a fair basis to enable selecting the most suitable coexistence between wireless networks.

Radio resource allocations may be changed when a network sees a clear need for a reallocation from its perspective. Each network has a view of its own and its real neighbors' allocations and environmental state based on spectrum mapping, for example. This information may be one of several factors in performing the radio resource allocation analysis.

FIG. 1 is an example system architecture diagram according to an embodiment of the present invention, illustrating the coverage of an IEEE 802.16h wireless metropolitan area network (WMAN) cell overlapped by an IEEE 802.11 wireless local area network (WLAN) cell. An IEEE 802.16h WMAN STA 6 exchanges wireless broadband messages with an IEEE 802.16h WMAN base station 8 in a WMAN network "D". The WLAN access point STA1 exchanges wireless broadband messages with an IEEE 802.11 client device STA2, such as a personal computer over the WLAN network "B". Both IEEE 802.11 WLAN access point STA1 and the IEEE 802.11 client device STA2 interfere with the IEEE 802.16h WMAN STA 6. For example, WLAN devices are typically designed for better resistance to saturation than WMAN devices, since WMAN devices must be more sensitive to attenuated signals received over a greater range than are WLAN devices and are therefore more sensitive to interference. Both the WLAN access point STA1 and IEEE 802.11 client device STA2 are TV white space (TVWS) devices, meaning that they are equipped to communicate over the dedicated TV band white space 30. Similarly, the IEEE 802.16h WMAN STA 6 and the IEEE 802.16h WMAN base station 8 are TV white space (TVWS) devices, meaning that they are equipped to communicate over the dedicated TV band white space 30. Thus, the interference of the IEEE 802.16h WMAN STA 6 by both the IEEE 802.11 WLAN access point STA1 and the IEEE 802.11 client device STA2 may be ameliorated by reallocating the IEEE 802.11 frames from the WLAN network "B" to the TV band white space link 3. The dedicated TV band white space 30 may be shared by many terminals using diverse communication protocols. For example, if the WMAN network "D" reaches its maximum capacity, the traffic congestion may be alleviated by reallocating the IEEE 802.16h frames from the WMAN network "D" to the TV band white space link 4. A third device, STA3, is present in the 802.11 WLAN cell of STA1, as part of a neighboring network "A" with 802.11 AP STA5. STA3 is also a TV white space (TVWS) device and has reallocated frames on TVWS link 9 communicating over the dedicated TV band white space 30. A fourth device, STA4, is present in the 802.11 WLAN cell of STA1, as part of a neighboring network "F" with 802.11 AP STAT. STA4 is also a TV white space (TVWS) device and has reallocated frames on TVWS link 15 communicating over the dedicated TV band white space 30.

Other network topologies may make use of example embodiments of the invention, for example more heterogeneous networks, each of which has an Internet connection that they may use first for neighboring network discovery.

FIG. 1 also shows three example white space bands locally unused by licensed primary users of their respective RF spectrum white spaces, which may be used by the WLAN access point STA1 or client device STA2, operating as unlicensed secondary users. TV band white space 31 is locally unused by licensed TV broadcasters. Maritime radio band 33 is locally unused by licensed maritime band radios. Earth station-to-satellite radio band 35 is locally unused by licensed earth station radios. An example of a TV band white space 31 locally unused by licensed TV broadcasters is the 174-204 MHz band, representing the local absence of broadcast VHF TV channels 7, 8, 9, 10, and 11. If there were a local absence of licensed broadcasters in TV band white space 31, on VHF TV channels 7, 8, 9, 10, and 11, which would otherwise interfere with the WLAN access point STA1 or client device STA2, then they could operate as unlicensed secondary users and make use of TV band white space 31. If either STA1 or STA2 were to detect a signal transmitted from a neighboring TV broadcaster in band 31, then they would have to relinquish their use of the TV band white space 31 and make a resource request, in accordance with an example embodiment of the invention.

A maritime radio operates in a number of licensed frequency allocations and is a primary user in the maritime radio band 33. If there were no licensed maritime radios in operation that would interfere with the WLAN access point STA1 or client device STA2, then they could operate as unlicensed secondary users and make use of maritime radio band 33. If either STA1 or STA2 were to detect a signal transmitted from a neighboring maritime radio, then they would have to relinquish their use of the maritime band 33 and make a resource request, in accordance with example embodiments of the invention.

A satellite earth station transmits to satellites in licensed frequency allocations from 2.025 GHz to 2.110 GHz and is a primary user in the earth-to-satellite band 35. If there were no licensed earth station radios in operation that would interfere with the WLAN access point STA1 or client device STA2, then they could operate as unlicensed secondary users and make use of earth-to-satellite radio band 35. If either STA1 or STA2 were to detect a signal transmitted from a neighboring earth station radio, then they would have to relinquish their use of the earth-to-satellite band 35 and make a resource request, in accordance with example embodiments of the invention.

FIG. 1A is an example system architecture according to an embodiment of the present invention, illustrating an example relationship between a network controller or coexistence manager, a primary database, and a coexistence network element Coexistence Discovery & Info Server (CDIS). A network of distributed coexistence managers 102 and 103 may communicate with one another over the Internet, in an example embodiment of the invention. According to this example embodiment, the control node or coexistence enabler 100 in the IEEE 802.11 WLAN access point STA1 for a Network "B" is collocated with the TVWS coexistence manager 102. The coexistence enabler 100' in the IEEE 802.16h WMAN base STA8 for a Network "D" is collocated with the TVWS coexistence manager 103. The distributed coexistence managers 102 and 103 may communicate over the Internet with the TVWS primary database 104 and the TVWS coexistence network element Coexistence Discovery & Info Server (CDIS) 107, in an example embodiment of the invention.

If there has been a major change in the network neighborhood after a previous resource allocation, resulting in there being not enough free or advertised resources are available to satisfy the requirements of Network "B", the coexistence enabler 100 and coexistence manager 102 may initiate a resource reallocation process. The resource reallocation process may be either a light resource request process directed only to the networks in the same network allocation group or a more extensive resource request process directed to all networks within interference range. This graduated analysis brings more stability to the network environment when resource needs are varying. Example steps in requesting a reallocation of resources are:

coexistence enabler 100 identifies excess resource need because of:
        Internal request
        Coexistence communication trigger
    coexistence enabler 100 sends a Resource Request to its coexistence manager 102.
    coexistence manager 102 analyses environment situation using
        Spectrum map (a separate process to keep updated)
    coexistence manager 102 determines resource allocation process
        More extensive: change in number of available channels for secondary users or in number of secondary networks
        Light: other cases
    coexistence manager 102 initiates resource allocation if coexistence enabler 100 is eligible or other suitable free resources available.

Examples of a network allocation group include self-coexistence scenarios where two systems (a base station or access point and the associated mobile station or STA) use the same technology and may share a frequency channel. For example, an IEEE 802.11 WLAN may coexist with another IEEE 802.11 WLAN in sharing a TV band white space, if both systems use the same physical layer (PHY) technology and channel width. In another example, an IEEE 802.16h WMAN coexists with another IEEE 802.16h WMAN in sharing a TV band white space.

Other examples of a network allocation group include different IEEE 802 network technologies that may be time division multiplexed based on the IEEE 802.16h draft standard and are synchronized with a GPS clock or IEEE 1588 or IETF network time protocol clocks.

Neighboring networks may be identified to a local network, for example, by a coexistence manager transmitting a request to a server via an Internet connection. This request may inquire as to whether other networks are located proximate to the local network in an operational environment. The server may return information to the coexistence manager via the Internet informing the coexistence manager of the proximately-located networks.

The information provided by the server to the coexistence manager may comprise Internet addresses corresponding to potential coexistence enablers or coexistence managers that are managing wireless networks in the same operational environment as the local network. The coexistence manager uses these addresses to contact at least some of the coexistence managers of the potential networks via the Internet in order to request communication configuration and test information. The other networks may respond to these requests, and the coexistence manager may use the communication received configuration and test information to select a group of candidate networks. Candidate networks may be selected based on, for example, the distance from the local network to a potential network, transmission properties (e.g., transmission power of potential networks), etc. Information needed for candidate selection may be provided by potential networks to the local network or the coexistence manager via an Internet connection.

The local network may then initiate testing the group of candidate networks. Testing may comprise transmitting one or more wireless signals that should be receivable by the candidate networks. The coexistence manager may utilize testing results to select real neighbor networks from the group of candidate networks.

In an example embodiment of the invention, FIG. 1A shows the relationship between the control node or coexistence enabler 100 and the network controller or coexistence manager 102 in the TV white space (TVWS) WLAN access point STA1 and the distributed coexistence manager 103 in the TVWS base STAB. The coexistence enabler 100 has to obtain information required for coexistence from a traffic network or device representing it. This includes configuration and control of measurements. Also, the coexistence enabler 100 has to provide reconfiguration commands and control information to the Network "B" or the WLAN access point STA1, corresponding to coexisting decisions received from coexistence managers 102 and 103, respectively. The coexistence manager 102 is responsible for discovery of Coexistence Managers (CM)s 103 managing neighboring wireless networks, for example, and coexistence related information may be exchanged with them. The coexistence manager 102 o 103 has the needed information to make decisions of resource sharing among the Coexistence Managers (CM)s managing neighboring wireless networks.

The example system architecture of FIG. 1A shows the coexistence enabler 100 and coexistence manager 102 in the TV white space WLAN access point STA1 for a Network "B". In the example shown, the TV white space (TVWS) WLAN access point STA1 includes a coexistence enabler 100 and coexistence manager 102, and is serving as an access point for the TVWS wireless device STA2 in the Network "B", which may be, for example, an IEEE 802.11 WLAN. The IEEE 802.16h WMAN base STA 8 is also a TV white space (TVWS) wireless device and includes a coexistence enabler 100' and coexistence manager 103, and communicates with the WMAN STA 6. IEEE 802.16h WMAN base station 8 is in the WMAN network "D", which may be, for example, an IEEE 802.16h WMAN. The coexistence manager 102 handles resource requests from the coexistence enabler 100 in STA1. The coexistence manager 103 handles resource requests from the coexistence enabler 100' in base STA 8. The TV white space (TVWS) WLAN access point STA1 in the Network "B" includes a Network "B" MAC and PHY to communicate over the Network "B". The IEEE 802.16h WMAN base STA 8 in the Network "D", includes a Network "D" MAC and PHY to communicate over the Network "D". Each TV white space (TVWS) wireless devices STA1 in the Network "B" and STA 6 in the Network "D", includes a TV white spaces MAC and PHY to communicate in channels in the TV white spaces band reallocated by the coexistence manager 102 and 103, respectively, without mutual interference. The coexistence enablers 100 and 100' in STA1 and in base STA 8 send resource requests to the respective coexistence managers 102 and 103.

The example system architecture of FIG. 1A shows the coexistence manager 102 receiving a resource request from the coexistence enabler 100 in TV white space (TVWS) WLAN access point STA1. The coexistence manager 102 has received Spectrum sensing results and network parameters from the coexistence enabler 100 in device STA1. Network parameters may include specific user requirements (user load, QoS, priority, etc), aggregate spectral efficiency, etiquette (first come, first served, etc.), and user or network policies. The coexistence manager 102 accesses the primary database 104 to obtain available secondary channels in the TV band white space. The coexistence manager 102 accesses the coexistence network element Coexistence Discovery & Info Server (CDIS) 107 to obtain Potential neighbor networks' addresses. The coexistence manager 102 processes this data in conjunction with Spectrum maps, Operational parameters, and Time base sync, to determine a resource reallocation for the coexistence enabler 100 in device STA1. The coexistence manager 102 then sends to the coexistence enabler 100 in device STA1 the resource reallocation, including Operational parameters, Quiet period parameters, Spectrum sensing strategy, and Time base sync. The coexistence enabler 100 in device STA1 then controls the medium access control (MAC) to communicate in channels in the TV white spaces band reallocated by the coexistence manager 102, without interference from other networks sharing the same white space channels. A similar operation may be carried our by the coexistence manager 103 in conjunction with the coexistence enabler 100' in base STA 8. A network of distributed coexistence managers 102 and 103 may communicate with one another over the Internet 105.

Figure 1B:
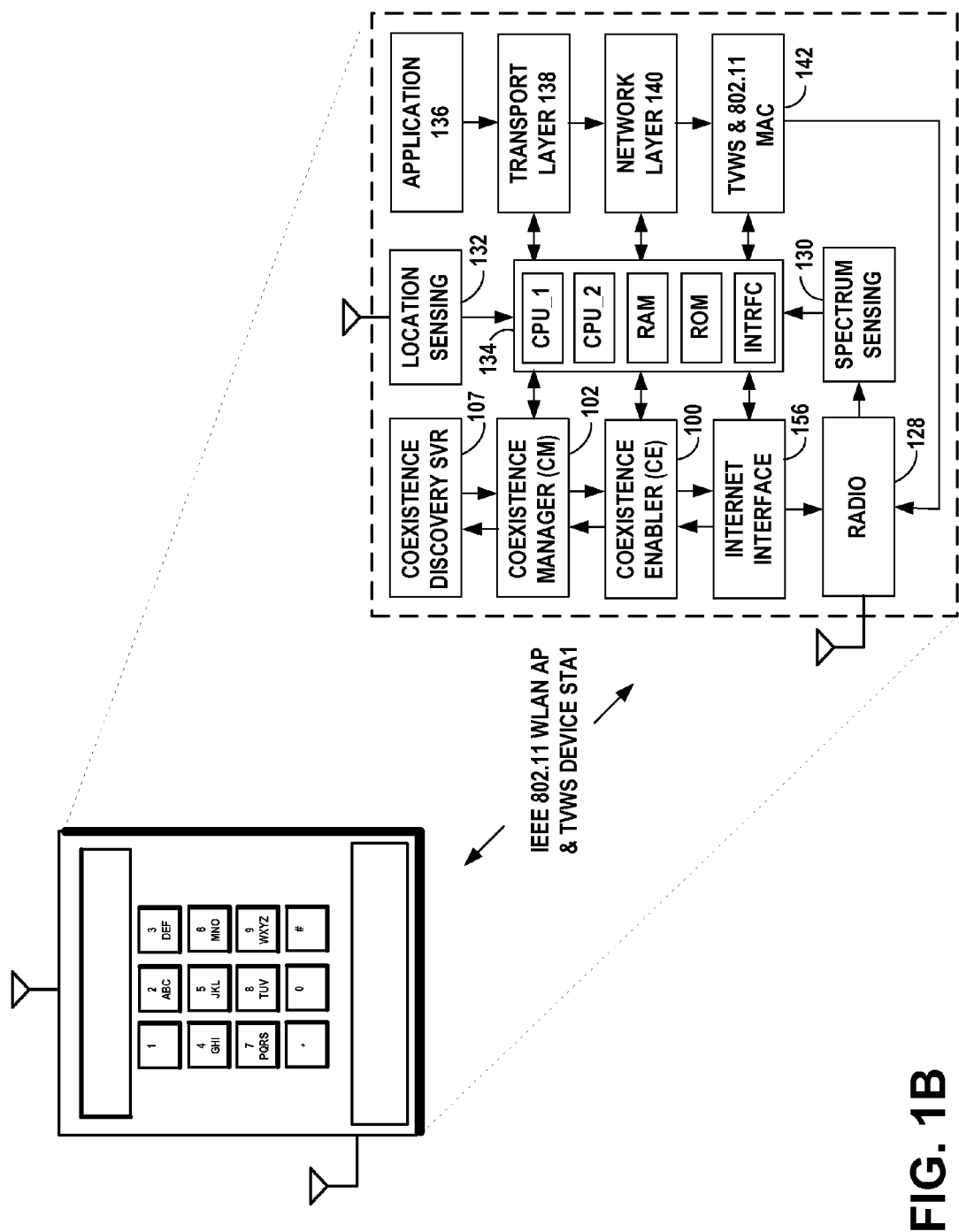
FIG. 1B is an example functional block diagram according to an embodiment of the present invention, illustrating an example TV white space wireless device including the network controller or coexistence manager and the control node or coexistence enabler for a network. The device may be configured to operate in additional RF spectrum white space bands wherein there are no primary user radios operating in the neighboring wireless networks.

FIG. 1B is an example functional block diagram according to an embodiment of the present invention, illustrating an example TV white space WLAN access point STA1 including the control node or coexistence enabler 100 for Network "B" and network controller or coexistence manager 102. The example device STA1 includes a protocol stack for Network "B", including the radio 128 and the Network "B" IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example device STA1 includes a processor 134 that includes a dual core central processing unit CPU_1 and CPU_2, a RAM memory, a ROM memory, and an interface for a keypad, display, and other input/output devices. A location sensor 134, such as a GPS is included to establish the geographic location of the device STA1, and the location of the STA1 is reported to the network controller or coexistence manager 102. The coexistence enabler 100 sends resource requests to the coexistence manager 102. The MAC 142 includes integrated TV white space features to communicate using the radio 128 in channels in the TV white spaces band reallocated by the coexistence manager 102, without mutual interference. The spectrum sensor 130 senses the electromagnetic environment of the STA1 and reports it to the coexistence manager 102.

Control node according to an embodiment of the present invention, such as the CE 100 obtains information required for coexistence from TV Band Device (TVBD) network or device. This includes configuration and control of measurements performed by TVBD network or device. The CE forwards the collected information to its associated network controller, such as CM 102. The information may be formatted in standard format. Also, the CE provides reconfiguration commands and control information to TVBD network or device, corresponding to coexisting decisions received from the associated CM. The CE may reside in a TVBD device, e.g. in access point, base station, or mesh point. There is one CE in a network. It may collect the information from the other network nodes using radio standard specific means.

A network controller, such as the CM 102 is responsible for making the decisions on the spectrum resource sharing, discovery of other CMs controlling neighboring networks and coexistence related information exchange with them. The CM may serve one or more networks. It collects information from associated networks and configures it via a control node of a wireless network, such as CE 100. The CM may also obtain information from the TVWS database. From the collected information the CM constructs the spectrum map for the network, and calculates the amount of resources for which the network is eligible in the current spectrum environment. The information is used in spectrum allocation. The CM commands its CE(s) 100 based on the decisions it and its neighboring CMs have made. It is optional whether there is a hierarchy between CMs. The CM may reside in a TVBD device, or in the network.

The Coexistence Discovery and Information Server (CDIS) 107 assists the CMs 102 to discover possible coexistence conflicts of the networks it controls, and to discover the CMs with which the conflicts may be solved. The CDIS supports the discovery of CMs by keeping a record of the existing CMs and location of the networks they control. It provides a list of potential neighboring CMs for the CMs controlling new or moving networks. Such CDIS server is needed for discovering neighboring networks, because all the networks are not expected to support the same radio connectivity and thus cannot discover each other directly over the radio interface. The CDIS may have other functions like storing more information of each CM, statistics of the spectrum use, or providing common Quiet Period for spectrum sensing. The CDIS may also use the information of primary users due to an optional interface to TVWS database. The CDIS 107 may reside in a TVBD device, or in the network.

The interface circuits in FIG. 1B may interface with one or more radio transceivers, battery and other power sources, key pad, touch screen, display, microphone, speakers, ear pieces, camera or other imaging devices, etc. The RAM and ROM may be removable memory devices such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices, or in the form of program logic transmitted over any transmitting medium which transmits such a program. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

Figure 1C:
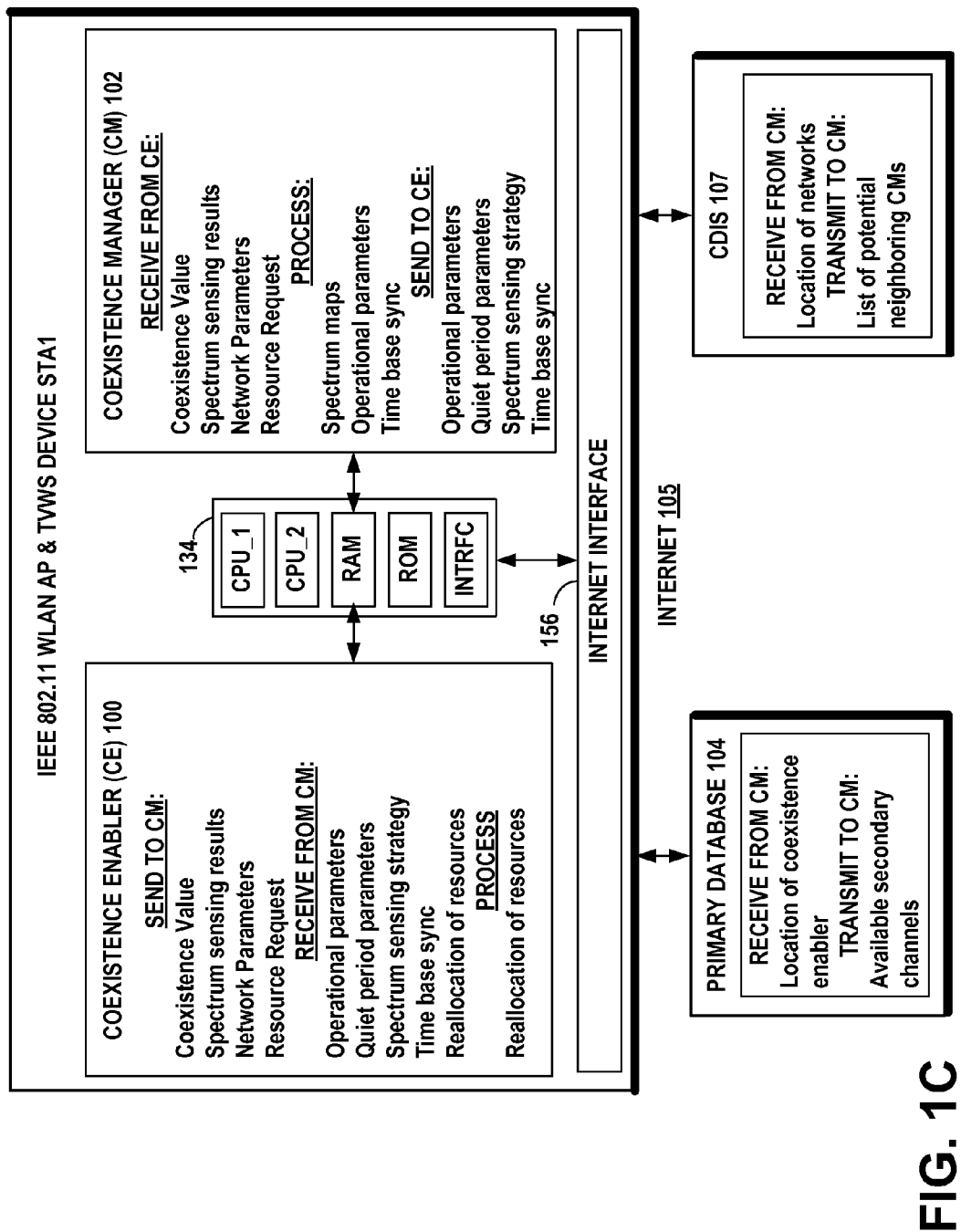
FIG. 1C is an example functional block diagram according to an embodiment of the present invention, illustrating the IEEE 802.11 WLAN AP and TVWS device STA1, which includes the network controller or coexistence manager and the control node or coexistence enabler, communicating over the Internet with the primary database and the coexistence network element Coexistence Discovery & Info Server (CDIS).

FIG. 1C is an example functional block diagram according to an embodiment of the present invention, illustrating the IEEE 802.11 WLAN AP & TVWS device STA1 that includes both the network controller or coexistence manager 102 and the control node or coexistence enabler 100. The coexistence manager 102 communicates with the primary database 104 and the coexistence network element Coexistence Discovery & Info Server (CDIS) 107 via the Internet interface 156. The coexistence manager 102 accesses the primary database 104 to obtain available secondary channels in the TV band white space. The coexistence manager 102 accesses the coexistence network element Coexistence Discovery & Info Server (CDIS) 107 to obtain Potential neighbor networks' addresses. The coexistence manager 102 sends resource reallocation messages to the coexistence enabler 100. The example coexistence manager 102 includes a processor 154 that includes a dual core central processing unit CPU_1 and CPU_2, a RAM memory, a ROM memory, and an interface for input/output devices. The database interface 156 provides the interface to the primary database 104 and the coexistence network element Coexistence Discovery & Info Server (CDIS) 107. The CDIS 107 may reside in the STA1 device, or in the network.

The interface circuits in FIG. 1C may interface with one or more radio transceivers, battery and other power sources, key pad, touch screen, display, microphone, speakers, ear pieces, camera or other imaging devices, etc. The RAM and ROM may be removable memory devices such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of an example embodiment of the invention. The program logic may be delivered to the writeable RAM, PROMS, flash memory devices, etc. of the coexistence enabler from a computer program product or article of manufacture in the form of computer-usable media such as resident memory devices, smart cards or other removable memory devices, or in the form of program logic transmitted over any transmitting medium which transmits such a program. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

In an example embodiment of the invention, in a first process the Coexistence Enabler (CE) 100 calculates the CoexistenceValue (CV) from some parameters of the network under it, for example the IEEE 802.11 WLAN NETWORK "B". The CE 100 will transmit a CV value to its CM 102, which will further share it with other CMs of all neighboring networks. In an example embodiment of the invention, in a second process, the CE 100 will transmit its network capabilities to its CM 102, which will share them with the same other CMs of all neighboring networks. In an example embodiment of the invention, in a third process, the spectrum map creation process is performed by the CM 102 from the information received from the CE 100, the primary database 104 and information from the CMs of neighboring networks. The information of these three processes is used when the CE 100 identifies an excess resource need in its network and sends a resource request (RR) containing the amount of additional resources it needs to its CM 102. Each CM 102 has received the CV, the spectrum map and the network capabilities of its own network under CE 100 and neighboring networks. The CM 102 processes the RR, and if an allocation analysis is needed, it uses the CVs of the requesting network and its neighboring networks to evaluate whether the requesting network needing more resources is eligible to for the amount of resources requested in the RR. If the network is eligible to the requested additional resources, its CM 102 will then communicate a new resources allocation to the other CMs of its neighboring networks, or else the CM 102 will inform CE 100 that the network requesting the additional resources is not eligible for the requested resources.

In an example embodiment of the invention, certain parameters provide a good and/or practical representation of the eligibility level to the spectrum resources. The CoexistenceValue (CV) has to be counted with similar methods for each network. Some candidate parameters for the CoexistenceValue include: the number of nodes per network (with particular counting method), the current allocation usage level, and the network capabilities. A particular parameter priority may be used for "tuning the eligibility" among the networks under one CM.

Figure 1D:
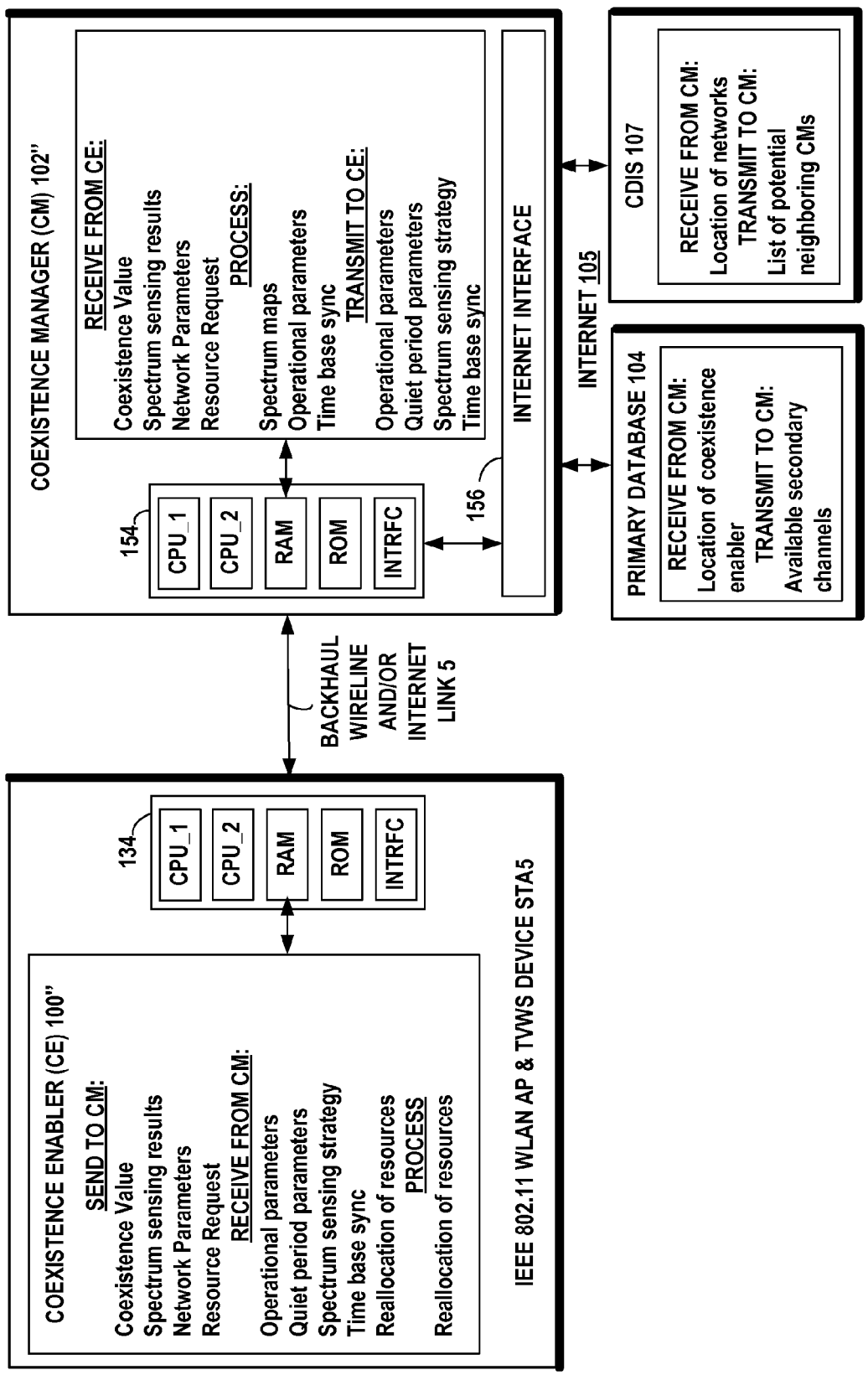
FIG. 1D is an example network diagram according to another embodiment of the present invention, illustrating the IEEE 802.11 WLAN AP and TVWS device STA5, which includes the control node or coexistence enabler, communicating over a backhaul wireline and/or internet link with the network controller or coexistence manager.

FIG. 1D is an example network diagram according to another embodiment of the present invention, illustrating the IEEE 802.11 WLAN AP and TVWS device STA5, which includes the control node or coexistence enabler 100", communicating over a backhaul wireline and/or internet link 5 with the network controller or coexistence manager 102".

Figure 1E:
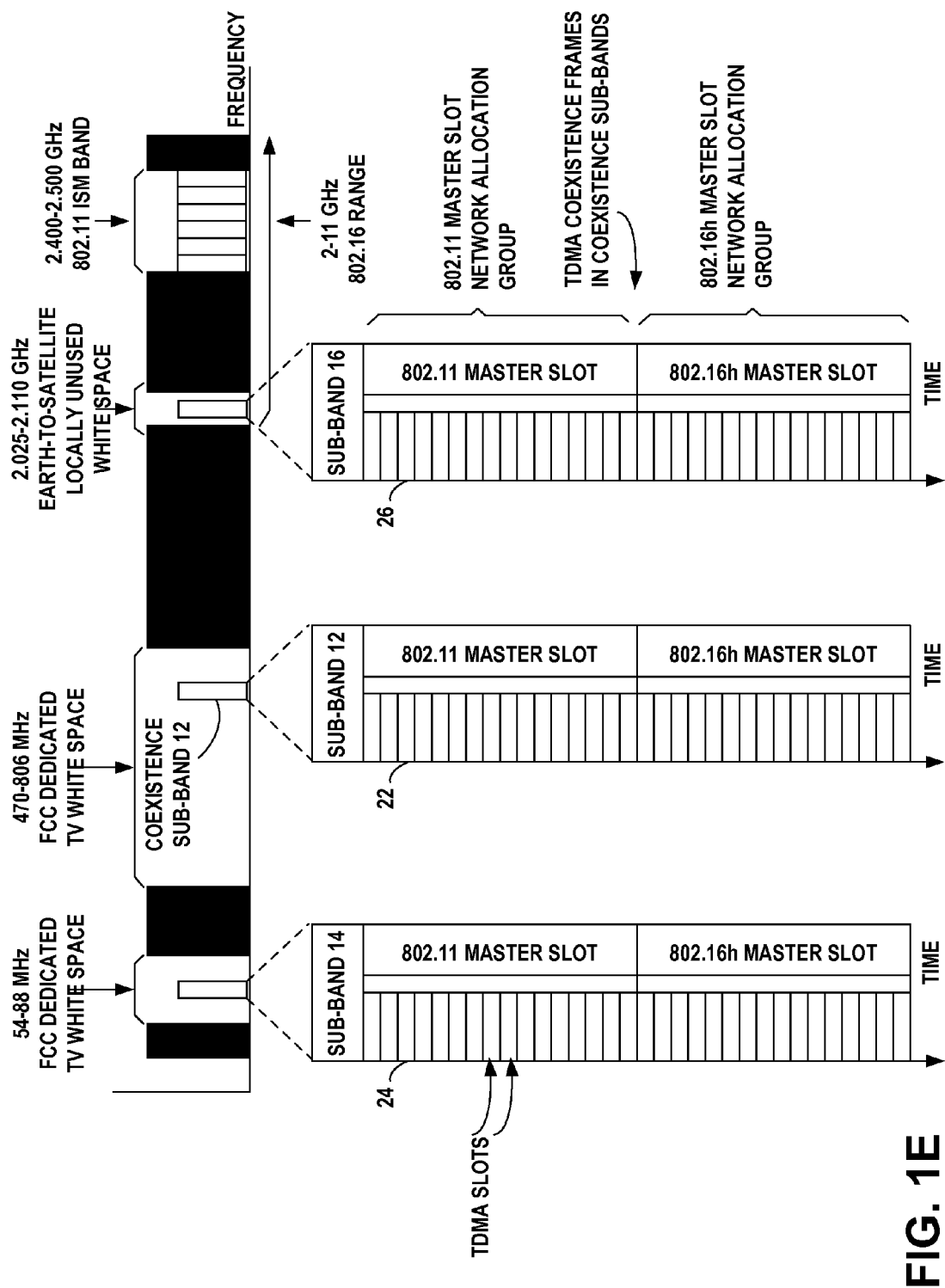
FIG. 1E is an example frequency band diagram illustrating an example TDMA coexistence frame 22 in sub-band 12 in the FCC dedicated TV band white space of 470-806 MHz, an example TDMA coexistence frame 24 in sub-band 14 in the FCC dedicated TV band white space of 54-88 MHz, and an example TDMA coexistence frame 26 in sub-band 16 in the earth station-to-satellite locally unused white space band 2.025 GHz to 2.110 GHz, according to an embodiment of the present invention.

FIG. 1E is an example frequency band diagram illustrating an example TDMA coexistence frame 22 in sub-band 12 in the FCC dedicated TV band white space of 470-806 MHz, an example TDMA coexistence frame 24 in sub-band 14 in the FCC dedicated TV band white space of 54-88 MHz, and an example TDMA coexistence frame 26 in sub-band 16 in the earth station-to-satellite locally unused white space band 2.025 GHz to 2.110 GHz, according to an embodiment of the present invention. License-exempt access to these bands as a secondary use for coexistence of networks requesting additional resources, may include restrictions on geographic location, transmission power, range, and bandwidth of the transmissions of the requesting networks.

For example, the 802.11 WLAN standards specify an OFDM-based physical layer with a bandwidth of 20 MHz channel separation. At 11 MHz from the center of the channel, the energy is approximately 20 dB lower than the maximum signal level. Further away from the centre frequency, the energy levels fall further resulting in minimal interference on adjacent channels. The TV band white spaces at 54-88 MHz and at 470-806 MHz are good candidates for coexistence of an 802.11 WLAN wireless LAN channel. The earth station-to-satellite white space band at 2.025 GHz to 2.110 GHz is a good candidate for coexistence of an 802.11 WLAN wireless LAN channel. A TV band white space locally unused by licensed TV broadcasters, for example, in the 174-204 MHz band, representing the local absence of broadcast TV channels 7, 8, 9, 10, and 11, as is the circumstance in the Richmond, Va. (USA) area, is a good candidate for coexistence of an 802.11 WLAN wireless LAN channel.

FIG. 1E shows an example of the location of the white spaces in the RF spectrum and example TDMA coexistence frames in the white space bands, showing the freely available time slots before any networks have been allocated slots. The white spaces include the FCC dedicated TV white space 54-88 MHz band, the FCC dedicated TV white space 470-806 MHz band, and locally unused the earth station-to-satellite white space band 2.025 GHz to 2.110 GHz.

There are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized network controller or coexistence manager.

The example coexistence technique illustrated here for each sub-band 12, 14, and 16, is time division multiplexing of the slots in TDMA coexistence frames allocated to different IEEE 802 technologies. The two IEEE 802 technologies chosen for this example are the IEEE 802.16h WMAN standard and the IEEE 802.11 WLAN standard. The IEEE 802.16h WMAN uses a fixed outdoor base station, such as the WMAN base station 8, serving indoor and outdoor portable clients, such as the WMAN STA 6. The IEEE 802.11 WLAN station, such as the WLAN access point STA1, may include Internet access and geo-location capability. The TDMA coexistence frame may be divided into a IEEE 802.11 master slot network allocation group and an IEEE 802.16h master slot network allocation group. The IEEE 802.11 master slot network allocation group carries twelve free IEEE 802.11 WLAN white space slots. The IEEE 802.16h master slot network allocation group carries the twelve free IEEE 802.16h WMAN white space slots.

FIG. 1F is an example frequency band diagram illustrating an example TDMA coexistence frame 28 in sub-band 18 in the TV band white space locally unused by licensed TV broadcasters in the 174-204 MHz band, representing broadcast TV channels 7, 8, 9, 10, and 11 in the Richmond, Va. (USA) area, an example TDMA coexistence frame 22 in sub-band 12 in the FCC dedicated TV band white space of 470-806 MHz, and an example TDMA coexistence frame 26 in sub-band 16 in the earth station-to-satellite locally unused white space band 2.025 GHz to 2.110 GHz, according to an embodiment of the present invention.

Figure 1G:
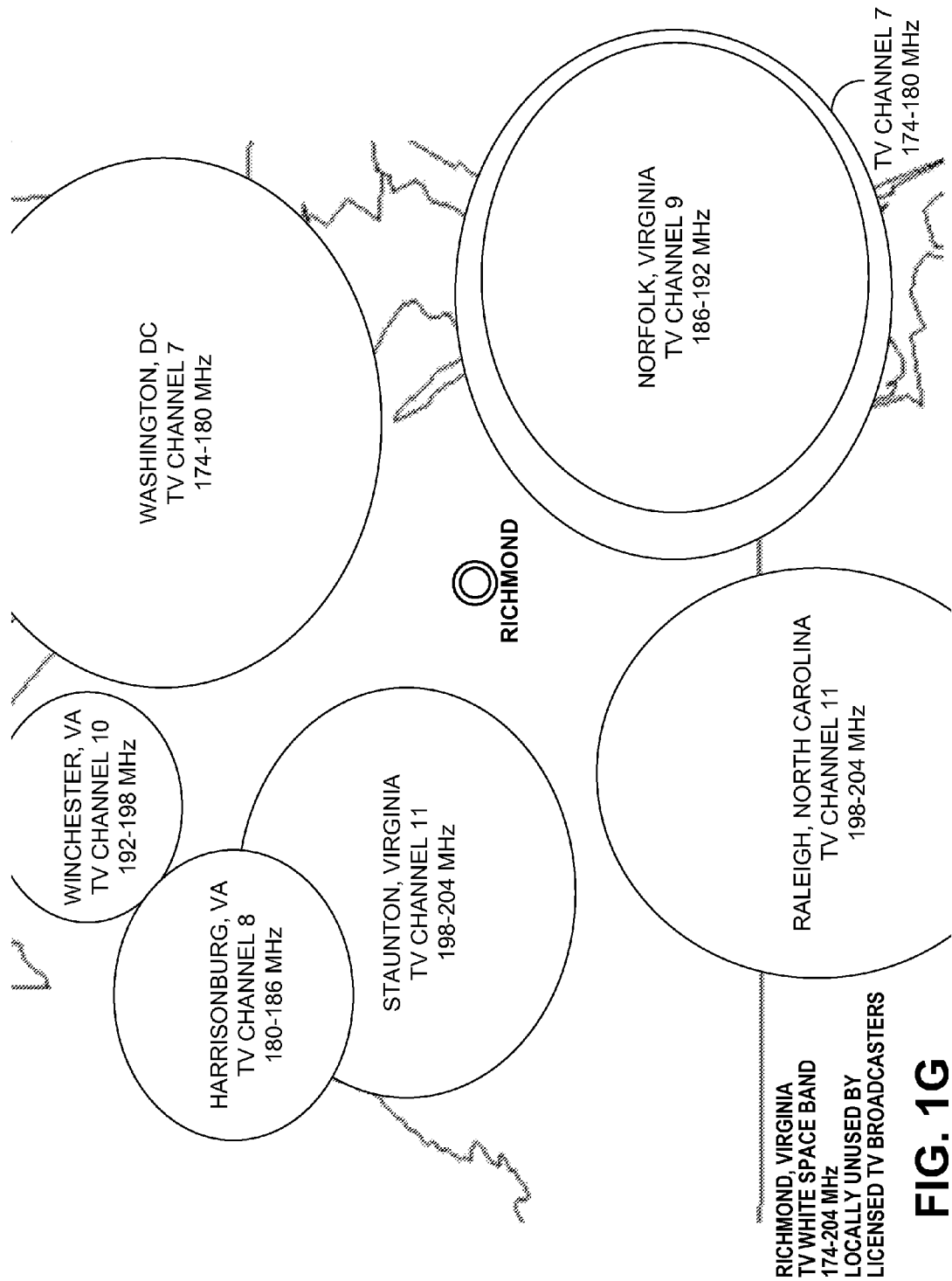
FIG. 1G is an example map of the Richmond, Va. (USA) geographic area and an overlay of coverage areas for broadcast TV channels 7, 8, 9, 10, and 11, illustrating that there is a locally available TV band white space that is unused by licensed TV broadcasters in the 174-204 MHz band.

FIG. 1G is an example map of the Richmond, Va. (USA) geographic area and an overlay of coverage areas for broadcast TV channels 7, 8, 9, 10, and 11, illustrating that there is a locally available TV band white space that is unused by licensed TV broadcasters in the 174-204 MHz band, as shown in FIG. 1F. The cities where there are TV broadcasters for TV channels 7, 8, 9, 10, and 11 in a circular area of approximately 160 kilometers in diameter surrounding the city of Richmond, Va., are shown in the following table. The map of FIG. 1G shows that there is no coverage by licensed TV broadcasters in the 174-204 MHz band, which is therefore a locally available TV band white space.

| WASHINGTON, DC | TV CHANNEL 7 | 174-180 MHz |
| NORFOLK, VIRGINIA | TV CHANNEL 7 | 174-180 MHz |
| HARRISONBURG, VA | TV CHANNEL 8 | 180-186 MHz |
| WASHINGTON, DC | TV CHANNEL 9 | 186-192 MHz |
| NORFOLK, VIRGINIA | TV CHANNEL 9 | 186-192 MHz |
| WINCHESTER, VA | TV CHANNEL 10 | 192-198 MHz |
| RALEIGH, NC | TV CHANNEL 11 | 198-204 MHz |
| STAUNTON, VIRGINIA | TV CHANNEL 11 | 198-204 MHz |

Figure 1H:
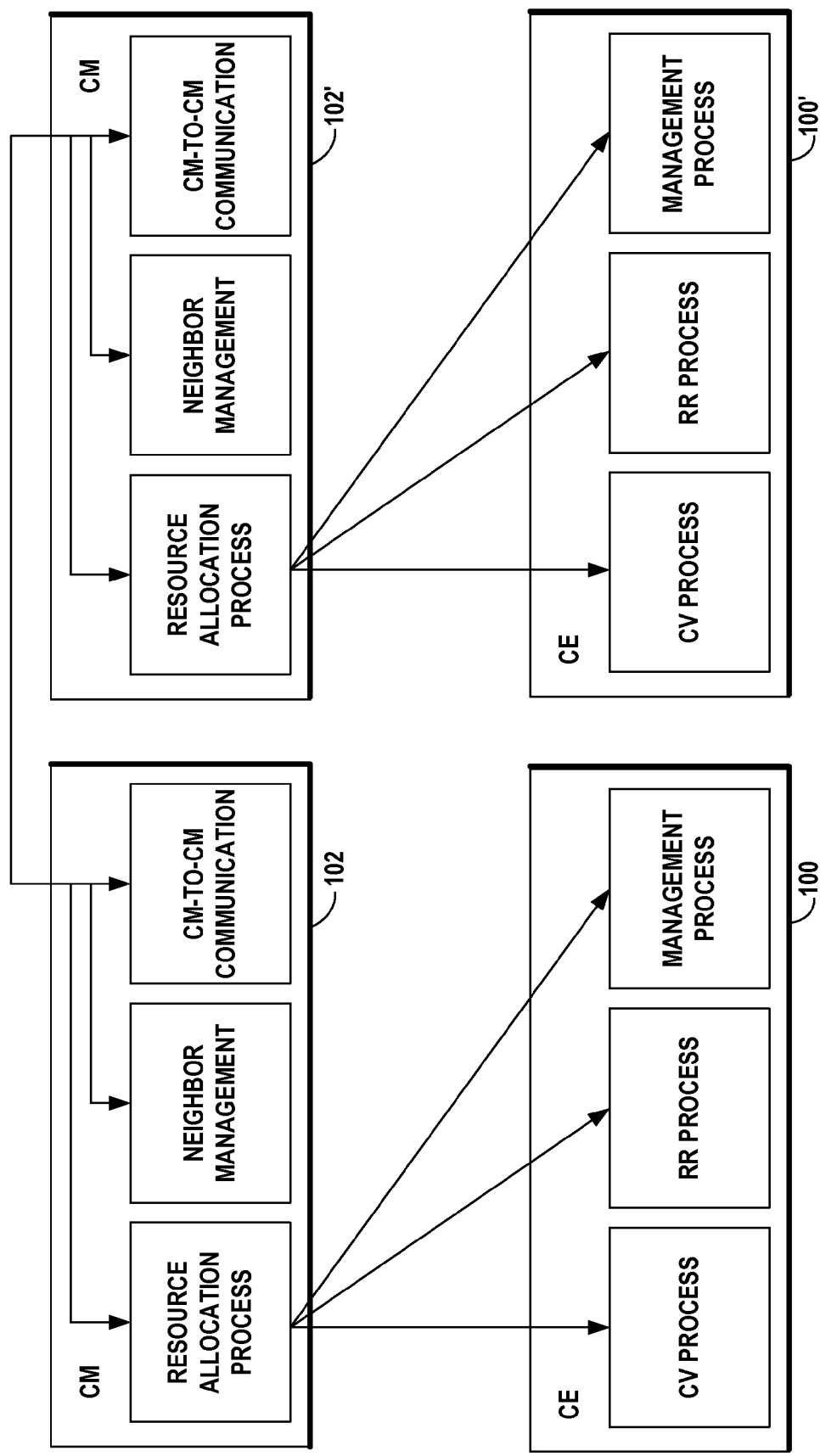
FIG. 1H is an example of the basic functionalities of the network controller or coexistence manager and the control node or coexistence enabler.

FIG. 1H is an example of the basic functionalities of the network controller or coexistence manager and the control node or coexistence enabler.

For the control node or coexistence enabler (CE):

CV process: Determine a parameter that characterizes the network's eligibility level to the spectrum resources. The parameter is determined from certain parameters of the network. The parameter may be called a coexistence value (CV). Provide the CV of the network to the CM serving the CE.

RR process: Form a resource request (RR) and issue it to the serving CM. Formed based upon information gathered from the network on its resource needs.

Management process: Registers the CE to a CM in order to become served by the CM. Maintains connection to the CM and provides information e.g. about network capabilities and CE features. Contains support functions that make the actual coexistence management functionality possible.

For the network controller or coexistence manager (CM):

Resource allocation process: Shares CVs from the CEs one is serving with the CMs of the neighboring networks. Exchanges spectrum maps with the CMs of the neighboring networks. Determines resource allocations as described in high level in NC72135 using the CVs and spectrum maps.

Neighbor management: Determines neighbors for the CEs/networks the CM serves (e.g. as per the NC71605) and facilitates connection setup between CMs serving neighboring networks.

CM-to-CM communication: Provides basic communication services for other functions/processes of the CM to exchange information with other CMs. Communication is needed between CMs that serve CEs of neighboring networks to exchange e.g. CV parameter values and RR process related information.

Figure 2:
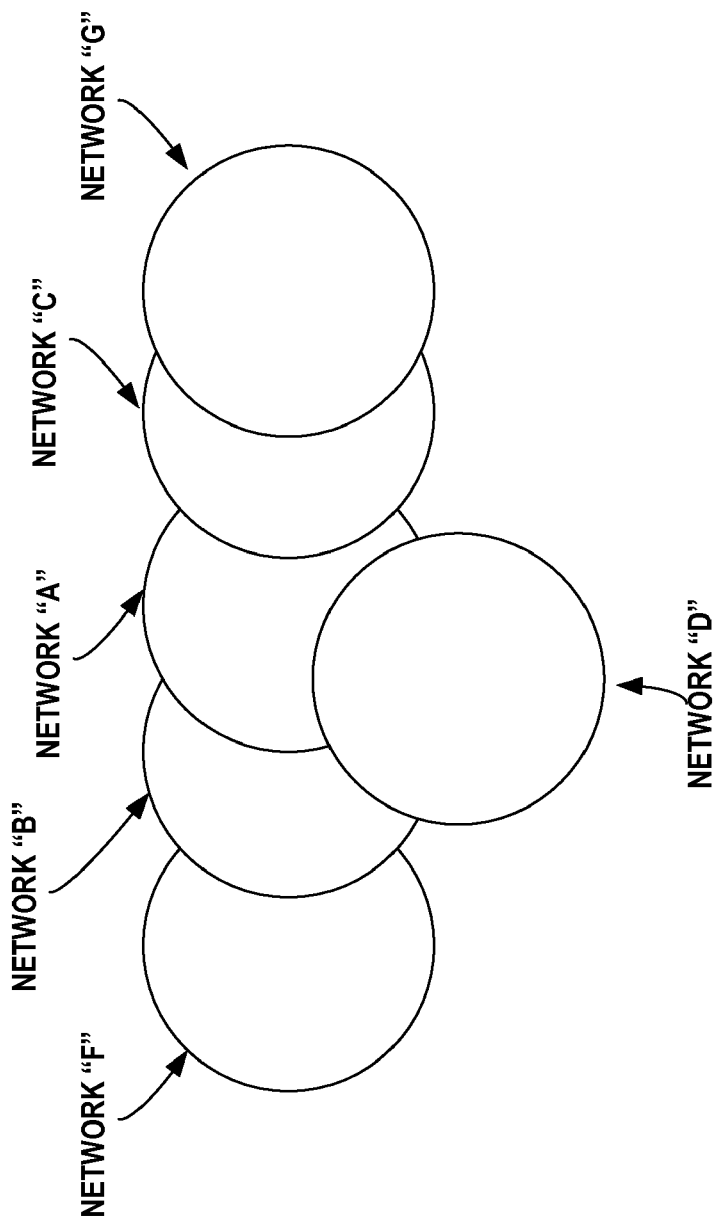
FIG. 2 is an example network topology scenario where the network "B" needs more resources, according to an embodiment of the present invention.

FIG. 2 is an example network topology scenario where the network "B" needs more resources, according to an embodiment of the present invention. An example embodiment of the invention specifies the coexistence entities, their relationships and the resource request method, as illustrated by the following example. The FIG. 2 shows a network scenario, where the circles A, B, C, D, E, F, and G represent the coverage area of each network. These networks are controlled in coexistence by the control node or coexistence enabler and the coexistence manager. Each network has its own coexistence enabler and may have its own coexistence manager or alternately one coexistence manager may control several networks, for example a company WLAN network with several APs.

Procedures to find real neighbors, how to analyze fair resource allocation between the real neighbors, and what content is to be communicated between real neighbors is described in the copending U.S. patent application Ser. No. 12/689,663. filed Jan. 19, 2010, entitled "Apparatus Identification In Coexistence Networking", by Mika Kasslin, Jari Junell, Juha Salokannel, assigned to Nokia Corporation and incorporated herein by reference.

The identification of neighboring networks may be performed by transmitting a request to a server, such as via an Internet connection, to inquire as to whether other networks are located near enough to the requesting network to be in an operational environment. The server may return information to the requesting network via the Internet identifying other proximately-located networks. The requesting network may utilize this information to communicate with the proximate networks.

In at least one example embodiment, the information provided by the server may include Internet addresses corresponding to network devices in potential neighboring wireless networks in the same operational environment as the requesting network. The requesting network may contact at least some of the potential neighboring networks via the Internet in order to request communication configuration and test information. The other potential networks may respond to these requests, and the requesting network may use the communication received configuration and test information to select a group of candidate neighboring networks. Candidate neighboring networks may be selected based on, for example, the distance from the requesting network to a potential neighboring network, transmission properties (for example, transmission power of potential neighboring networks), etc. Information needed for candidate selection may be provided by potential neighboring networks to the requesting network via an Internet connection.

In accordance with at least one example embodiment, the requesting network may then initiate testing the group of candidate neighboring networks. Testing may comprise transmitting one or more wireless signals that should be receivable by the candidate neighboring networks. The candidate neighboring networks that receive the wireless signals may then transmit reports to the requesting network via an Internet connection confirming receipt of a signal. The requesting network may utilize testing results to select real neighbor networks from the group of candidate neighboring networks.

Figure 3:
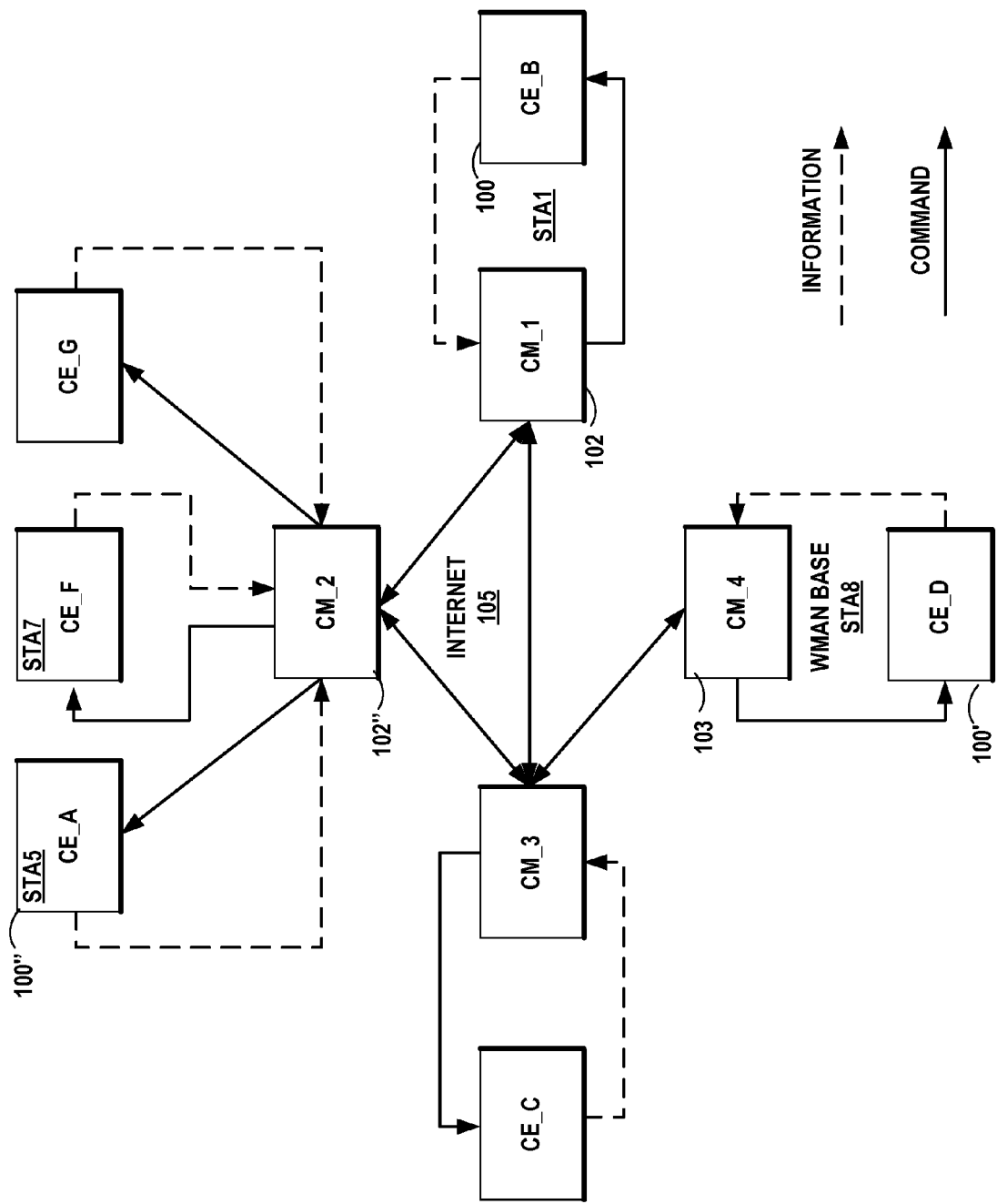
FIG. 3 is an example of coexistence management of the several networks shown in FIG. 2, according to an embodiment of the present invention.

FIG. 3 is an example of coexistence management of the several networks shown in FIG. 2, according to an embodiment of the present invention. Different network controller or coexistence managers 102 are connected together based on actual network overlapping below them. Also networks A, F, and G may form a company network, where each network has its own control node or coexistence enabler 100", but all are managed by one network controller or coexistence manager 102". To complete the architecture view all coexistence managers has a connection to primary database 104 and coexistence network element Coexistence Discovery & Info Server (CDIS) 107, as shown in FIG. 4A. It is possible that some networks may rely only on spectrum sensing (a special mode in FCC TV white spaces).

Figure 4:
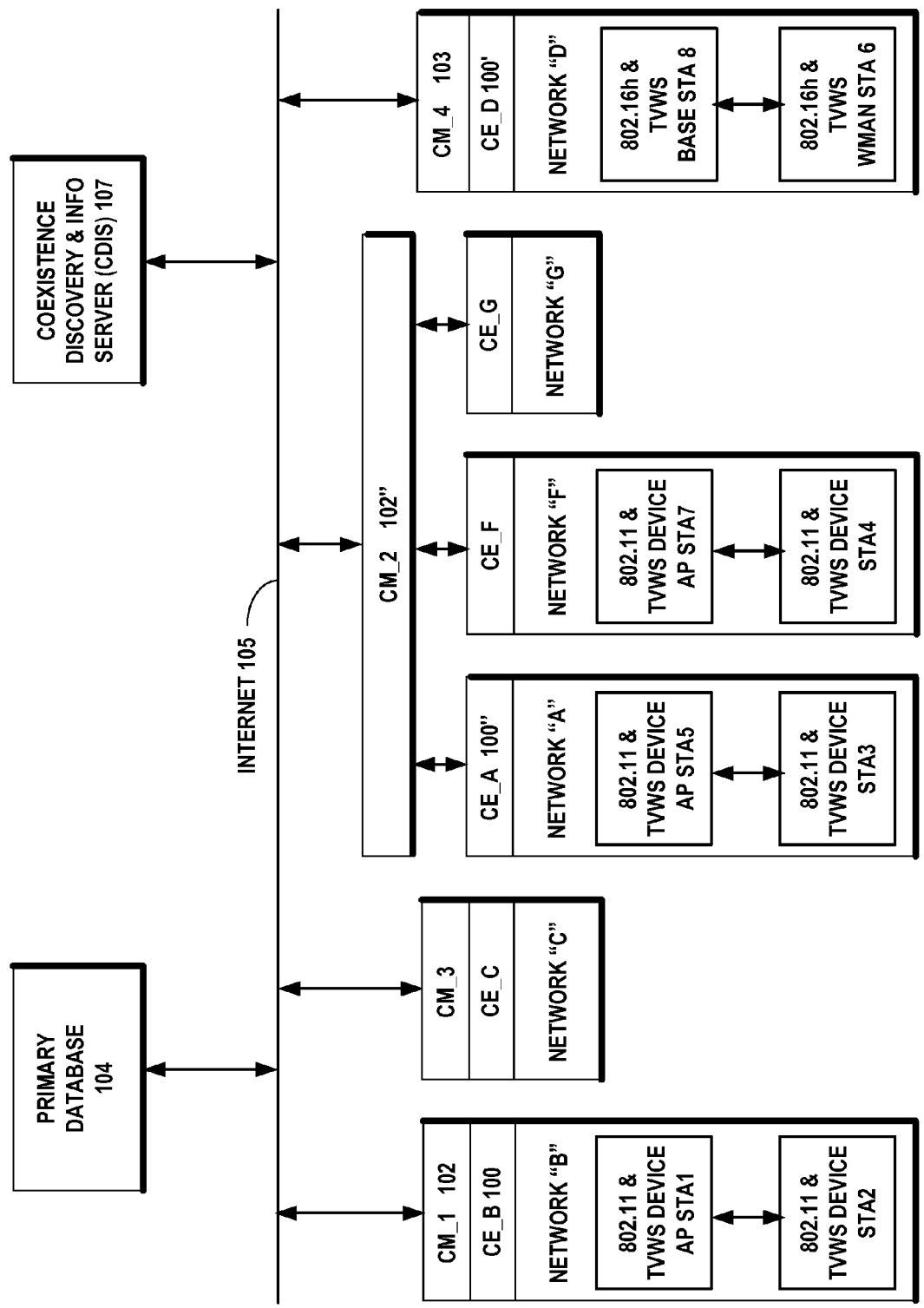
FIG. 4 is an example arrangement of the control node or coexistence enablers for networks A through G, the network controller or coexistence managers serving the coexistence enablers, the primary database, and the coexistence network element Coexistence Discovery & Info Server (CDIS), according to an embodiment of the present invention.

FIG. 4 is an example arrangement of the control node or coexistence enablers 100 for networks A through G, the network controller or coexistence managers 102 and 103 respectively serving the coexistence enablers 100 and 100', the primary database 104, and the coexistence network element Coexistence Discovery & Info Server (CDIS) 107, according to an embodiment of the present invention. For example, the coexistence manager CM_1 serves a single coexistence enabler CE_B for network "B" that includes STA1. The coexistence manager CM_3 serves a single coexistence enabler CE_C for network "C". The coexistence manager CM_4 serves a single coexistence enabler CE_D 100' for the 802.16 network "D" that includes base STA 8. Coexistence manager CM_2 102" serves three coexistence enablers CE_A, CE_F, and CE_G. Coexistence enabler CE_A 100" serves network "A" that includes STA5 and STA3. Coexistence enabler CE_F serves network "F" that includes STA4. All four coexistence managers CM_1, CM_2, CM_3, and CM_4 may access each other over the Internet 105, based on actual network overlapping of the networks they serve. All of the coexistence managers CM_1, CM_2, CM_3, and CM_4 have a connection to the primary database 104 and coexistence network element Coexistence Discovery & Info Server (CDIS) 107.

The coexistence manager 102 applies rules in making its determination of which of two networks based on different technologies, should be given priority in spectrum reallocation. For example, WLAN devices are typically designed for better resistance to saturation than WMAN devices, since WMAN devices must be more sensitive to attenuated signals received over a greater range than are WLAN devices. Thus, in an example embodiment of the invention, the coexistence manager 102 will generally favor the reallocation of an 802.11 network to the TVWS band, instead of reallocating the 802.16 network, when spectrum reallocation is requested, so as to remove the source of disturbance from the vicinity of 802.16 network.

The coexistence manager (CM) 102 decides, if no free channel or enough advertized resources were available, whether to grant the request by determining whether resource allocation requires an extensive reallocation or a light reallocation of a number of secondary channels or networks. In a light resource request process, for example, a change in the number of terminals within a single frequency channel may require changes only among the allocations between the users of that channel. In an extensive resource request process, for example, if a primary user reserves a channel, then all secondary users of that channel need to be reallocated to other channels, and a more complete resource reallocation may be initiated.

The coexistence manager 102 then sends to the coexistence enabler 100 in device STA1 the resource reallocation, including Operational parameters, Quiet period parameters, Spectrum sensing strategy, and Time base sync. The coexistence enabler 100 in device STA1 then controls the TV white space MAC to communicate in channels in the TV white spaces band reallocated by the coexistence manager 102, without interference from other networks sharing the same white space channels.

An example embodiment of the types of information exchanged between the coexistence manager 102, primary database 104, Coexistence Discovery & Info Server (CDIS) 107, and control node or coexistence enabler 100 may be as follows.

Between coexistence manager and Primary database:
  → Location of coexistence enabler to Primary database
  ← Available channels for secondary usage to coexistence manager Between coexistence manager and Coexistence Discovery & Info Server (CDIS):
  → Location of networks to CDIS
  ← Potential neighbor coexistence managers to coexistence manager Processing in coexistence manager:
  ↔ Spectrum maps
  ↔ Operational parameters of its own (alternative 1), operational parameters of its own and real neighbors (alternative 2)
  ↔ time base sync Between coexistence manager and coexistence enabler:
  → Operational parameters to coexistence enabler
  → Quiet period parameters to coexistence enabler
  → Spectrum sensing strategy to coexistence enabler
  → Time base sync to coexistence enabler
  ← Coexistence value (CV) to coexistence manager
  ← Spectrum sensing results to coexistence manager
  ← Network parameters to coexistence manager
  ← Resource Request to coexistence manager Procedures to find real neighbors, how to analyze fair resource allocation between the real neighbors, and what content is to be communicated between real neighbors is described in the copending U.S. patent application Ser. No. 12/689,663. filed Jan. 19, 2010, entitled "Apparatus Identification In Coexistence Networking", by Mika Kasslin, Jari Junell, Juha Salokannel, assigned to Nokia Corporation and incorporated herein by reference.

In an example embodiment of the invention, the objective in the resource request process is to keep the changes in spectrum allocations within as small a number of networks as possible, but still maintain fairness between the secondary networks. The operating principle to accomplish this is to first search for a free channel and/or advertised free resources, these two first steps may be implemented in opposite order or one of them may be skipped. And then divide spectrum reallocation into light and more extensive resource requests, corresponding to the stimulus that invokes the resource request process. This results in more stability, on an average, to changes in allocations and avoids a request causing an avalanche of new allocation requests to neighboring networks.

When a need for new resources is requested by the coexistence enabler, the coexistence manager of a secondary network will first check if there was a free channel or enough free advertised resources in neighborhood. If there are not enough resources seen, the coexistence manager will analyze the local network environment and then select a suitable resource request process. The basic reasons for a resource request include:

1. A primary has appeared in a channel currently available for secondary usage; a) occupied at the moment by a secondary network or b) free or backup/evacuation channel.
2. A new secondary network has entered the area
3. Interference level by some cause has raised to intolerable level
4. A new channel is found available for secondary usage
5. A secondary network in the area has closed its operation
6. A secondary network has need for more resources
7. A secondary network is releasing resources The first three reasons for a resource request will initiate a more extensive resource request, since there is either a change in the number of available networks or the number of secondary networks is reduced. The appearance of a primary network may be found by spectrum sensing with the coexistence enabler and the coexistence enabler will then report that appearance to the coexistence manager. The appearance of a primary network may also be found when the primary database 104 communicates that information to the coexistence manager, causing the coexistence manager to command the coexistence enabler to shift the network.

The appearance of a new secondary network may be also found by spectrum sensing with the coexistence enabler and the coexistence enabler will then report that appearance to the coexistence manager. The appearance of a new secondary network may be also found directly from the network to the coexistence manager, with the help of the CDIS 107 to sort out whether these two networks are real neighbors.

The fourth and fifth reasons for a resource request, either a new channel is found available for secondary usage or a secondary network in the area has closed its operation, may be a cause for some networks to initiate more extensive resource allocation.

The sixth and seventh reasons for a resource request, either a secondary network has need for more resources or a secondary network is releasing resources, may result in a light resource allocation.

After a more extensive resource request has been made, each network has been allocated to a certain network allocation group and to each of these groups is allocated a certain quantity of channels based on the number of networks in each group and network parameters characterizing the group. In a light resource request, the resources are only reallocated among those networks that belong to the same network allocation group.

FIG. 5A is an example network diagram according to an embodiment of the present invention, illustrating if there are no or an insufficient number of available free resources in the coexistence band, then checking by the network controller or coexistence manager for availability of allocated but unused resources in the coexistence band, as advertised by one or more coexistence managers managing neighboring wireless networks in the network allocation group. As an example, the coexistence manager CM_1 102, receives from one or more coexistence managers CM_2 and CM_4 103 managing neighboring wireless networks, advertisements of an availability of allocated but unused resources in a coexistence band. CM_2 transmits in step [1] a resource advertisement, "12 WS slots allocated but not used for 802.11 networks", as shown in the spectrum diagram of FIG. 6A. CM_1 replies in step [2] with a reallocation command "WLAN AP STA1 takes eight WS slots for 802.11 network", as shown in the spectrum diagram of FIG. 6B.

FIG. 5B is an example network diagram according to an embodiment of the present invention, illustrating if there are no or an insufficient number of available free resources or not enough advertised allocated but unused resources in the coexistence band for the network allocation group, then analyzing by the network controller or coexistence manager an allocation of used resources in the coexistence band for neighboring wireless networks in the network allocation group, for which the control node or coexistence enabler is eligible. As an example, in step [1] the coexistence manager CM_1 102 sends a query "Analyze Allocation Of WS Slots For WLAN 802.11 Neighbor Networks" to analyze allocations. In step [2] CM_2 then receives a resource status "Using 4 TVWS Slots For 802.11 STA3 in 802.11 Network 'A'" from coexistence manager CM_2, as shown in the spectrum diagram of FIG. 6C. In step [3] CM_1 then sends a reallocation command to CM_2 "WLAN AP STA1 Takes Two TVWS Slots For 802.11 Network", as shown in the spectrum diagram of FIG. 6D.

In an example embodiment of the invention, coexistence managers may advertise the resource status information of the networks they serve and keep the neighboring networks aware of the availability of both allocated but unused resources in the coexistence band and used resources in the coexistence band. In this manner, a coexistence manager serving networks requiring resources may review the previously distributed advertisements of both allocated but unused resources in the coexistence band and used resources in the coexistence band and then proceed immediately to a reallocation command.

FIG. 5C is an example network diagram according to an embodiment of the present invention, illustrating if there are insufficient available resources and insufficient reallocatable used resources in the coexistence band for neighboring networks in the network allocation group, for which the control node or coexistence enabler is eligible, then extending analysis by the network controller or coexistence manager to an allocation of used resources in the coexistence band for all neighboring wireless networks regardless of the network allocation group, i.e., both those networks within and outside of the same network allocation group, for which the coexistence enabler is eligible. As the result, reallocation commands may be issued to all the neighboring networks regardless of their network allocation group. As an example, in step [1] the coexistence manager CM_1 102 sends a query "Analyze Allocation Of WS Slots For All Neighbor Networks'" to analyze allocations. In step [2] CM_2 then receives a resource status "No WS Slots For 802.11 Network" from coexistence manager CM_2. Also, CM_2 then receives a resource status "Using 4 TVWS Slots For WMAN 802.16 Base STA in WMAN Network 'D'" from coexistence manager CM_4, as shown in the spectrum diagram of FIG. 6E. In step [3] CM_1 then sends a reallocation command to CM_4 "WLAN AP STA1 Takes Two TVWS Slots From 802.16 WMAN Network 'D'", as shown in the spectrum diagram of FIG. 6F.

Figure 6A:
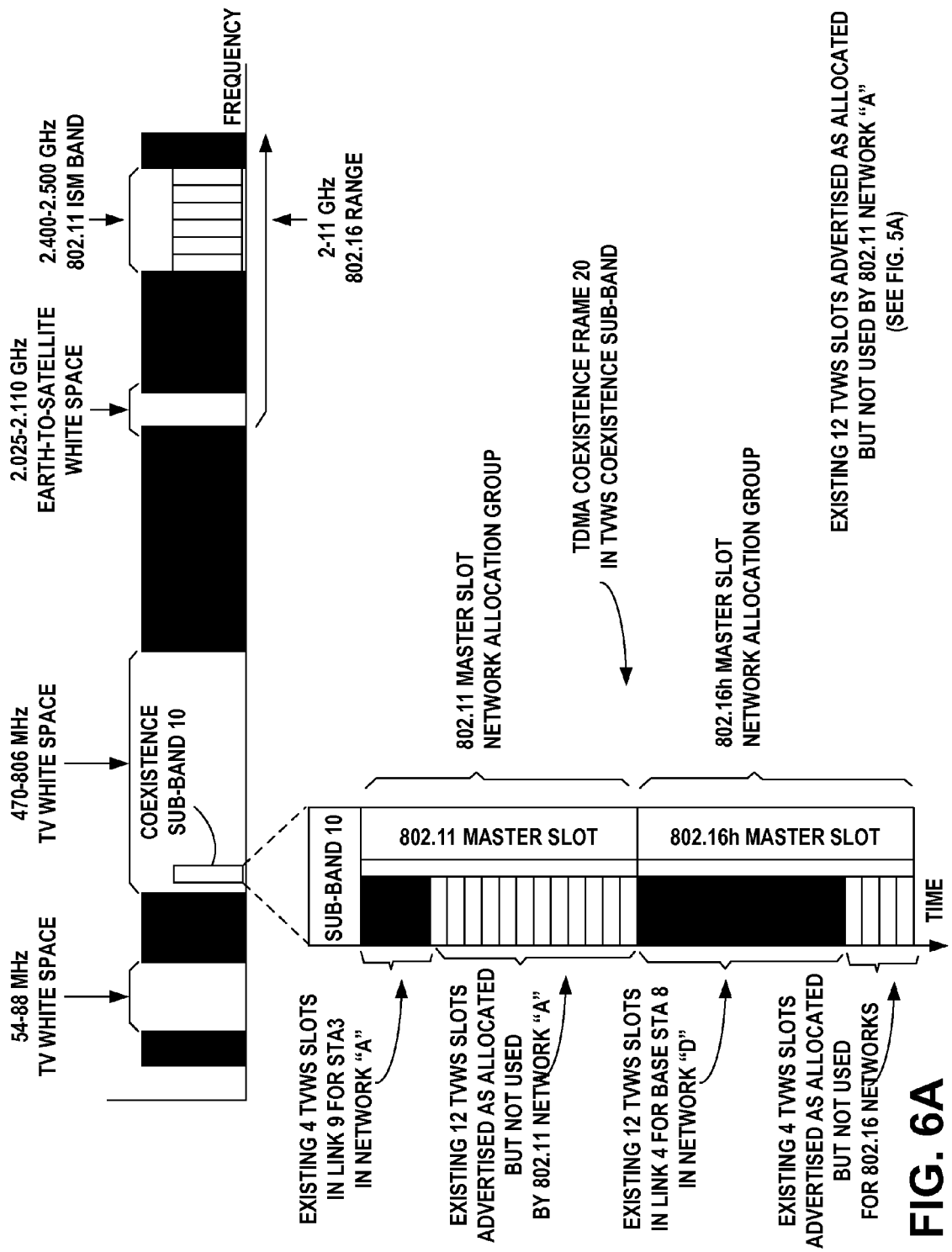
FIG. 6A is an example frequency band diagram illustrating a coexistence sub-band 10 in the TV band white space according to an embodiment of the present invention, illustrating an example of existing twelve TVWS slots advertised as allocated but not used by 802.11 network "A" (see FIG. 5A).

FIG. 6A is an example frequency band diagram illustrating a coexistence sub-band 10 in the TV band white space according to an embodiment of the present invention, illustrating an example of existing twelve TVWS slots advertised as allocated but not used by 802.11 network "A" (see FIG. 5A).

FIG. 6A illustrates the location of the TV white spaces and an example TDMA coexistence frame in the TV band white space, showing the occupancy of the time slots before the WLAN access point STA1 has any slots allocated to the TV band white space. The TV white spaces include 54-88 MHz band and 470-806 MHz band in the electromagnetic spectrum. Other locally unused white spaces may be present in certain geographic locations, such as frequency allocations from 2.025 GHz to 2.110 GHz for earth stations to transmit to communications satellites in areas remote from such earth stations. Also shown is the ISM band at 2.400-2500 GHz, in which the IEEE 802.11 signals are transmitted, for example in WLAN Network "B". For the wireless metropolitan area network (WMAN), the original version of the IEEE 802.16 standard specified a physical layer operating in the 10 to 66 GHz range. IEEE 802.16a, updated in 2004, added specifications for the 2 to 11 GHz range. For this example, example spectrum diagram shows the 2 to 11 GHz range, in which the IEEE 802.16 signals are transmitted, for example in WMAN Network "D".

There are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized network controller or coexistence manager.

The example TVWS coexistence technique used here is to time division multiplexing different IEEE 802 technologies. The two IEEE 802 technologies chosen for this example are the IEEE 802.16h WMAN standard and the IEEE 802.11 WLAN standard. The IEEE 802.16h WMAN uses a fixed outdoor base station, such as the WMAN base station 8, serving indoor and outdoor portable clients, such as the WMAN STA 6. The IEEE 802.11 WLAN station, such as the WLAN access point STA1, may include Internet access and geo-location capability. The MAC 142 in the WLAN access point STA1 includes integrated TV white space features to communicate with the radio 128 in channels in the TV white spaces band reallocated by the coexistence manager 102, without mutual interference. The IEEE 802.16h WMAN STA 6, for example, may also include a MAC with integrated TV white space features to communicate using a radio in frequency sub-bands in the TV white spaces band reallocated by the coexistence manager 102, without mutual interference.

The spectrum diagram of FIG. 6A shows the TDMA coexistence frame 20 in TVWS coexistence sub-band. The 802.11 master slot network allocation group includes existing 4 TVWS slots in link 9 for STA3 in network "A" and existing 12 TVWS slots advertised as allocated but not used by 802.11 network "A". The 802.16h master slot network allocation group includes existing 12 TVWS slots in link 4 for base STA8 in network "D" and existing 4 TVWS slots advertised as allocated but not used for 802.16 networks.

Figure 6B:
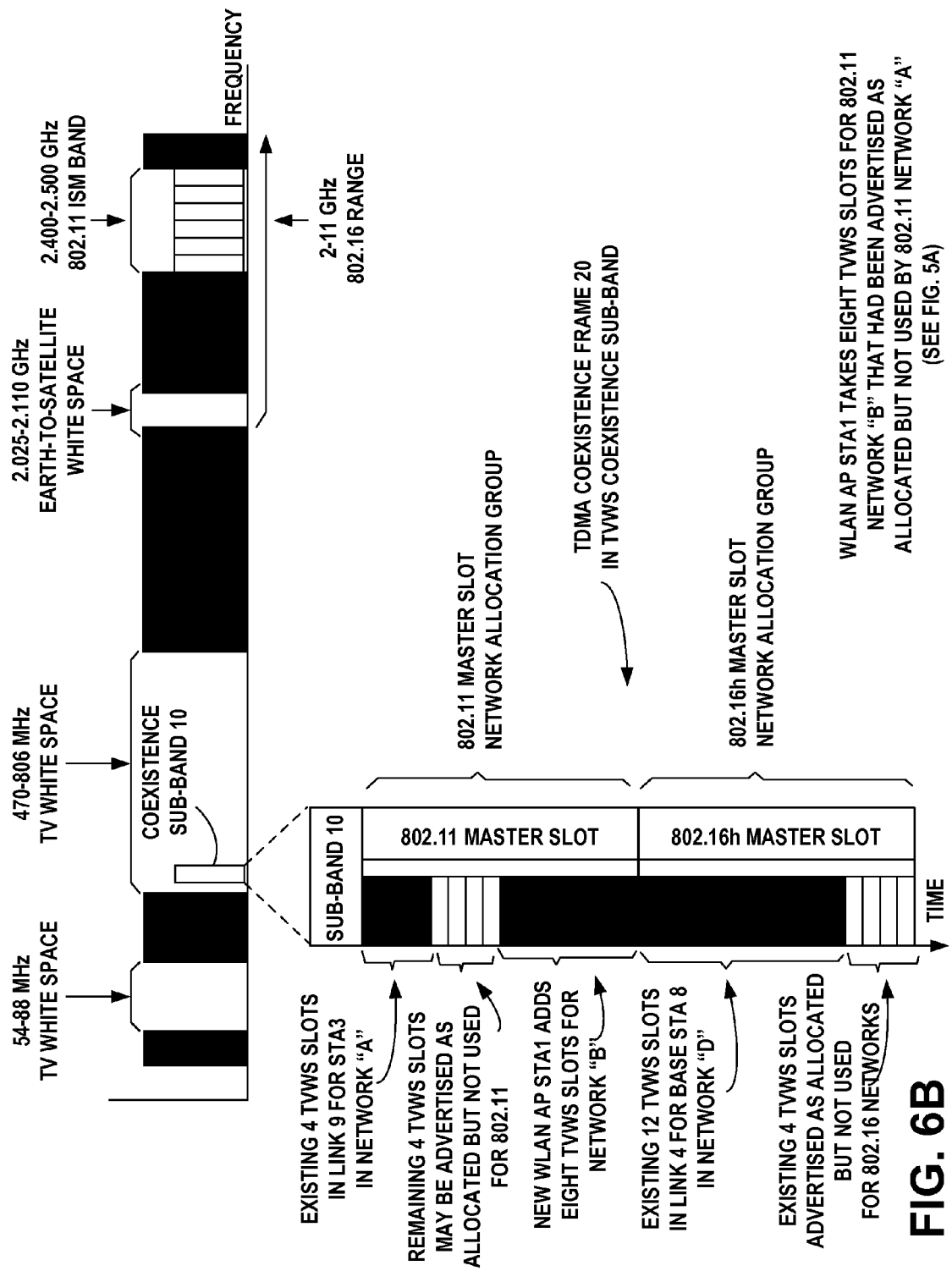
FIG. 6B is an example frequency band diagram illustrating a coexistence sub-band 10 in the TV band white space according to an embodiment of the present invention, illustrating an example of WLAN AP STA1 taking eight TVWS slots for 802.11 network "B" that had been advertised as allocated but not used by 802.11 network "A" (see FIG. 5A).

FIG. 6B is an example frequency band diagram illustrating a coexistence sub-band 10 in the TV band white space according to an embodiment of the present invention, illustrating WLAN AP STA1 takes eight TVWS slots for 802.11 network "B" that had been advertised as allocated but not used by 802.11 network "A" (See FIG. 5A).

A light reallocation typically is available in the following circumstances:
 1. When a secondary network has need for more resources.
 2. When a secondary network is releasing resources.

Figure 6C:
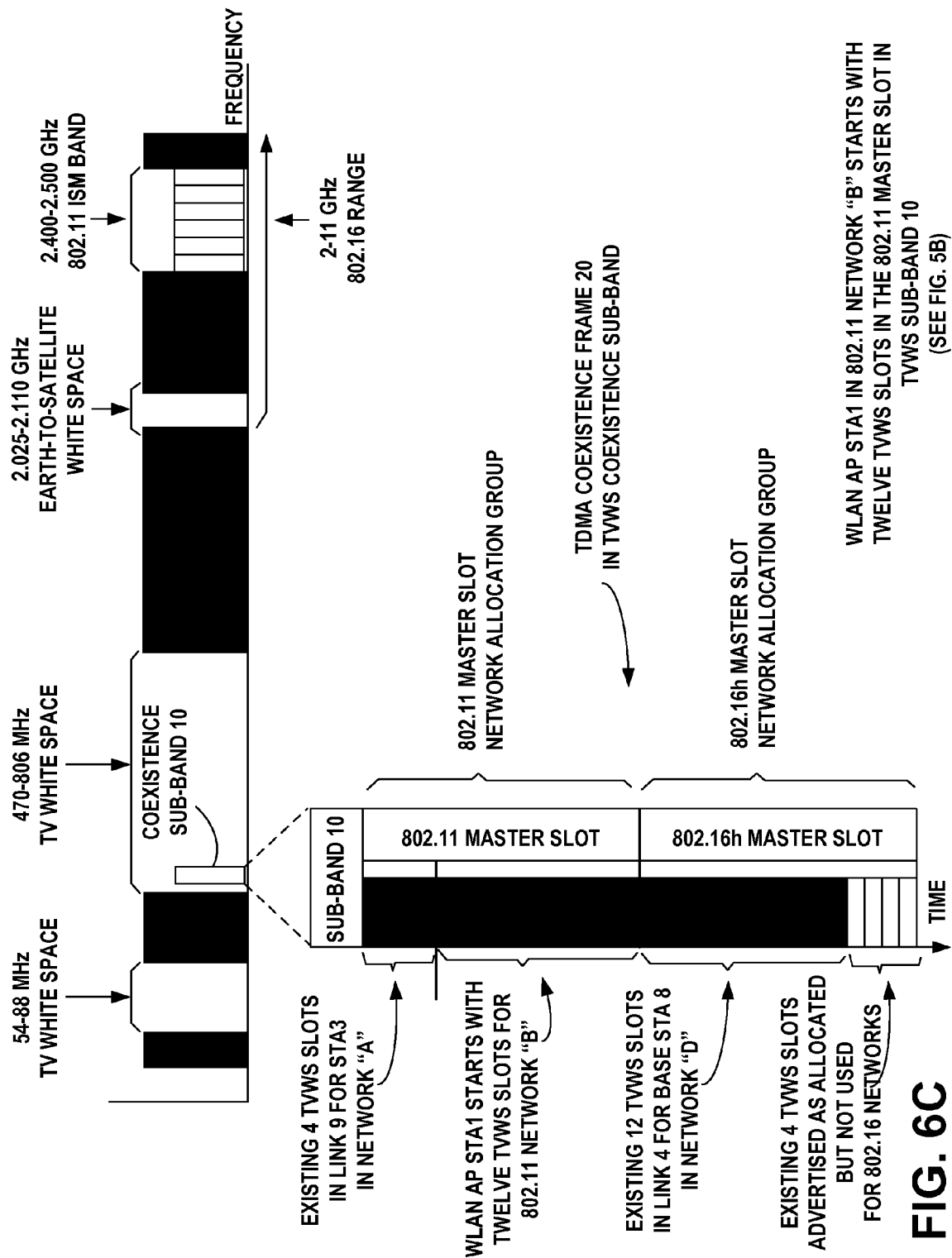
FIG. 6C is an example frequency band diagram illustrating a coexistence sub-band 10 in the TV band white space according to an embodiment of the present invention, illustrating an example of WLAN AP STA1 in 802.11 network "B", which starts with twelve TVWS slots in the 802.11 master slot in TVWS sub-band 10 (see FIG. 5B).

FIG. 6C is an example frequency band diagram illustrating a coexistence sub-band 10 in the TV band white space according to an embodiment of the present invention, illustrating WLAN AP STA1 in 802.11 network "B" starts with twelve TVWS slots in the 802.11 master slot in TVWS sub-band 10. (See FIG. 5B)

Figure 6D:
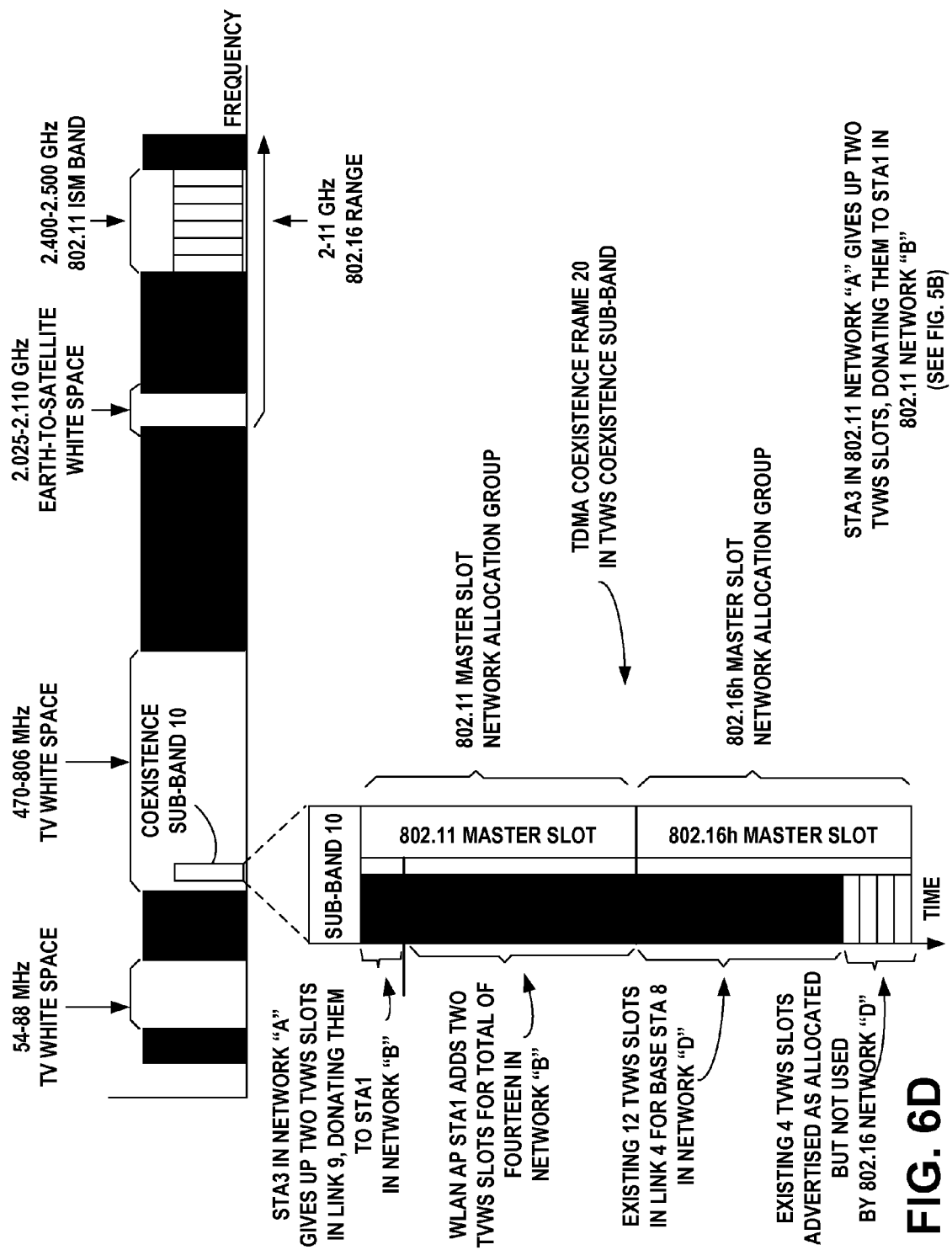
FIG. 6D is an example frequency band diagram illustrating a coexistence sub-band 10 in the TV band white space according to an embodiment of the present invention, illustrating an example of STA3 in 802.11 network "A" giving up two TVWS slots, donating them to STA1 in 802.11 network "B" (see FIG. 5B).

FIG. 6D is an example frequency band diagram illustrating a coexistence sub-band 10 in the TV band white space according to an embodiment of the present invention, illustrating STA3 in 802.11 network "A" gives up two TVWS slots, donating them to STA1 in 802.11 network "B". (See FIG. 5B)

Figure 6E:
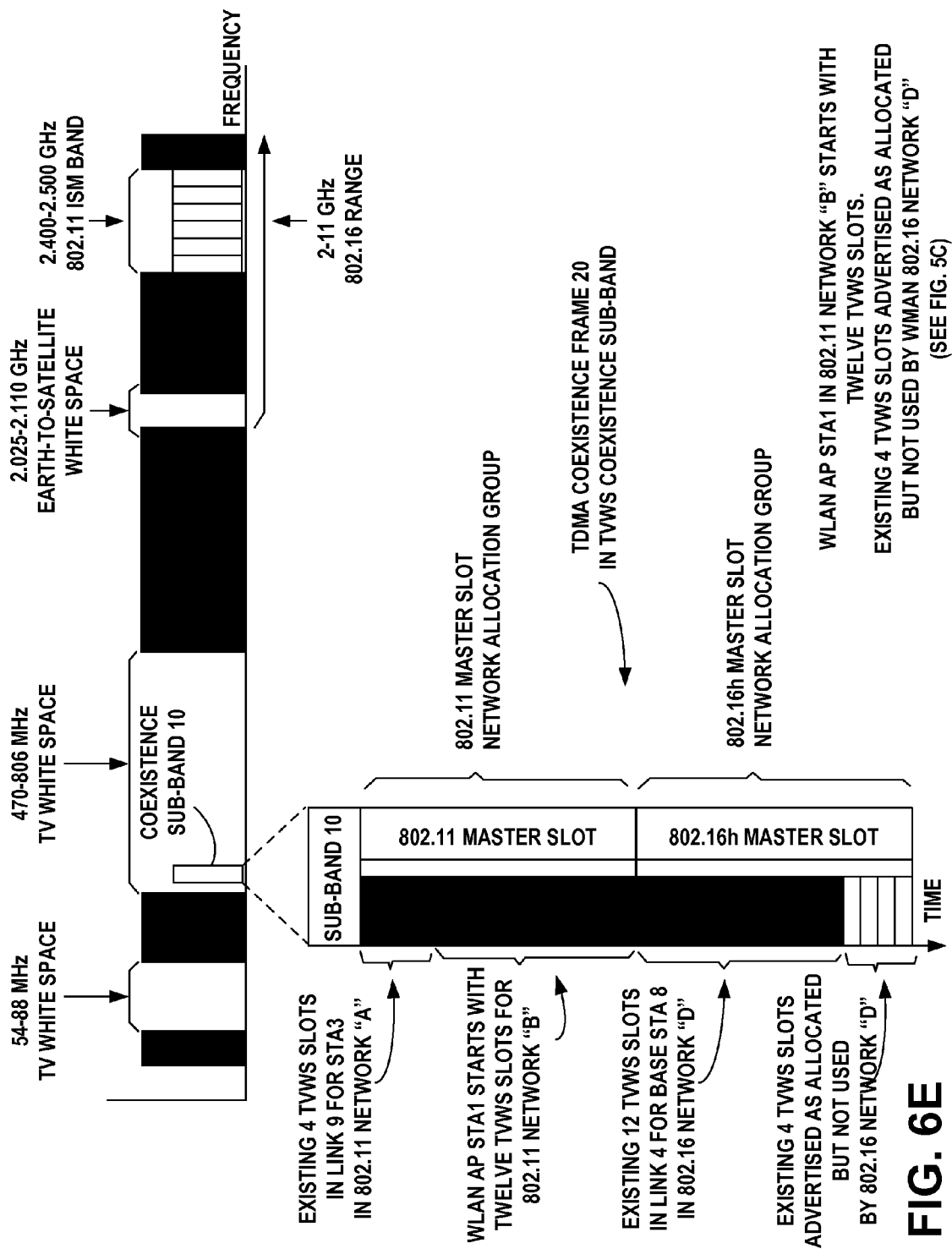
FIG. 6E is an example frequency band diagram illustrating a coexistence sub-band 10 in the TV band white space according to an embodiment of the present invention, illustrating an example of WLAN AP STA1 in 802.11 network "B" starting with twelve TVWS slots. There are also 4 TVWS slots advertised as allocated but not used by WMAN 802.16 network "D" (see FIG. 5C).

FIG. 6E is an example frequency band diagram illustrating a coexistence sub-band 10 in the TV band white space according to an embodiment of the present invention, illustrating WLAN AP STA1 in 802.11 network "B" starts with twelve TVWS slots existing 4 TVWS slots advertised as allocated but not used by WMAN 802.16 network "D" (See FIG. 5C)

Figure 6F:
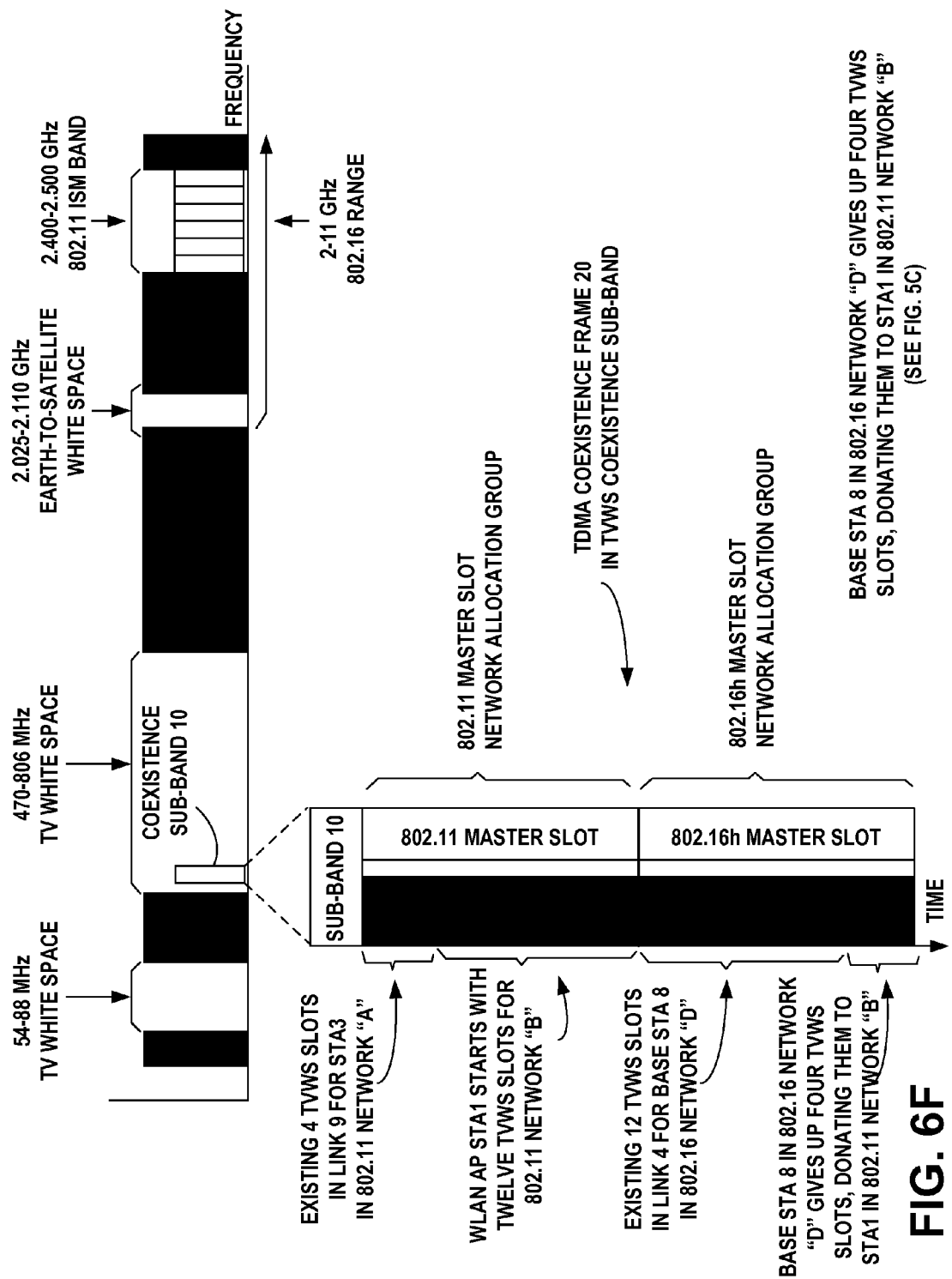
FIG. 6F is an example frequency band diagram illustrating a coexistence sub-band 10 in the TV band white space according to an embodiment of the present invention, illustrating an example of base STA8 in 802.16 network "D" giving up four TVWS slots, donating them to STA1 in 802.11 network "B" (see FIG. 5C).

FIG. 6F is an example frequency band diagram illustrating a coexistence sub-band 10 in the TV band white space according to an embodiment of the present invention, illustrating base STA 8 in 802.16 network "D" gives up four TVWS slots, donating them to STA1 in 802.11 network "B" (See FIG. 5C)

A more extensive reallocation is typically required in the following circumstances:
 1. When a primary user (existing licensed uses, for example, licensed TV broadcaster, etc.) has appeared in a channel currently available for secondary usage, either occupied at the moment by a secondary network or the primary has evacuated a channel.
 2. When a new secondary network has entered the area.
 3. When interference level by some cause has raised to intolerable level.
 4. When a new channel is found available for secondary usage.
 5. When a secondary network in the area has closed its operation.

Figure 6G:
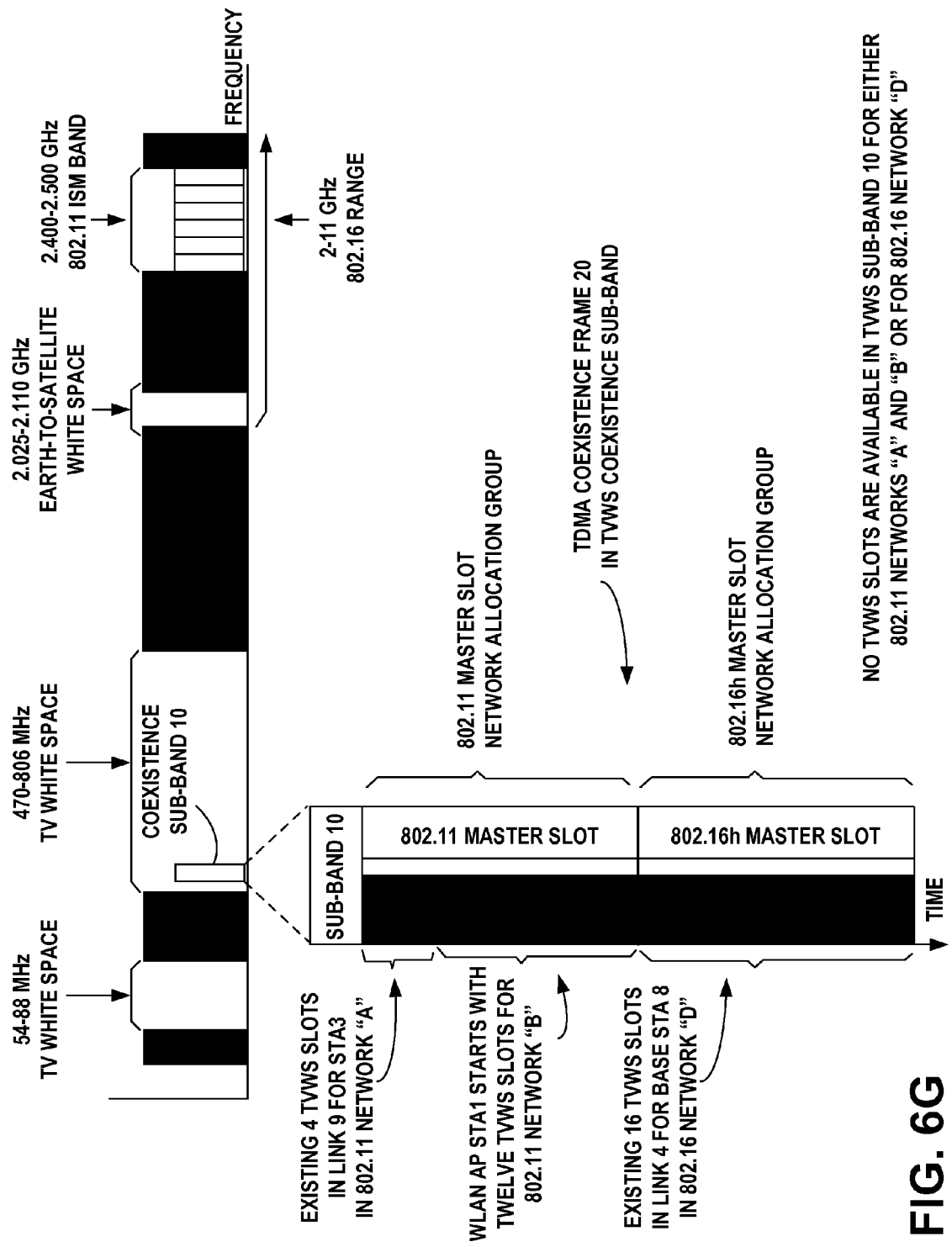
FIG. 6G is an example frequency band diagram illustrating a coexistence sub-band 10 in the TV band white space according to an embodiment of the present invention, illustrating an example of no TVWS slots being available in TVWS sub-band 10 for either 802.11 networks "A" and "B" or for 802.16 network "D".

FIG. 6G is an example frequency band diagram illustrating a coexistence sub-band 10 in the TV band white space according to an embodiment of the present invention, illustrating no TVWS slots are available in TVWS sub-band 10 for either 802.11 networks "A" AND "B" or for 802.16 network "D".

Figure 6H:
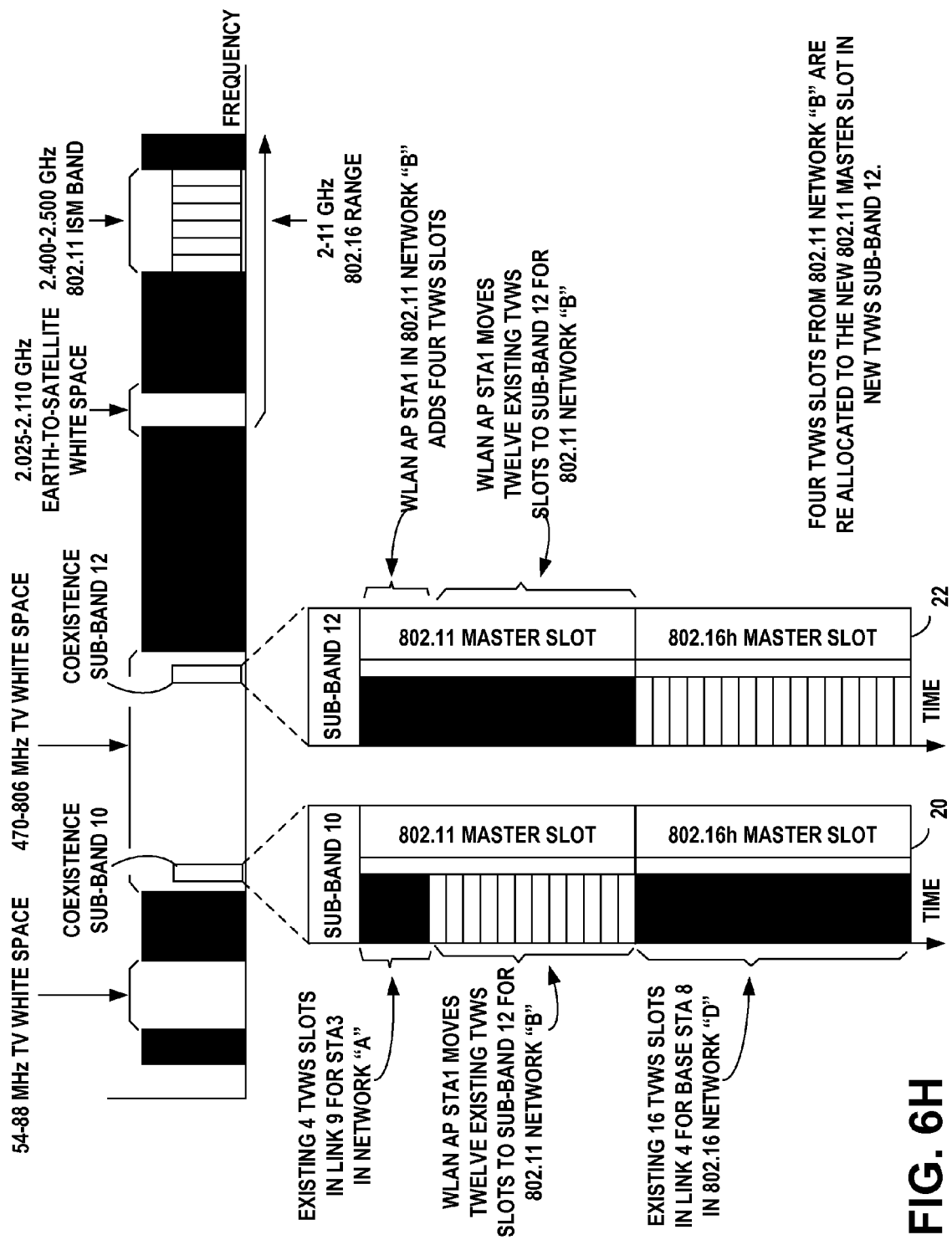
FIG. 6H is an example frequency band diagram illustrating two coexistence sub-bands 10 and 2 in the TV band white space according to an embodiment of the present invention, illustrating an example of four TVWS slots from 802.11 network "B" being reallocated to the new 802.11 master slot in new TVWS sub-band 12.

FIG. 6H is an example frequency band diagram illustrating two coexistence sub-bands 10 and 2 in the TV band white space according to an embodiment of the present invention, illustrating four TVWS slots from 802.11 network "B" are re allocated to the new 802.11 master slot in new TVWS sub-band 12.

Figure 7A:
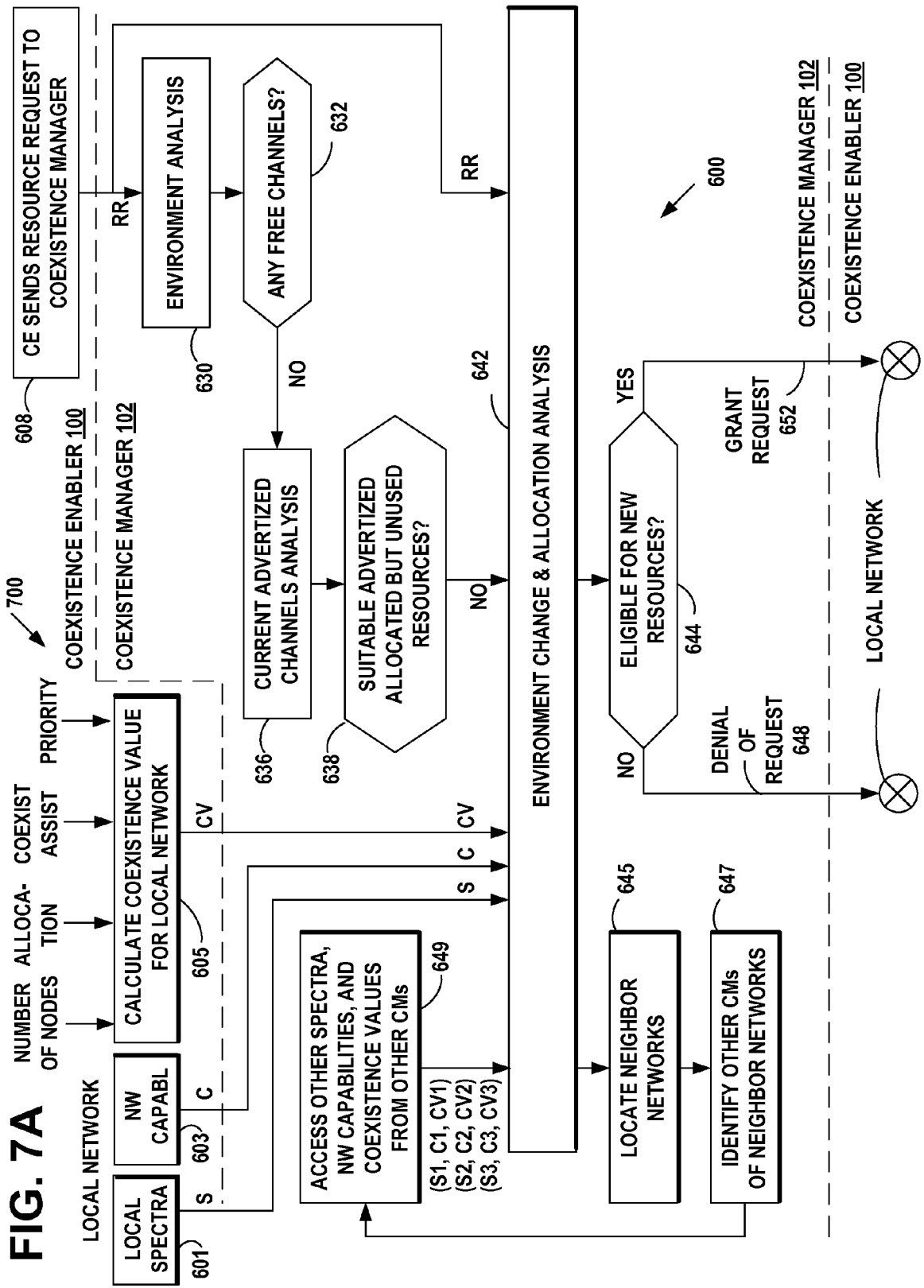
FIG. 7A is an example functional block diagram of an example embodiment of an apparatus for generating a resource allocation response to a resource request of a wireless network based on comparing the resource request with a result of comparing a stored coexistence value of the wireless network with other stored coexistence values of neighboring wireless networks, a result of comparing stored network capabilities information of the wireless network with other stored network capabilities information of the neighboring wireless networks, and estimated available resources based on a spectrum map of the wireless network and the neighboring wireless networks, according to an embodiment of the present invention.
Figure 7C:
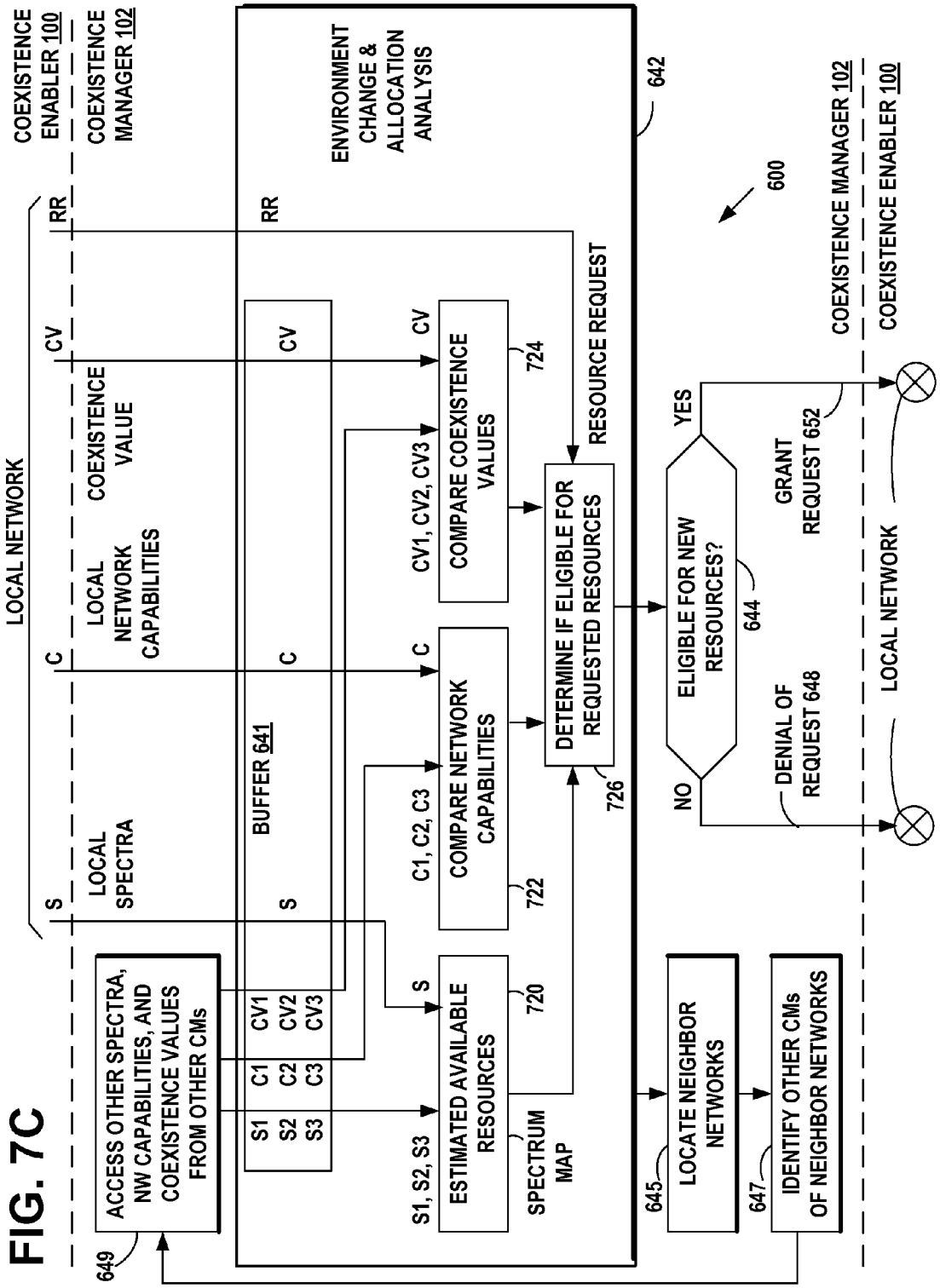
FIG. 7C is an example functional block diagram of an example embodiment of the apparatus of FIG. 7A, illustrating more detail of apparatus for using the stored coexistence value of the wireless network to generate the resource allocation response to the resource request, according to an embodiment of the present invention.
Figure 7D:
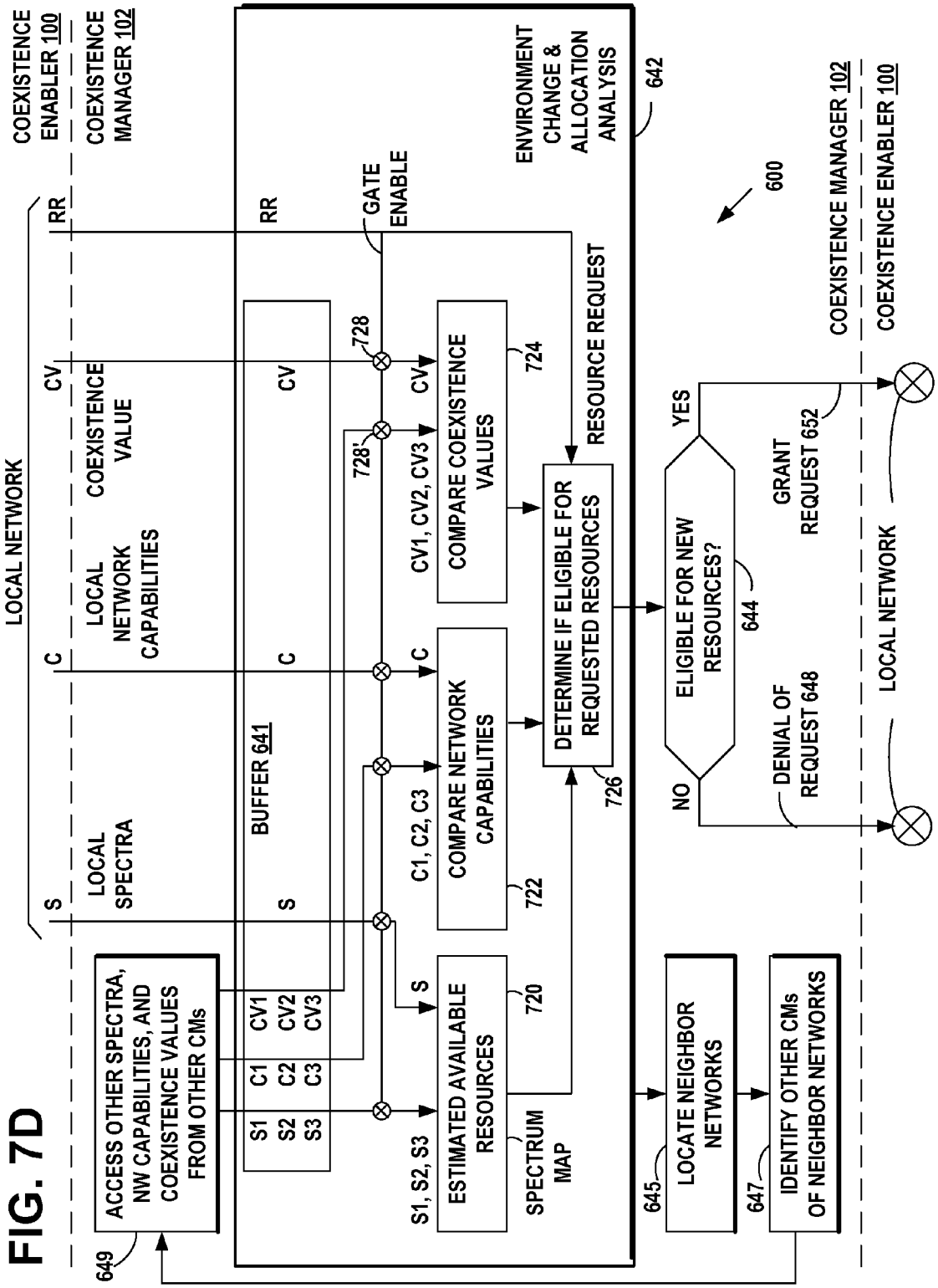
FIG. 7D is an example functional block diagram of an example embodiment of the apparatus of FIG. 7A, modifying the apparatus of FIG. 7C, to add transfer gates at the output of the buffer, the gates being conditionally enabled to pass values of S, S1, S2, S3, values of C, C1, C2, C3, and values of CV, CV1, CV2, CV3 only after a resource request signal RR is received from the control node or coexistence enabler, according to an embodiment of the present invention.

FIG. 7A is an example functional block diagram of an example embodiment of the combined control node or coexistence enabler 100 and the network controller or coexistence manager 102, for generating a resource allocation response to a resource request of a wireless network, such as IEEE 802.11 WLAN network "B". The functional block diagram of FIG. 7A shows example logic 600 in the coexistence manager 102, for processing resource requests and FIG. 7A shows example logic 700 in the coexistence enabler 100 for the generation of coexistence values CV. The logic 600 for processing resource requests is shown as the example flow diagram of FIGS. 8A and 8B. The logic 700 for generation of coexistence values CV is shown in greater detail in FIG. 7B. The example logic 642 shown in FIG. 7C and FIG. 7D, illustrates how the coexistence values CV are used in processing the resource requests RR.

The resource allocation response may be based on comparing the resource request with a result of comparing a stored coexistence value CV of the wireless network with other stored coexistence values CV1, CV2, CV3 of neighboring wireless networks. The resource allocation response may be based on a result of comparing stored network capabilities information C of the wireless network with other stored network capabilities information C1, C2, C3 of the neighboring wireless networks. The resource allocation response may be based on estimated available resources based on spectrum measurement information S of the wireless network and spectrum measurement information or spectrum maps S1, S2, S3 received from the coexistence managers of the neighboring wireless networks, according to an embodiment of the present invention.

The coexistence enabler 100 provides spectrum measurement information S of the wireless network from logic module 601 and sends it to the environment change & allocation analysis logic module 642 in the coexistence manager 102. Then the coexistence manager 102 may build the final spectrum map from this spectrum measurement information S, earlier spectrum measurement information at the wireless network, and spectrum information accessed from the primary database 104. The coexistence enabler 100 provides network capabilities C of the wireless network from logic module 603 and sends it to the environment change & allocation analysis logic module 642 in the coexistence manager 102. The coexistence enabler 100 provides coexistence value CV of the wireless network by calculating the value of CV in the logic module 605 and sends it to the environment change & allocation analysis logic module 642 in the coexistence manager 102.

As shown in greater detail in FIG. 7B, logic 700 in the coexistence enabler 100 is for the generation of coexistence values CV. The computation of coexistence value CV may be based on the number of nodes F1 in the wireless network, which is processed in logic module 702. The computation of coexistence value CV may be based on the current resource allocation F2 of the wireless network, which is processed in logic module 704. The computation of coexistence value CV may be based on the predicted resource allocation of the requested resources of the wireless network. The computation of coexistence value CV may be based on the coexistence assistance F3 by the wireless network to assist in operation of other networks, which is processed in logic module 706. And/or he computation of coexistence value CV may be based on the priority F4 of the wireless network, which is processed in logic module 708. The component values of F1, F2, F3, and F4 are combined in logic module 710 to yield the coexistence value CV.

In an example alternate embodiment of the invention, the coexistence value CV may be determined by the coexistence manager 102, instead of the coexistence enabler 100, where the coexistence manager 102 includes the logic 700 of FIG. 7B for the generation of coexistence values CV.

The environment change & allocation analysis logic module 642 in the network controller or coexistence manager 102 is shown in greater detail in FIG. 7C, where it is seen that the network capabilities C, the coexistence value CV, and the spectrum measurement information S of the wireless network are temporarily stored in the buffer 641. The coexistence manager 102 includes logic module 645 to locate neighbor networks and logic module 647 to identify other coexistence managers serving those neighbor networks thus located. Logic module 649 then accesses the other coexistence managers thus identified and obtains other spectrum maps S1, S2, S3, network capabilities C1, C2, C3, and coexistence values CV1, CV2, CV3 of the neighbor networks thus located, which are temporarily stored in the buffer 641.

The environment change & allocation analysis logic module 642 in the coexistence manager 102 may compare the stored coexistence value CV of the wireless network with the other stored coexistence values CV1, CV2, CV3 in logic module 724 and it may compare the network capabilities information C of the wireless network with the other network capabilities information C1, C2, C3 in logic module 722. The results of these comparisons may be stored in the buffer 641. Alternately, the comparisons are not performed until the event of a resource request occurs, as shown in FIG. 7D. The estimated available resources may be determined based on the spectrum measurement information S of the wireless network and the other spectrum maps S1, S2, S3 processed in logic module 720.

Independent of receiving the coexistence values CV, the network capabilities information C, or the spectrum measurement information S, a resource request RR may be received from the control node or coexistence enabler, for additional resources in a wireless network coexistence band, such as TV band white spaces, based upon resource needs of the wireless network. This event of receiving the RR causes the environment change & allocation analysis logic module 642 in the network controller or coexistence manager 102, to determine in logic module 726 if the wireless network is eligible for the requested resources. The determination may be based on the estimated available resources in logic module 720 and/or the comparison in logic module 726 of the resource request RR with the result of the comparing of the stored coexistence value CV of the wireless network in logic module 724, and/or the comparison in logic module 726 of the resource request with the result of the comparing of the stored network capabilities information C of the wireless network in logic module 722. If the determination in logic module 726 is that the wireless network is eligible, then logic module 644 of the coexistence manager 102 sends a grant request 652 to the coexistence enabler 100, which results in reallocating resources of the wireless network in the coexistence band based on the resource allocation response 652. If the determination is that the wireless network is not eligible, then logic module 644 of the coexistence manager 102 sends a denial of request 648 to the coexistence enabler 100.

FIG. 7D is an example functional block diagram of an example embodiment of the apparatus of FIG. 7A, modifying the environment change & allocation analysis logic module 642 of FIG. 7C, to add transfer gates 728 and 728' at the outputs of the buffer 641, the gates 728 and 728' being conditionally enabled to pass values of S, S1, S2, S3, values of C, C1, C2, C3, and values of CV, CV1, CV2, CV3 only after a resource request signal RR is received from the control node or coexistence enabler 100, according to an embodiment of the present invention. Thus, estimating available resources in logic module 720, comparing network capabilities in logic module 722, and comparing coexistence values in logic module 724 does not occur in this example embodiment until after a resource request signal RR is received from the coexistence enabler 100. In an example embodiment of the invention, the buffer 641 may be addressed using the identity of the wireless network making the resource request RR, to access the stored values of S, C, and CV corresponding to the wireless network.

The update of a spectrum map is an independent process, which keeps relevant information of channel usage up to date in each coexistence manager of secondary network(s). Each network has its own spectrum map, which spectrum channel usage information is gathered via spectrum sensing, communication with local secondary neighbors and from primary database.

Figure 7F:
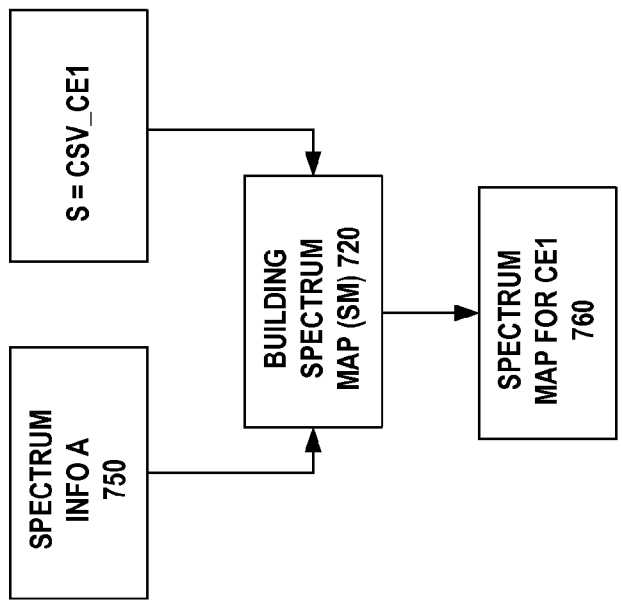
FIGS. 7E and 7F show an example how a network controller or coexistence manager may build an awareness of the RF spectral environment of the requesting wireless network and build a spectrum map for the requesting network, according to an embodiment of the present invention.
Figure 7E:
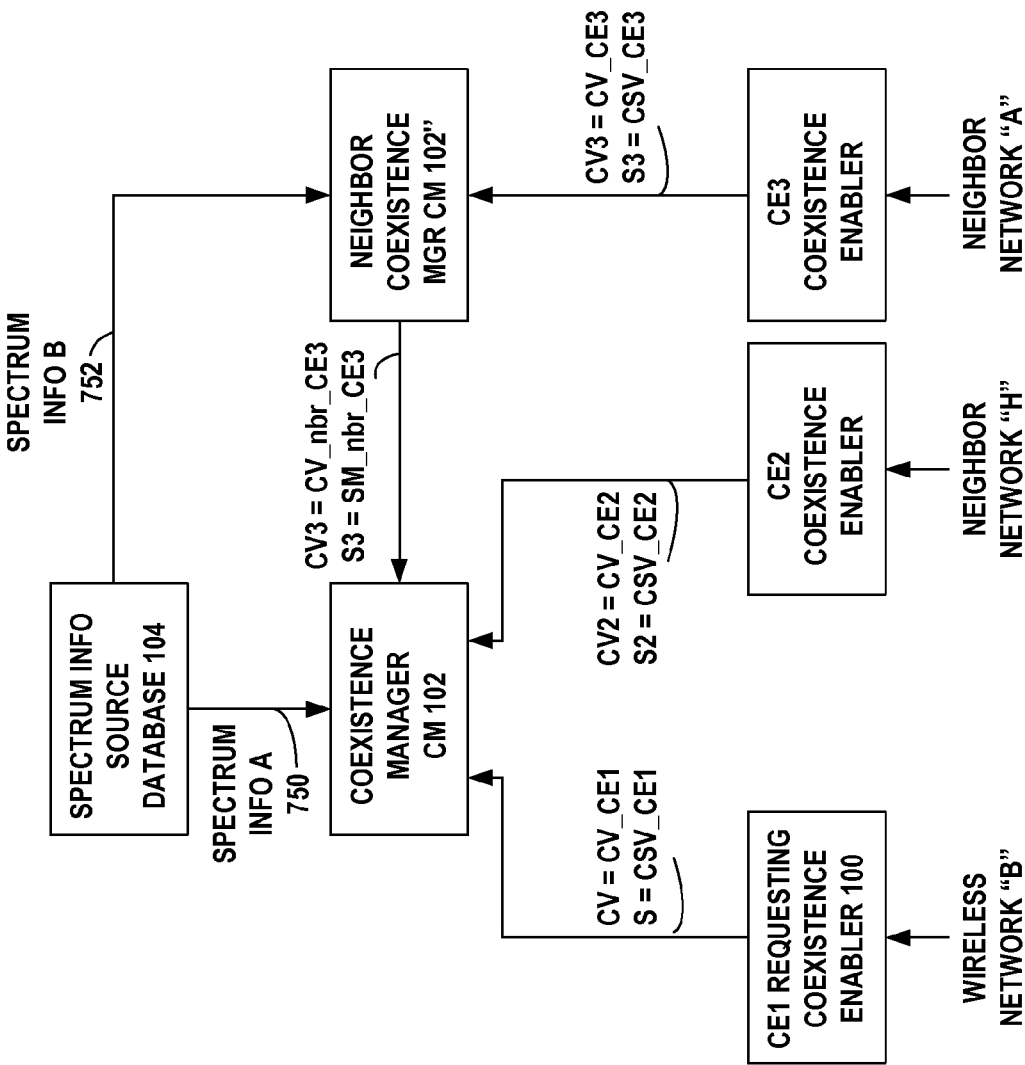

FIG. 7E shows an example how a network controller or coexistence manager 102 may build an awareness of the RF spectral environment of the requesting wireless network "B" and build a spectrum map (SM) 760 for the requesting network. The control node or coexistence enabler CE1 100 serving the wireless network "B" sends the coexistence value CV=CV_CE1 to the coexistence manager 102. The coexistence enabler CE1 100 also sends the RF spectrum environment sensing results, Channel State Vector (CSV_CE1) for wireless network "B", to coexistence manager 102. The coexistence manager 102 also obtains both spectrum information A 750 from other spectrum information sources, such as the primary database 104 and spectrum maps associated to the neighboring wireless networks "A" and "H". The values for CV2 and S2 Channel State Vector (CSV_CE2), are sent from the CE2 coexistence enabler serving neighboring network "H" to coexistence manager 102 that serves CE2. The coexistence manager 102 builds a spectrum map SM_nbr_CE2 from the Channel State Vector (CSV_CE2) and the spectrum information associated to the CE2 it obtains from other spectrum information sources, such as the primary database 104. The values for CV3 and S3 from the CE3 coexistence enabler serving neighboring network "A" are sent to the neighboring coexistence manager 102" that builds a spectrum map S3=SM_nbr_CE3 from the Channel State Vector (CSV_CE3) and the spectrum information B 752 that is obtained from other spectrum information sources, such as the primary database 104, and forwards the spectrum map to coexistence manager 102. From the neighbor information S2=CSV_CE2 and S3=SM_nbr_CE3, the coexistence manager 102 may decide that without any further sensing or measurement at the requesting network "B" by the coexistence enabler 100, an unrecognized network that is seen by one or more of its neighbors, is also an actual neighbor of the requesting network "B". The coexistence manager 102 builds a spectrum map SM 760 in logic module 720, as shown in FIG. 7F, from all these information sources. The coexistence manager 102 then communicates copies of the spectrum map SM 760 to the coexistence managers of the neighboring networks and also uses SM 760 in resource allocation for the requesting network "B".

In an example alternate embodiment of the invention, the coexistence manager 102 may obtain spectrum information A 750 from the coexistence enabler 100, itself, instead of the primary database 104.

Figure 8A:
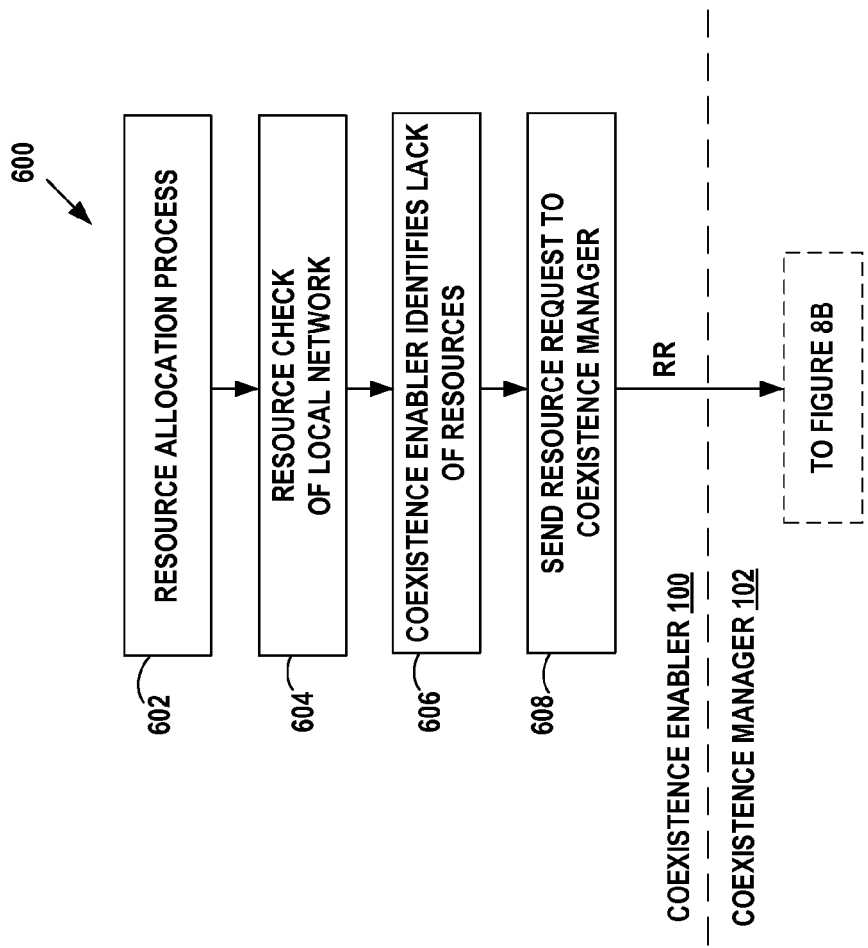
FIG. 8, consisting of FIGS. 8A and 8B, is an example flow diagram of operational steps in processing a resource request, according to an embodiment of the present invention.

FIG. 8, consisting of FIGS. 8A and 8B, is an example flow diagram 600 of operational steps in processing the resource request, according to an embodiment of the present invention, the steps comprising:

Steps 602 to 608 in FIG. 8A are performed by Control node or coexistence enabler (CE):

Step 602: Process Header: Resource Allocation Process.
Step 604: Start: Resource Check.
Step 606: Process: Coexistence Enabler (CE) Identifies Excess Lack of Resources.
Step 608: Subroutine: Send Resource Request to Coexistence Manager (CM)

Steps 630 to 648 in FIG. 8B are performed by Network controller or coexistence manager (CM):

Step 630: Subroutine: Environment Analysis
Step 632: Decision: Any Free Channels?
Step 634: Subroutine: Yes/Inform Neighbor Networks/Send command to CE
Step 636: Subroutine: No/Current Advertised Channels Analysis
Step 638: Decision: Suitable Advertised Allocated But Unused Resources?
Step 640: Subroutine: Yes/Communication with Relevant Networks/Command to CE
Step 642: Subroutine: No/Environment Change and Allocation Analysis
Step 644: Decision: Eligible To New Resources?
Step 646: Subroutine: Yes/Communicate Schedule To Relevant Neighbor Networks//Send command to CE
Step 648: Denial of request/Send command to CE The FIGS. 8A and 8B show the flow of a resource request. A control node or coexistence enabler may operate in a single network or it may share the allocation changes with some real neighbors in the same network allocation group (NAG). The coexistence enabler waits for a stimulus in its resource check state. Normally small allocation changes are done by self-coexistence methods of that particular standard or by cross-coexistence methods of standards sharing the channel.

In Step 604 in FIG. 8A, for example, the coexistence enabler (CE) 100 continually monitors the ambient RF spectrum. It uses the spectrum sensing strategy sent to it by the coexistence manager (CM) 102 to examine the local RF spectrum for the presence of incumbent, primary users in coexistence bands that, if unused, may be available in the local geographic area, such as any TV broadcaster's signal in the local TV band white space, any maritime radio signal in the local maritime radio band, or any earth station radio signal in the local satellite earth station radio band. These spectrum sensing results are sent to the coexistence manager (CM) 102. The coexistence enabler (CE) 100 continually monitors the traffic handled by STA1's network "B" link and compares it with thresholds for required quality of service (QoS), channel interference, frequency of retransmissions, and the like. When it identifies a need for additional resources in step 606 in order to meet the required thresholds, it sends a resource request to coexistence manager (CM) in step 608.

In Step 630 in FIG. 8B, for example, the coexistence manager (CM) 102 accesses the primary database 104 to obtain the identity of locally free secondary channels in the local TV band white space, the local maritime radio white space band, and the local satellite earth station radio white space band. If step 632 determines that there are locally free secondary channels, then in step 634, it sends a command to the coexistence enabler (CE) 100 to reallocate some of its existing 802.11 channels in its network "B" link to locally free secondary channels in TVWS band link 3, which the coexistence manager (CM) 102 specifies. The coexistence manager (CM) 102 may also send an update to the primary database 104 that the specified secondary channels in the white space have been allocated to the coexistence enabler (CE) 100. The coexistence enabler (CE) 100 will check the ambient RF spectrum again to confirm that no primary user signals have appeared, and then .it will reconfigure the MAC in STA1 to move some of its existing 802.11 channels to the specified locally free secondary channels in TVWS link 3. It also causes STA1 to send a command over its existing network "B" link to the client device, STA2, to make a corresponding move of some of its existing 802.11 channels to the specified locally free secondary channels in TVWS link 3.

If there are no or an insufficient number of available free resources in the coexistence band, then in Step 636 in FIG. 8B, for example, the coexistence manager (CM) 102 checks for the availability of allocated but unused resources in the coexistence band, as advertised by one or more coexistence managers managing neighboring wireless networks in the network allocation group. As an example, the coexistence manager 102 receives over the Internet from one or more other coexistence managers 102" managing neighboring wireless networks, advertisements of an availability of allocated but unused resources in a coexistence band. In step 638, if there are suitable advertised allocated but unused channels, then in Step 640 coexistence manager 102 communicates with the other coexistence manager 102" negotiating for the specified advertised allocated but unused channels in the white space to be reallocated to the coexistence enabler (CE) 100. The coexistence manager (CM) 102 then sends a command to the coexistence enabler (CE) 100 to reallocate some of its existing 802.11 channels in its network "B" link to the advertised allocated but unused channels in TVWS band link 3, which the coexistence manager (CM) 102 specifies. The coexistence enabler (CE) 100 will check the ambient RF spectrum again to confirm that no primary user signals have appeared, and then .it will reconfigure the MAC in STA1 to move some of its existing 802.11 channels to the specified advertised allocated but unused channels in TVWS link 3. It also causes STA1 to send a command over its existing network "B" link to the client device, STA2, to make a corresponding move of some of its existing 802.11 channels to the specified advertised allocated but unused channels in TVWS link 3.

If there are no or an insufficient number of available free resources (for example, channels) or not enough advertised allocated but unused resources (for example, channels) in the coexistence band for the network allocation group, then in Step 642 in FIG. 8B, for example, the coexistence manager (CM) 102 analyzes an allocation of used resources (for example, channels) in the coexistence band for neighboring wireless networks in the network allocation group, for which the coexistence enabler 100 is eligible. The coexistence manager 102 sends a query over the Internet to coexistence managers managing neighboring wireless networks in the same network allocation group, to analyze allocations if it doesn't already have up to date information about the allocations and environment. The coexistence manager 102 then receives a resource status report from one or more coexistence managers managing neighboring wireless networks in the same network allocation group. The coexistence manager 102 will check the eligibility of the coexistence enabler 100 to the proposed resource allocation change. Factors determining the eligibility of coexistence enabler 100 for the proposed reallocation may include relative QoS of the proposed donating network and the requesting network, relative priority of the traffic of the proposed donating network and the requesting network, and the like. In step 646, if there are eligible new resources, then in Step 646 coexistence manager 102 communicates with the other coexistence manager 102" negotiating for the reallocation of the used resources in the white space to be reallocated to the coexistence enabler (CE) 100. The coexistence manager (CM) 102 then sends a command to the coexistence enabler (CE) 100 to reallocate some of its existing 802.11 channels in its network "B" link to the used resources in TVWS band link 3, which the coexistence manager (CM) 102 specifies. The coexistence manager (CM) 102 may also send an update to the primary database 104 that the specified used resources in the white space have been reallocated to the coexistence enabler (CE) 100. The coexistence enabler (CE) 100 will check the ambient RF spectrum again to confirm that no primary user signals have appeared, and then .it will reconfigure the MAC in STA1 to move some of its existing 802.11 channels to the specified used resources (channels) in TVWS link 3. It also causes STA1 to send a command over its existing network "B" link to the client device, STA2, to make a corresponding move of some of its existing 802.11 channels to the specified used resources (channels) in TVWS link 3.

If there are insufficient available resources and insufficient reallocatable used resources in the coexistence band for neighboring networks in the network allocation group for which the coexistence enabler is eligible, then in Step 642 in FIG. 8B, for example, the coexistence manager (CM) 102 extends analysis to an allocation of used resources in the coexistence band for all neighboring wireless networks regardless of the network allocation group, for which the coexistence enabler is eligible. The coexistence manager 102 sends a query over the Internet to coexistence managers managing neighboring wireless networks in all network allocation groups, to analyze allocations if it doesn't already have up to date information about the allocations and environment. The coexistence manager 102 then receives a resource status report from one or more coexistence managers 103 managing neighboring wireless networks in any network allocation group. The coexistence manager 102 will check the eligibility of the coexistence enabler 100 to the proposed resource allocation change. Factors determining the eligibility of coexistence enabler 100 for the proposed reallocation may include relative QoS of the proposed donating network and the requesting network, relative priority of the traffic of the proposed donating network and the requesting network, relative sensitivity to interference, and the like. In step 646, if there are eligible new resources in any network allocation group, then in Step 646 coexistence manager 102 communicates with the other coexistence manager 103 negotiating for the reallocation of the used resources in the white space to be reallocated to the coexistence enabler (CE) 100. The coexistence manager (CM) 102 then sends a command to the coexistence enabler (CE) 100 to reallocate some of its existing 802.11 channels in its network "B" link to the used resources in TVWS band link 3, which the coexistence manager (CM) 102 specifies. The coexistence manager (CM) 102 may also send an update to the primary database 104 that the specified used resources in the white space have been reallocated to the coexistence enabler (CE) 100. The coexistence enabler (CE) 100 will check the ambient RF spectrum again to confirm that no primary user signals have appeared, and then .it will reconfigure the MAC in STA1 to move some of its existing 802.11 channels to the specified used resources (channels) in TVWS link 3. It also causes STA1 to send a command over its existing network "B" link to the client device, STA2, to make a corresponding move of some of its existing 802.11 channels to the specified used resources (channels) in TVWS link 3.

If there are no available resources and no reallocatable used resources in the coexistence band for neighboring wireless networks, in step 648 in FIG. 8B, for example, coexistence manager (CM) 102 indicates to the coexistence enabler 100 that the resource request is denied.

The steps of the flow diagram of FIG. 8 represent computer code instructions stored in the RAM and/or ROM memory of the WLAN access point STA1 and the coexistence manager 102, which when executed by the central processing units (CPU), carry out the functions of a example embodiment of the invention. The steps may be carried out in another order than shown and individual steps may be combined or separated into component steps.

The coexistence enabler sends a resource request to its coexistence manager when the current allocation with current bandwidth or a possible coexistence method does not satisfy the needs. The coexistence manager will check the eligibility to resource allocation change.

A network allocation group (NAG) is a group of neighboring networks that is typically a sub-set of all the neighboring networks. In a NAG, networks have typically some common denominator that can be, for example, a common set of properties.

Analysis done by any alternative is based on the spectrum maps and current allocations of each network, Network parameters of each network and capabilities of each network.

The communication between secondary networks may be done directly over the air or indirectly via a wired backbone.

Figure 9:
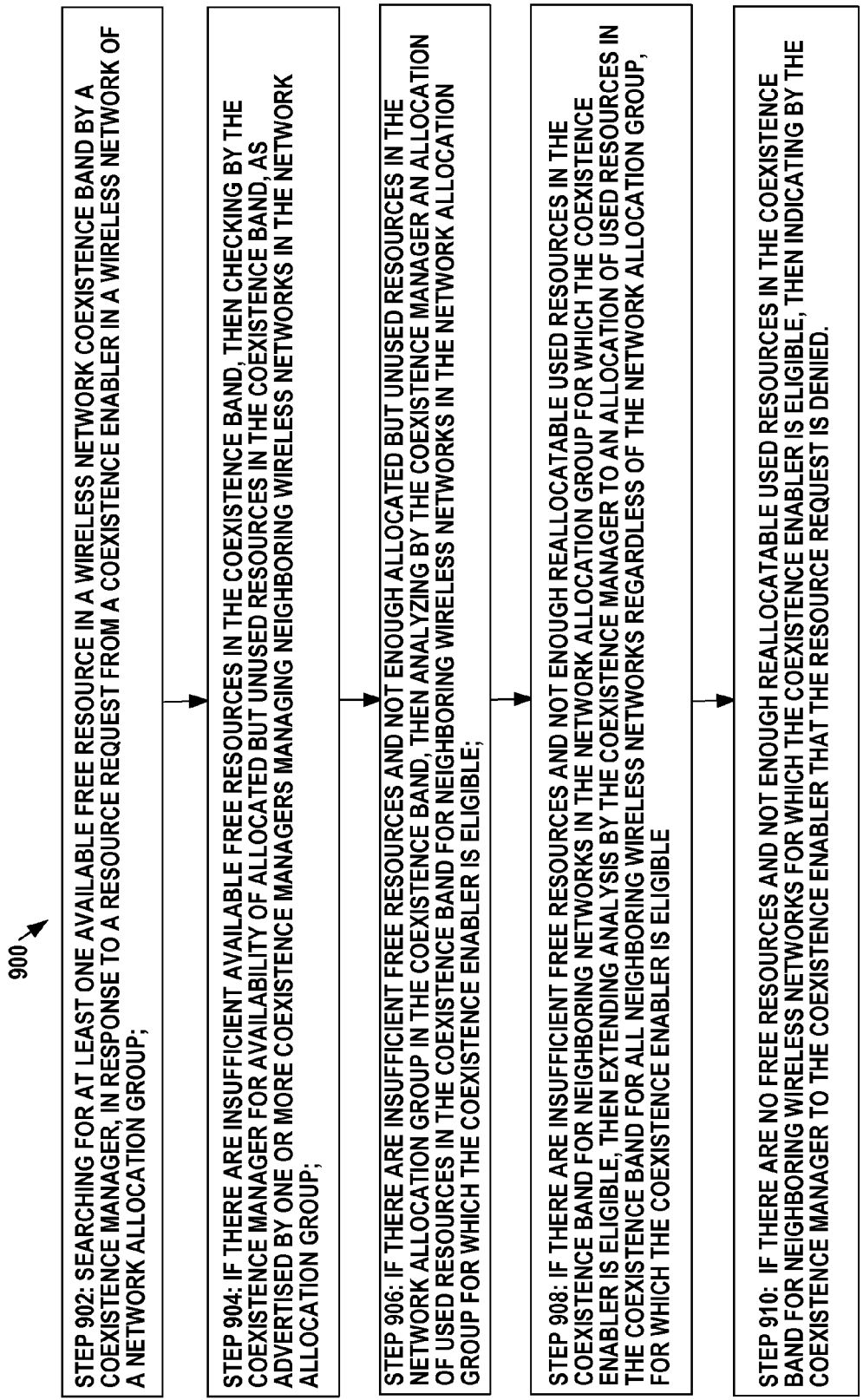
FIG. 9 is an example flow diagram of operational steps in a resource request process, according to an embodiment of the present invention.

FIG. 9 is an example flow diagram 900 of operational steps in a resource request process, according to an embodiment of the present invention, with example steps as follows:

Step 902: searching for at least one available free resource in a wireless network coexistence band by a network controller or coexistence manager, in response to a resource request from a control node or coexistence enabler in a wireless network of a network allocation group;

Step 904: if there are no available free resources in the coexistence band, then checking by the coexistence manager for availability of allocated but unused resources in the coexistence band, as advertised by one or more coexistence managers managing neighboring wireless networks in the network allocation group;

Step 906: if there are insufficient free resources and not enough allocated but unused resources in the network allocation group in the coexistence band, then analyzing by the coexistence manager an allocation of used resources in the coexistence band for neighboring wireless networks in the network allocation group for which the coexistence enabler is eligible;

Step 908: if there are insufficient free resources and not enough reallocatable used resources in the coexistence band for neighboring networks in the network allocation group for which the coexistence enabler is eligible, then extending analysis by the coexistence manager to an allocation of used resources in the coexistence band for all neighboring wireless networks regardless of the network allocation group, for which the coexistence enabler is eligible; and Step 910: if there are no free resources and not enough reallocatable used resources in the coexistence band for neighboring wireless networks for which the coexistence enabler is eligible, then indicating by the coexistence manager to the coexistence enabler that the resource request is denied.

The steps of the flow diagram 900 of FIG. 9 represent computer code instructions stored in the RAM and/or ROM memory of the WLAN access point STA1 and the coexistence manager 102, which when executed by the central processing units (CPU), carry out the functions of an example embodiment of the invention. The steps may be carried out in another order than shown and individual steps may be combined or separated into component steps.

CoexistenceValue

An example framework according to an embodiment of the invention, to which CoexistenceValue (CV) is related, can be seen in FIGS. 7A, 7B, and 7C and in FIGS. 8A and 8B. Especially, CV is used in block "Environment change and allocation analysis" 642 and in the following decision block 644, shown in greater detail in FIG. 7C. The term CoexistenceValue (CV) is defined to give ability for fair resource sharing between secondary networks. It is a representation of a parameter value that characterizes the network's eligibility level to the spectrum resources available to secondary networks. The parameter value is calculated from one or more parameters of an associated wireless network. The parameter may be called a coexistence value (CV). This value may be used as a metric in resource sharing calculations. If the CV is not used for some reason it may be replaced by a standard value (e.g. 1) for each network enabling the usage of the same algorithm.

Example Usage of the CoexistenceValue in Resource Allocation

In an example embodiment of the invention, the Control node or coexistence enabler (CE) calculates a Coexistence value (CV) from certain parameters of its network. The method for calculation is presented later. CE transmits this value to its CM, which further informs CMs of the neighboring networks. The locally calculated coexistence value CV is compared with the coexistence values CV1, CV2, CV3 of neighboring networks. Sharing the CV is an independent process from the resource request (RR) according to one embodiment of the invention. It may be one of the input items, like spectrum map and each network's capabilities, to a possible resource allocation process, which is initiated by the RR. The RR is a resource that the network needs. According to one embodiment, RR may be a normalized T*BW product, where T may be between 0 and 1 (==no time, 1=full time) and BW is related to nominal bandwidth of the channel (in US TVWS one TV channel: BW=1, half of the channel: BW=½ etc). After the CE has sent a resource request (RR) to its CM, the CM may evaluate the eligibility of the network to get the resources it is requesting, as shown in FIGS. 7A, 7B, and 7C and in FIGS. 8A and 8B, from the CV of its own network and the CVs of the neighboring networks. This group of networks is called allocation ring in this context. In the resource allocation process, all these CVs are normalized to available resources. The available resources may be estimated from the spectrum maps of a requesting network and its neighbors (=allocation ring). Available resources are the resources that are usable by the allocation ring, i.e. are not limited by primary users or secondary users which are not part of the allocation ring. Available resources may be presented as T*BW product, where BW (bandwidth) is channel availability and T is available time share. The normalized CV of the requesting network can be interpreted as T*BW available in a fair bases to this network. If this value is at least as big as the current T*BW resource summed by the requested T*BW, then the requesting network is eligible to requested resources. Eligibility should also take into account other parameters such as the relative locations of networks with respect to each other, which has an effect on final result.

The above example description is a simplified usage of CV. The environment, where it is used, may include a variety of secondary and primary networks located in an arbitrary manner with respect to each other. In US TVWS, the primary networks are protected and secondary networks are not allowed to interfere with them. Secondary networks may negotiate their coexistence to enable better usage of the available band. The information used as an input in the resource allocation may comprise e.g. spectrum map, network's capabilities and CVs of its own and the neighboring networks. When a network needs more resources, its CE will send an RR to associated CM, which then analyses the situation and may then act according example scenario shown in FIGS. 7A, 7B, and 7C and in FIGS. 8A and 8B. The CM of the requesting network will form an allocation ring and be the decision maker.

To summarize CoexistenceValue and its basic usage according to one example embodiment of the present invention:
- Each network generates its own CoexistenceValue based on the parameters defined thus CV being an absolute value
- A CM of a network needing more resources forms an allocation ring from other networks, which are its real neighbors
- The CM evaluates available spectrum resources
- The CM normalizes all CVs of a ring to available spectrum resources
- Normalized CVs are used through the allocation analysis in such a manner that the final resource allocation follows as closely as possible the principle of eligibility of the requesting network to the requested resources based on CVs within an allocation ring. If the outcome of the resource allocation process to the requesting network allows the requested resources, then the network is eligible to these otherwise not.

Example Calculation of the CoexistenceValue

The purpose of CoexistenceValue (CV) is to take into account the elements which may e.g. attribute an average to each node, the same active opportunity to resources when looking the picture only from network (not individual) level. In this case only the number of nodes in the network would be used when calculating the CV. It is up to a network as to how it will internally share the resources. CV may also take into account other parameters, for example such that will give more resources to a network, if it is providing to local community more important information than other networks are able to provide and thus help them.

The parameters which may be part of CV (depends also on government regulations) are 1. Number of nodes in network
2. Allocation: Channel utility of allocation (near history to current+possible request) or actual allocation usage
   a. Definition of full utility to a scheduled network: if either all allocated resources to a network under study are used or resources used+resources advertised to be available are at the moment same as a full allocation (directed mainly to the other networks in the same channel).
   b. Definition of full utility to a contention based network: if channel is considered "fully" occupied (transmission queue buffer is not empty within time period T in the near past) or in case of free time periods network not using all its time allocation is advertising excess resources (directed only to other contention based networks in other channels)
3. Coexistence assistance
4. Priority Number of Nodes in Network The number of nodes in network describes the potential of resource need. The weighting principles as a function of number of nodes should follow the principles like in case of only one node means that node traffic needed is only network "maintenance" traffic. Therefore its weight should be low or very low compared to other node numbers. Other node numbers may be weighted using different alternatives, as explained as follows. There may be principles such as either a linear curve taking into account each node or a linear curve of groups of nodes. Another approach may be that the more nodes there are, the flatter the resource need in the whole network. Then the weighting can take this into account by weighting a little bit more of the smaller amount of nodes in a network in an average per node than larger group of nodes in the network. A criterion may be that there is an of upper limit for the weight: after certain amount of nodes, the weight does not increase anymore. The effect of weighting issues can be simulated and check their effect of connection setup failures and in general to capacity in a fair manner. The term node and how it is calculated is explained below.

Allocation

This subject can be approached two ways either by checking the reduced usage of current allocation (near history allocation) or the current resource usage. In either way the channel utility of allocation is pushing the CoexistenceValue value in other direction with respect to the number of nodes in a network. A network has a certain amount of resources partly based on its size (number of nodes). However if it does not use the allocated resources, this parameter reduces partly its CoexistenceValue. The questions in defining this parameter are that how long the history is taken into account and what the value for a totally new network is. Answer to these may also be a matter of simulation.

Coexistence Assistance

The next parameter is the coexistence assistance of the network. It may be that some secondary networks are (more) dependent on other networks to operate. Then it is fair that a network that will help other networks in their operation gets also some benefit from that. This is a general parameter for a band where secondary usage is allowed and will be very much dependent on how regulator has set the ruling for secondary operation. Several possible items for this parameter have been identified, such as no coexistence assistance (not possible under current ruling in US TVWS), only spectrum sensing coexistence assistance, only (primary) data base access (not possible under current ruling in US TVWS) and both spectrum sensing and data base access.

Priority

Priority may also be one parameter. As a network level parameter, this may be difficult because within a network there may be different priority users, terminals and connections.

Another angle may be that are there different priorities between networks or there will be certain transmissions (authority) which have to have space. Another approach to priority is that if the owner of a network pays for the spectrum, it can get credit applied in the value of its CV or get some restriction of network status (restricting normal CV based scheduling).

An Example of Numbering of Parameters and they are Calculated

The following numbers and groupings are just an example. The final ones may need to be verified by simulations.

1) Number of nodes F1 (can be also linear line between 2 and N, after N saturated)
   a. Nbr=1: coef F1=1
   b. Nbr=2-4: coef F1=5
   c. Nbr=5-10: coef F1=10
   d. Nbr>10: coef F1=20

The number of nodes concept can be evaluated based on the sliding average approach presented below. The purpose of this approach is to balance the quick changes in number of nodes (especially downwards) and still respond quickly enough to an increasing number of nodes. There are two sliding windows, where the longer time window has a length of T1 (e.g. one day) and the shorter one a length of T2 (controls the dynamics, e.g. 10 min). The sliding window of longer is divided into N1 slots (e.g. 24) and the shorter one into N2 slots (e.g. 2). Each slot represents the highest node count during that slot period. From both sliding window the highest value ($c_1$ and $c_2$) is taken into node number count according to the following formula:

$$Node\ count\ Nbr=(a*c_1+b*c_2)/(a+b)$$

Values a and b are weighting factors. The good assumption may be that both of them are 1. The calculated value is rounded to the next higher integer (there are also other rounding possibilities if the Nbr is not an integer).

2) Channel utility value F2 (these have to be clarified standard by standard based on its general structure to keep track and surroundings to get resources like in totally contention based environment)

Figure 10:
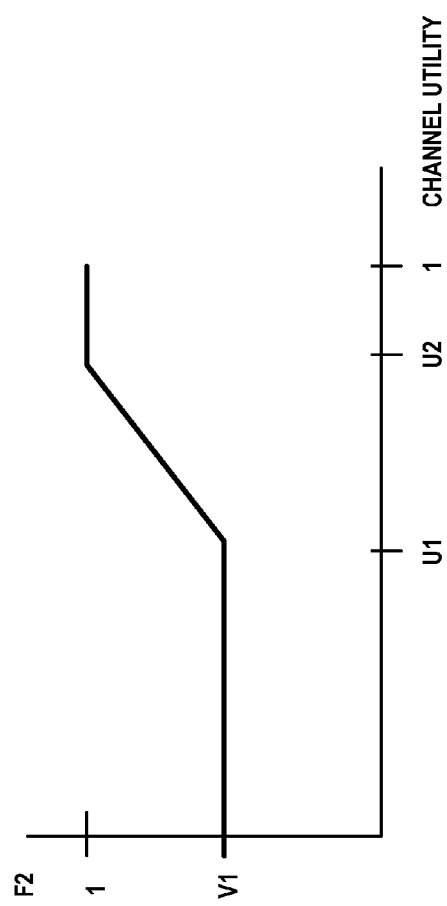
FIG. 10 illustrates an example of coexistence value (CV) calculations in the control node or coexistence enabler.

The history evaluation of the channel utility may be based on either peak or average of the certain time period in the near past history. Proposed solution is the peak utility during the latest full slot within time period T2 and the current incomplete slot (see previous node count calculation. The purpose is that these two are equal.). FIG. 10 then defines the value F2 to be used in CV calculations. As an example utility value is constant v1 (e.g. 0.4) until channel utility exceeds u1 (e.g. 0.3). Then it will linearly rise to utility value 1 between channel utilities u1 and u2 (e.g. 0.8). After that the utility value is constant 1.

The meaning of channel utility value is to better fit the real usage of resources (or especially reduced usage of allocated resources) which deviates from the one based on the node count. This will reduce the need to advertise resources, but still keep the resources mainly based on node count if resources are really used.

3) Coexistence assistance F3: If a network does not have any means to get specified vital information about environment by itself, it is not allowed to operate. However if other networks can secure the operation, this kind of network is able to operate (some secondary band in future, not possible in current FCC ruling). Values for just an example might be
  a. No coexistence assistance: 0.1
  b. Spectrum sensing: 0.4
  c. (primary) data base access: 0.6
  d. b+c: 1

4) Priority F4

The network may obtain a restricting of network status and may override the CV. A restricting network is an incumbent network that is not allowed to be disturbed by secondary networks. There may be means for a secondary network to get priority status, e.g. by leasing some spectrum resources. This is not currently possible in US TVWS, but can be used in future similar types of environments. Still, this type of network participates in the communication with its real neighbors, e.g., by sending its own spectrum map and information of its own parameters.

Figure 11:
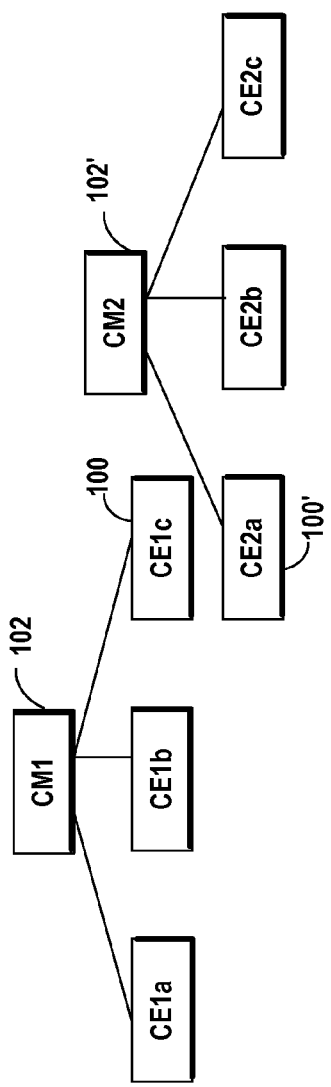
FIG. 11 illustrates an example of neighboring network controller or coexistence managers negotiating resource sharing.

An example embodiment of applying the priority information in US TVWS is that a CE can get a priority from its CM. This means that a CM that makes resource sharing may ignore the rights its other CEs have based on CV and maintain a "guaranteed" share of the resources for the prioritized CE. However, the priority should not affect the fair share calculations on inter-CM level. For example, in FIG. 11, if a neighboring CM2 makes the resource sharing for the CM1 that has the prioritized CE1$a$, there are two options: 1) The CM2 may already take the priority into account in its resource share (requires that CM1 communicates the priority info to CM2) or 2) CM2 does not take the priority into account but CM1 may (if possible) modify the share given by CM1.

This example embodiment is based on the assumption that a CM is a basic tool for operators. The effect of the priority is therefore kept on intra-CM level. Thus, the priority should not affect to the inter-CM resource sharing. In practice, this (and the nature of the unlicensed secondary usage) success of the guaranteeing depends on the environment.

Example CoexistenceValue Format

An example calculation of CoexistenceValue is done according to the following formula:

$$CV = F1 * F2 * F3 * F4$$

The final CV can be any combination of F1, F2, F3 and F4 depending on the regulation and agreed principles in a band and country under consideration. The chosen method when combining the parameters with parameter scale can affect the total scale of CV and the importance of each parameter in a final value. When a resource request is initiated based on need for more resources, the initiating network calculates its CV and the current allocation summed by the new one as U+U (new), where U=dT*dB and U(new)=dT(new)*dB(new) or if no previous allocation to network CV formula with F2=F3=1.

An example embodiment of the invention enables sharing available spectrum resources in fair manner between heterogeneous networks.

Figure 12:
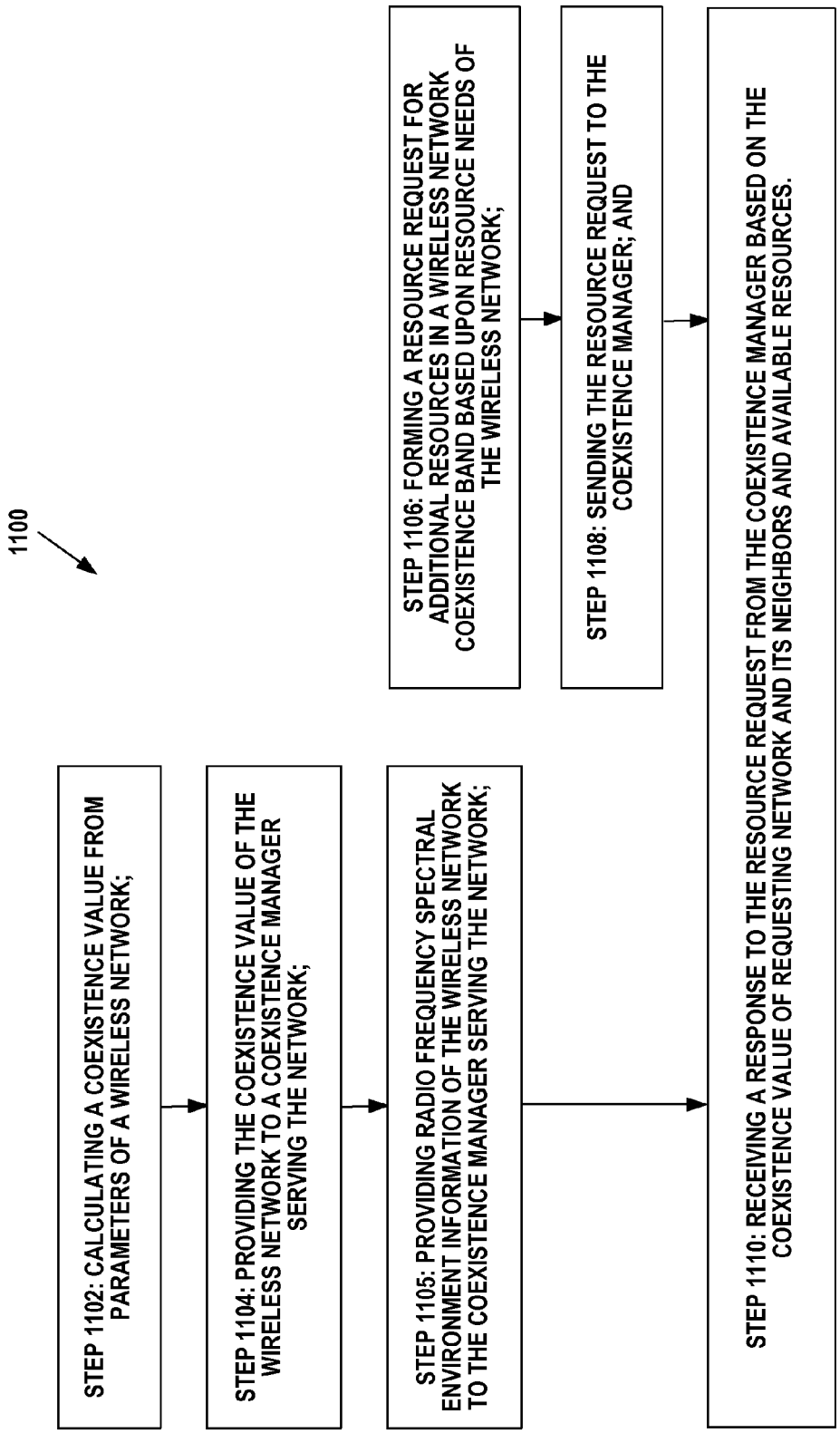
FIG. 12 is an example flow diagram of operational steps in the control node or coexistence enabler, for providing a coexistence value, independently sending a resource request, and receiving a response to the resource request, for wireless resource sharing on a fair basis between heterogeneous wireless networks to enable coexistence in a TV band white space, according to an embodiment of the present invention.

FIG. 12 is an example flow diagram of operational steps in the control node or coexistence enabler 100 for providing for wireless resource sharing on a fair basis between heterogeneous wireless networks to enable coexistence in a TV band white space, according to an embodiment of the present invention. The steps of the flow diagram 1100 of FIG. 12 represent computer code instructions stored in the RAM and/or ROM memory of the WLAN access point STA1 and the coexistence enabler 100, which when executed by the central processing units (CPU), carry out the functions of an example embodiment of the invention. The steps may be carried out in another order than shown and individual steps may be combined or separated into component steps.

Step 1102: calculating a coexistence value from parameters of a wireless network;

Step 1104: providing the coexistence value of the wireless network to a network controller or coexistence manager serving the network;

Step 1105: providing radio frequency spectral environment information of the wireless network to the coexistence manager serving the network;

The following steps 1106 and 1108 are independent of the preceding steps 1102, 1104, and 1105.

Step 1106: forming a resource request for additional resources in a wireless network coexistence band based upon resource needs of the wireless network;

Step 1108: sending the resource request to the coexistence manager; and

Step 1110: receiving a response to the resource request from the coexistence manager based on the coexistence value of the requesting network and its neighbors and available resources.

FIG. 13 is an example flow diagram of operational steps in the network controller or coexistence manager 102 for providing for wireless resource sharing on a fair basis between heterogeneous wireless networks to enable coexistence in a TV band white space, according to an embodiment of the present invention. The steps of the flow diagram 1200 of FIG. 13 represent computer code instructions stored in the RAM and/or ROM memory of the WLAN access point STA1 and the coexistence manager 102, which when executed by the central processing units (CPU), carry out the functions of an example embodiment of the invention. The steps may be carried out in another order than shown and individual steps may be combined or separated into component steps.

Step 1202: receiving a coexistence value based on parameters of a wireless network and receiving radio frequency environment spectra of the wireless network, from a control node or coexistence enabler serving the wireless network;

Step 1204: transmitting the coexistence value and radio frequency environment spectra to coexistence managers serving neighboring networks;

The following step 1206 is independent of the preceding steps 1202 and 1204.

Step 1206: receiving other coexistence values and radio frequency environment spectra from the coexistence managers serving the neighboring networks.

The following step 1208 is independent of the preceding steps 1202, 1204, and 1206.

Step 1208: receiving a resource request from the coexistence enabler for additional resources in a wireless network coexistence band based upon resource needs of the wireless network;

Step 1210: generating a resource allocation response to the resource request from the coexistence enabler based on comparing the coexistence value with the other coexistence values of the neighboring networks and based on available resources; and Step 1212: transmitting the resource allocation response to the coexistence enabler.

FIG. 14 is an example flow diagram of operational steps in the network controller or coexistence manager 102 for providing for wireless resource sharing on a fair basis between heterogeneous wireless networks to enable coexistence in a TV band white space, according to an embodiment of the present invention. The steps of the flow diagram 1400 of FIG. 14 represent computer code instructions stored in the RAM and/or ROM memory of the WLAN access point STA1 and the coexistence manager 102, which when executed by the central processing units (CPU), carry out the functions of an example embodiment of the invention. The steps may be carried out in another order than shown and individual steps may be combined or separated into component steps.

Step 1402: receiving a coexistence value associated with a wireless network;

Step 1404: receiving radio frequency spectral environment information of the wireless network;

Step 1406: receiving coexistence values and other radio frequency spectral environment information of wireless networks neighboring the wireless network;

Step 1408: receiving a resource request for the wireless network;

Step 1410: generating a resource allocation based at least on the received coexistence values and received radio frequency spectral environment information; and Step 1412: communicating at least a portion of the generated resource allocation to the wireless network.

An example embodiment of the invention includes a method, comprising the further steps of: sharing the coexistence value associated with the wireless network, with one or more network controllers serving the neighboring wireless networks.

An example embodiment of the invention includes a method, comprising the further steps of: building a spectrum map based on the received radio frequency spectral environment information of the wireless network, past radio frequency spectral environment information of the wireless network, and radio frequency spectral environment information accessed from a database; and sharing the spectrum map with the one or more network controllers serving the wireless networks neighboring the wireless network.

An example embodiment of the invention includes a method, comprising the further steps of: receiving the coexistence values and the other radio frequency spectral environment information of the wireless networks neighboring the wireless network from one or more network controllers serving the wireless networks neighboring the wireless network.

An example embodiment of the invention includes a method, comprising the further steps of: communicating at least a portion of the generated resource allocation to the one or more network controllers serving the wireless networks neighboring the wireless network.

An example embodiment of the invention includes a method, comprising the further steps of: receiving network capabilities information of the wireless network and sharing the network capabilities information with one or more network controllers serving the wireless networks neighboring the wireless network;

receiving network capabilities information of the wireless networks neighboring the wireless network from the one or more network controllers serving the wireless networks neighboring the wireless network;

comparing the coexistence value of the wireless network with the coexistence values of the wireless networks neighboring the wireless network and comparing the network capabilities information of the wireless network with the network capabilities information of the wireless networks neighboring the wireless network;

generating a resource allocation based on a result of comparison the coexistence value of the wireless network with coexistence values of the wireless networks neighboring the wireless network, a result of the comparison of the network capabilities information of the wireless network with the network capabilities information of the wireless networks neighboring the wireless network, and the received radio frequency spectral environment information.

An example embodiment of the invention includes a method, comprising: wherein the coexistence value of the wireless network is based on at least one of a number of nodes in the wireless network, current resource allocation utilization rate of the wireless network, coexistence assistance by the wireless network to assist in operation of other wireless networks and a priority of the wireless network.

An example embodiment of the invention includes a method, comprising the further steps of: normalizing the received coexistence value of the wireless network and the received coexistence values of the wireless networks neighboring the wireless network to available communication resources.

An example embodiment of the invention includes a method, comprising the further steps of: maintaining information related to network controllers serving wireless networks neighboring the wireless network.

FIG. 15 is an example flow diagram of operational steps in the control node or coexistence enabler 100 for providing coexistence values for wireless resource sharing on a fair basis between heterogeneous wireless networks to enable coexistence in a TV band white space, according to an embodiment of the present invention. The steps of the flow diagram 1500 of FIG. 15 represent computer code instructions stored in the RAM and/or ROM memory of the WLAN access point STA1 and the coexistence enabler 100, which when executed by the central processing units (CPU), carry out the functions of an example embodiment of the invention. The steps may be carried out in another order than shown and individual steps may be combined or separated into component steps.

Step 1502: determining a coexistence value for a wireless network based on parameters associated with the wireless network, including at least one of a number of nodes in the wireless network, a current resource allocation utilization rate of the wireless network, coexistence assistance by the wireless network to assist in operation of other networks, and/or a priority of the wireless network, wherein the coexistence value characterizes eligibility of the wireless network to wireless spectrum resources available to secondary networks; and Step 1504: communicating the determined coexistence value of the wireless network to an associated network controller.

An example embodiment of the invention includes a method, comprising: wherein the coexistence value is normalized to available communication resources.

An example embodiment of the invention includes a method, comprising: wherein the coexistence value of the wireless network is weighted in accordance with an upper limit to a number of nodes in the network.

An example embodiment of the invention includes a method, comprising: wherein a wireless network using less that its current allocation of resources is attributed with a reduced coexistence value.

An example embodiment of the invention includes a method, comprising: wherein a wireless network estimated to use less that its requested allocation of resources is attributed with a reduced coexistence value.

An example embodiment of the invention includes a method, comprising: wherein a wireless network that assists operations of another network with which it coexists is attributed with an increased coexistence value.

An example embodiment of the invention includes a method, comprising: wherein a wireless network that assists in spectrum sensing for another network with which it coexists, is attributed with an increased coexistence value.

An example embodiment of the invention includes a method, comprising: wherein a wireless network that assists in database access for another network with which it coexists, is attributed with an increased coexistence value.

An example embodiment of the invention includes a method, comprising: wherein a wireless network that is owned by an entity that pays for the spectrum used by another network with which it coexists, is attributed with an increased coexistence value.

An example embodiment of the invention includes a method, comprising: wherein the nodes of the wireless network are weighted in accordance with a linear curve.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   determining a coexistence value for a wireless network based on parameters associated with the wireless network, including at least one of a number of nodes in the wireless network, a current resource allocation utilization rate of the wireless network, coexistence assistance by the wireless network to assist in operation of other networks, and/or a priority of the wireless network, wherein the coexistence value characterizes eligibility of the wireless network to wireless spectrum resources available to secondary networks; and
   communicating the determined coexistence value of the wireless network to an associated coexistence manager.

2. The method of claim 1, wherein the coexistence value of the wireless network is weighted in accordance with an upper limit to a number of nodes in the network.

3. The method of claim 1, wherein a wireless network using less than its current allocation of resources is attributed with a reduced coexistence value.

4. The method of claim 1, wherein a wireless network estimated to use less than its requested allocation of resources is attributed with a reduced coexistence value.

5. The method of claim 1, wherein a wireless network that assists operations of another network with which it coexists is attributed with an increased coexistence value.

6. The method of claim 1, wherein a wireless network that assists in spectrum sensing for another network with which it coexists, is attributed with an increased coexistence value.

7. The method of claim 1, wherein a wireless network that assists in database access for another network with which it coexists, is attributed with an increased coexistence value.

8. The method of claim 1, wherein a wireless network that is owned by an entity that pays for the spectrum used by another network with which it coexists, is attributed with an increased coexistence value.

9. An apparatus, comprising:
   at least one processor;
   at least one memory including computer program code;
   the at least one memory and the computer program code configured to, with the at least one processor, cause the apparatus at least to: determine a coexistence value for a wireless network based on parameters associated with the wireless network, including at least one of a number of nodes in the wireless network, a current resource allocation utilization rate of the wireless network, coexistence assistance by the wireless network to assist in operation of other networks, and/or a priority of the wireless network, wherein the coexistence value characterizes eligibility of the wireless network to wireless spectrum resources available to secondary networks; and
   communicate the determined coexistence value of the wireless network to an associated coexistence manager.

10. The apparatus of claim 9, wherein the coexistence value of the wireless network is weighted in accordance with an upper limit to a number of nodes in the network.

11. The apparatus of claim 9, wherein a wireless network using less than its current allocation of resources is attributed with a reduced coexistence value.

12. The apparatus of claim 9, wherein a wireless network estimated to use less than its requested allocation of resources is attributed with a reduced coexistence value.

13. The apparatus of claim 9, wherein a wireless network that assists operations of another network with which it coexists is attributed with an increased coexistence value.

14. The apparatus of claim 9, wherein a wireless network that assists in spectrum sensing for another network with which it coexists, is attributed with an increased coexistence value.

15. The apparatus of claim 9, wherein a wireless network that assists in database access for another network with which it coexists, is attributed with an increased coexistence value.

16. The apparatus of claim 9, wherein a wireless network that is owned by an entity that pays for the spectrum used by another network with which it coexists, is attributed with an increased coexistence value.

17. A computer program product comprising computer executable program code recorded on a computer readable non-transitory storage medium, the computer executable program code comprising: code for determining a coexistence value for a wireless network based on parameters associated with the wireless network, including at least one of a number of nodes in the wireless network, a current resource allocation utilization rate of the wireless network, coexistence assistance by the wireless network to assist in operation of other networks, and/or a priority of the wireless network, wherein the coexistence value characterizes eligibility of the wireless network to wireless spectrum resources available to secondary networks; and code for communicating the determined coexistence value of the wireless network to an associated coexistence manager.

* * * * *